United States Patent
Muto et al.

(10) Patent No.: US 6,879,904 B2
(45) Date of Patent: Apr. 12, 2005

(54) PRESSURE/TEMPERATURE CALCULATION APPARATUS

(75) Inventors: Harufumi Muto, Nishikamo-gun (JP); Daisuke Kobayashi, Toyota (JP); Satoshi Furukawa, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/732,456

(22) Filed: Dec. 11, 2003

(65) Prior Publication Data

US 2004/0122584 A1 Jun. 24, 2004

(30) Foreign Application Priority Data

Dec. 17, 2002 (JP) ........................................ 2002-365609

(51) Int. Cl.[7] ........................... F02D 45/00; F02M 25/07
(52) U.S. Cl. ....................................................... 701/108
(58) Field of Search ............................... 701/108, 109, 701/102; 123/436

(56) References Cited

U.S. PATENT DOCUMENTS

| | | | | |
|---|---|---|---|---|
| 4,843,553 A | * | 6/1989 | Ohata | ........................... 701/93 |
| 4,860,707 A | * | 8/1989 | Ohata | ....................... 123/339.2 |
| 5,010,866 A | * | 4/1991 | Ohata | ........................... 123/436 |

FOREIGN PATENT DOCUMENTS

| | | |
|---|---|---|
| JP | A 2001-41095 | 2/2001 |
| JP | A 2002-147279 | 5/2002 |
| JP | A 2002-201998 | 7/2002 |
| WO | WO 03/033897 A1 | 4/2003 |

* cited by examiner

Primary Examiner—Hieu T. Vo
(74) Attorney, Agent, or Firm—Oliff & Berridge, PLC

(57) ABSTRACT

In an internal combustion engine, at least one of the pressure and temperature in an intake passage downstream of a throttle valve is calculated using an expression of a relationship established based on the law of conservation of mass among an amount of air passing the throttle valve and flowing into the intake passage, an amount of exhaust gas passing an exhaust gas flow control valve and flowing into the intake passage, and an amount of gas flowing from the intake passage into a cylinder of the engine, and an expression of a relationship established based on the law of conservation of energy among an amount of energy of the air passing the throttle valve and flowing into the intake passage, an amount of energy of the exhaust gas passing the exhaust gas flow control valve and flowing into the intake passage, and an amount of energy of the gas flowing from the intake passage into the cylinder of the engine.

36 Claims, 32 Drawing Sheets

PRESSURE/TEMPERATURE CALCULATION APPARATUS

INCORPORATION BY REFERENCE

The disclosure of Japanese Patent Application No. 2002-365609 filed on Dec. 17, 2002, including the specification, drawings and abstract, is incorporated herein by reference in its entirety.

BACKGROUND OF THE INVENTION

1. Field of the Invention

The invention relates to a pressure/temperature calculation apparatus of an internal combustion engine.

2. Description of Related Art

For example, Japanese Laid-open Patent Publication No. 2002-147279 (JP-A-2002-147279) discloses a method of calculating the pressure in an intake pipe of an internal combustion engine, based on the law of conservation of mass or the law of conservation of energy established between air flowing from the atmosphere into the intake pipe, and gas (e.g., exhaust gas) other than the air, which flows into the intake pipe.

As is understood from the whole description of JP-A-2002-147279, the method as disclosed in this publication has been developed on the assumption that the gas (other than the air) flowing into the intake pipe diffuses throughout the intake pipe. In fact, the gas (other than the air) flowing into the intake pipe does not diffuse uniformly throughout the intake pipe, but diffuses with a certain degree of distribution. Thus, the method as disclosed in JP-A-2002-147279 is still desired to be improved so that the pressure in the intake pipe can be calculated with higher accuracy.

SUMMARY OF THE INVENTION

It is therefore an object of the invention to accurately calculate the pressure and/or temperature in an intake pipe of an internal combustion engine.

To accomplish the above and/or other object(s), there is provided according to one aspect of the invention a pressure/temperature calculation apparatus of an internal combustion engine in which an exhaust passage is connected to an intake passage downstream of a throttle valve via an exhaust gas recirculation passage, and an exhaust gas flow control valve adapted to control a flow rate of exhaust gas flowing in the exhaust gas recirculation passage is disposed in the exhaust gas recirculation passage, which apparatus includes a controller that calculates at least one of a pressure and a temperature in the intake passage downstream of the throttle valve, according to numerical calculations using an expression of a relationship established based on the law of conservation of mass among an amount of air passing the throttle valve and flowing into the intake passage downstream of the throttle valve, an amount of exhaust gas passing the exhaust gas flow control valve and flowing into the intake passage downstream of the throttle valve, and an amount of gas flowing from the intake passage downstream of the throttle valve into a cylinder of the engine, and an expression of a relationship established based on the law of conservation of energy among an amount of energy of the air passing the throttle valve and flowing into the intake passage downstream of the throttle valve, an amount of energy of the exhaust gas passing the exhaust gas flow control valve and flowing into the intake passage downstream of the throttle valve, and an amount of energy of the gas flowing from the intake passage downstream of the throttle valve into the cylinder of the engine.

According to the above aspect of the invention, at least one of the pressure and temperature in the intake passage is calculated by numerical calculations using an expression of a relationship established based on the law of conservation of mass and an expression of a relationship established based on the law of conservation of energy. Thus, the pressure and temperature in the intake passage are determined by simple numerical calculations, without using a large number of sensors and/or maps.

Since there is no need to use a large number of sensors as described above, the number of sensors can be reduced, and the manufacturing cost can be accordingly reduced. Furthermore, since there is no need to use a large number of maps, an effort in preparing maps can be reduced.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein.

DETAILED DESCRIPTION OF EXEMPLARY EMBODIMENTS

Figure 1:
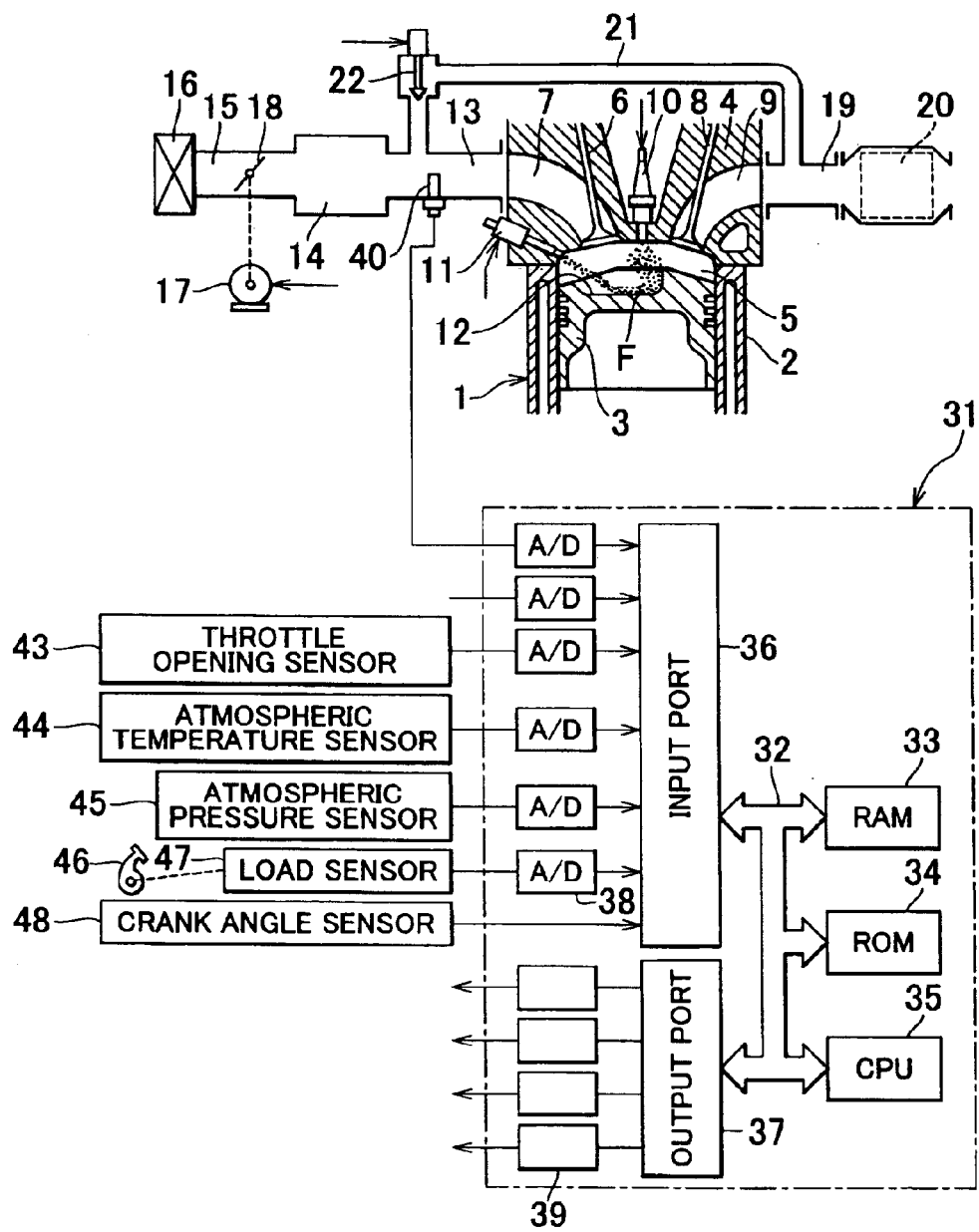
FIG. 1 is a view showing the whole system of an internal combustion engine including a control apparatus according to one embodiment of the invention.

An exemplary embodiment of the invention will be described with reference to the drawings. FIG. 1 shows the whole system of an internal combustion engine to which the invention is applied. While the invention is applied to a direct injection type spark ignition engine in this embodiment, the invention is equally applicable to other types of spark ignition engines and compression self-ignition engines.

In FIG. 1, the internal combustion engine includes an engine body 1, cylinder block 2, piston 3, cylinder head 4, cylinder (combustion chamber) 5, intake valve 6, intake port 7, exhaust valve 8, exhaust port 9, ignition plug 10, fuel injector 11, and a cavity 12.

The intake port 7 is connected to a surge tank 14 via an intake branch pipe 13 provided for each cylinder 5, and the surge tank 14 is connected to an air cleaner 16 via an upstream-side intake pipe 15. A throttle valve 18 adapted to be driven by a step motor 17 is disposed in the upstream-side intake pipe 15.

On the other hand, the exhaust port 9 is connected to an exhaust pipe 19, which is in turn connected to an emission control device 20. The exhaust pipe 19 is also connected to the intake branch pipe 13 via an exhaust gas recirculation passage (which will be called "EGR passage") 21. An EGR control valve 22 for controlling the flow rate of exhaust gas flowing in the EGR passage 21 is disposed in the EGR passage 21. With this arrangement, exhaust gas discharged from the cylinder 5 of the engine is inducted or drawn into the cylinder 5 again via the EGR passage 21. In the present specification, the exhaust gas recirculated into the cylinder 5 via the EGR passage 21 will be called "EGR gas" when appropriate.

An electronic control unit (ECU) 31 consists of a digital computer, and includes RAM (random access memory) 33, ROM (read-only memory) 34, CPU (microprocessor) 35, an input port 36 and an output port 37, which are connected to each other by a bi-directional bus 32.

To the intake branch pipe 13 is attached an intake pipe pressure sensor 40 for detecting the pressure in the intake branch pipe 13 (which will be called "intake pipe pressure"). The intake pipe pressure sensor 40 generates an output voltage that is proportional to the intake pipe pressure, and the input port 36 receives the output voltage via a corresponding A/D converter 38.

The engine also includes a throttle opening sensor 43 for detecting the opening angle of the throttle valve 18, an atmospheric pressure sensor 44 for detecting the pressure of the atmosphere around the engine or the pressure (intake pressure) of air drawn into the upstream-side intake pipe 15, and an atmospheric temperature sensor 45 for detecting the temperature of the atmosphere around the engine or the temperature (intake temperature) of air drawn into the upstream-side intake pipe 15. These sensors 44, 45 generate output voltages proportional to the pressure and temperature of the atmosphere, respectively, and the input port 36 receives these output voltages via corresponding A/D converters 38.

A load sensor 47, which is connected to an accelerator pedal 46, is operable to generate an output voltage proportional to an amount of depression of the accelerator pedal 46. The input port 36 receives the output voltage of the load sensor 47 via a corresponding A/D converter 38.

The engine also includes a crank angle sensor 48. For example, the crank angle sensor 48 generates an output pulse each time the crankshaft rotates 30 degrees, and the input port 36 receives the output pulse. The CPU 35 calculates the engine speed from the output pulses of the crank angle sensor 48.

On the other hand, the output port 37 is connected to the ignition plug 10, fuel injector 11, step motor 17 and the EGR control valve 22, via corresponding drive circuits 39. The ECU 31 calculates the opening angle of the EGR control valve 22, based on a step signal transmitted from the output port 37 to the EGR control valve 22.

In the meantime, the amount of fuel to be injected from the fuel injector 10 into the cylinder 5 (which will be simply called "fuel injection amount") is determined based on the amount of air charged in the cylinder 5, so that the air/fuel ratio of an air-fuel mixture in the cylinder 4 becomes equal to a target air/fuel ratio. To accurately control the air/fuel ratio of the mixture in the cylinder 5 to the target air/fuel ratio, therefore, it is necessary to accurately determine the amount of the air charged in the cylinder 5 (which will be called "in-cylinder charged air amount").

Here, an example of a method of estimating the in-cylinder charged air amount will be described. Initially, an air flow meter for detecting the mass flow of air passing the throttle valve 18 and other sensor are mounted in the engine, and a map or maps for calculating the in-cylinder charged air amount based on output values of these sensors as variables is/are prepared in advance. In the method, the in-cylinder charged air amount is estimated from the output values of the sensors and the map(s).

When the in-cylinder charged air amount is estimated by using the maps, the number of the maps and their arguments must be large enough to ensure high accuracy in estimating the in-cylinder charged air amount. If the number of the maps is increased, however, the storage capacity of the ROM 34 that stores these maps needs to be increased, resulting in an increase in the cost of the engine.

Also, when the in-cylinder charged air amount is estimated by using the maps, the maps must be prepared for each type of engine, or for each of individual engines of the same type, resulting in increased effort in preparing the maps. If the number of arguments of the maps is increased in an attempt to accurately estimate the in-cylinder charged air amount, on the other hand, the effort in preparing the maps is greatly increased.

In view of the above problems, a method of calculating the in-cylinder charged air amount through numerical computations utilizing mathematical expressions or equations derived from models, rather than maps, has been studied and proposed by the assignee of the present application. This method is disclosed in, for example, WO 03/033897.

The proposed method is applied to an internal combustion engine having no EGR system for recirculating exhaust gas into cylinders, and thus cannot be applied as it is to the engine of the present embodiment equipped with the EGR system. However, this method will be useful in understanding of a method (as described later) that is applicable to the present embodiment, and thus will be described herein.

Figure 2:
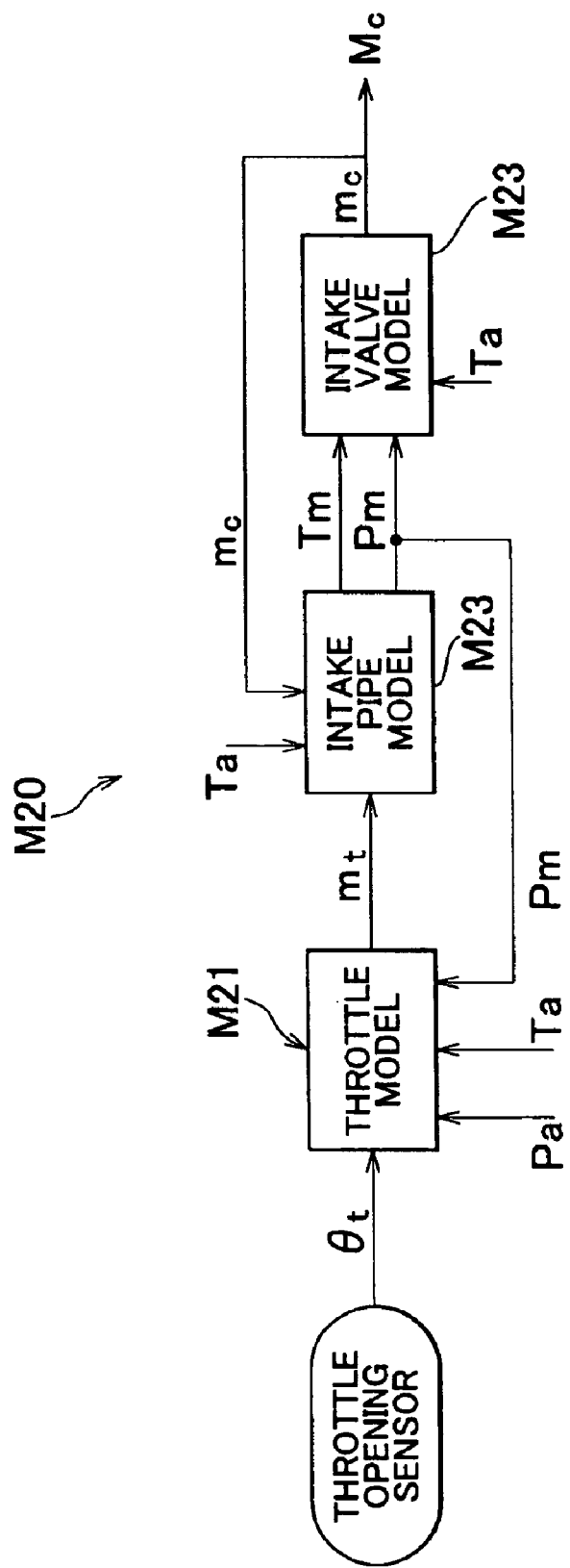
FIG. 2 is a view showing an in-cylinder gas amount model that may be applied to an internal combustion engine that is not equipped with an EGR system.

The method proposed by the assignee of the present application is derived from a model (which will be called "in-cylinder gas amount model") as shown in FIG. 2. The in-cylinder gas amount model M20 as shown in FIG. 2 includes a throttle model M21, an intake pipe model M22 and an intake valve model M23.

The throttle model M21 receives the opening angle (throttle opening) $\theta_t$ of the throttle valve 18 detected by the throttle opening sensor 43, pressure (atmospheric pressure) $P_a$ detected by the atmospheric pressure sensor 45, atmospheric temperature $T_a$ detected by the atmospheric temperature sensor 44, and the pressure $P_m$ in the intake branch pipe 13 which is calculated by the intake pipe model M22.

The pressure in the intake branch pipe 13 will be hereinafter called "intake pipe pressure". The throttle model M21 calculates the amount $m_t$ of air passing the throttle valve 18 per unit time (which will be called "throttle passing air flow rate $m_t$"), based on these input parameters.

The intake pipe model M22 receives the throttle passing air flow rate $m_t$ calculated by the above-described throttle model M21, the amount $m_c$ of gas that flows into the cylinder 5 per unit time, which is calculated by the intake valve model M23 and will be called "cylinder incoming gas flow rate"), and the atmospheric temperature $T_a$. The intake pipe model M22 calculates the intake pipe pressure $P_m$ and the temperature $T_m$ in the intake branch pipe 13 (which will be called "intake pipe temperature"), from these input parameters.

The intake valve model M23 receives the intake pipe pressure $P_m$ calculated by the above-described intake pipe model M22, intake pipe temperature $T_m$ and the atmospheric temperature $T_a$, and calculates the cylinder incoming gas flow rate $m_c$ from these input parameters.

According to this method, the in-cylinder gas amount model M20 calculates the amount $M_c$ of gas that has entered the cylinder 5 at the cylinder incoming gas flow rate $m_c$, as described later. The gas amount Mc thus calculated will be called "in-cylinder charged gas amount".

As is understood from FIG. 2, the in-cylinder gas amount model M20 utilizes parameter value(s) calculated by each of the models (M21, M22, M23), as parameter value(s) received by other model(s). Thus, the in-cylinder gas amount model M20 actually receives, from the outside of this model, only three parameters, namely, the throttle opening $\theta_t$, atmospheric pressure $P_a$ and the atmospheric temperature $T_a$. Namely, this method permits calculation of the in-cylinder charged gas amount $M_c$ solely based on the three parameters.

Next, each of the models M21 to M23 will be described in detail. The throttle model M21 calculates the throttle passing air flow rate $m_t$ by substituting the atmospheric pressure $P_a$, atmospheric temperature $T_a$, intake pipe pressure $P_m$ and the throttle opening $\theta_t$ into the following equation (1), and solving this equation (1).

$$m_t = \mu_t(\theta_t) \cdot A_t(\theta_t) \cdot \frac{P_a}{\sqrt{R \cdot T_a}} \cdot \Phi\left(\frac{P_m}{P_a}\right) \quad (1)$$

Figure 3:
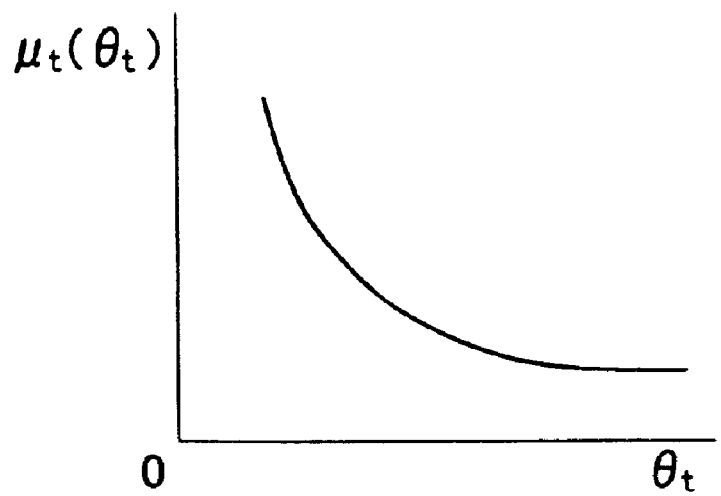
FIG. 3 is a graph showing the relationship between the throttle opening and the flow coefficient.
Figure 4:
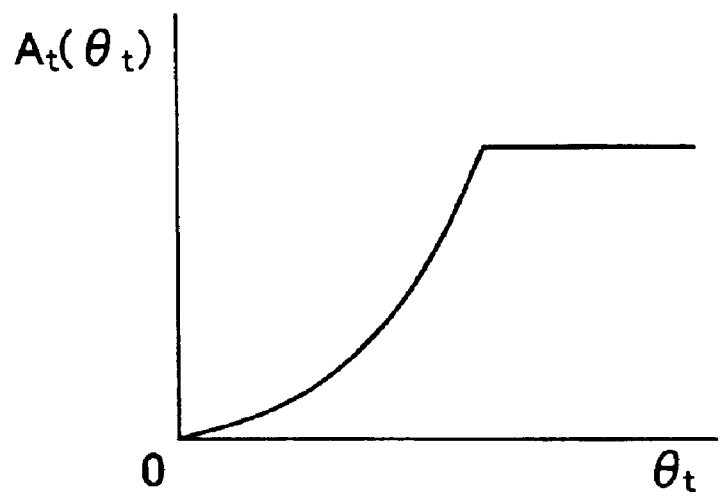
FIG. 4 is a graph showing the relationship between the throttle opening and the opening cross-sectional area.

In the above equation (1), $\mu_t$ is flow coefficient at the throttle valve 18, which is a function of the throttle opening $\theta_t$ and is determined from a map as shown in FIG. 3, and $A_t$ is opening cross-sectional area of the throttle valve 18, which is a function of the throttle opening $\theta_t$ and is determined from a map as shown in FIG. 4. It is also possible to determine $\mu_t \cdot A_t$ (the product of the flow coefficient $\mu_t$ and the opening cross-sectional area $A_t$) from a single map that is a function of the throttle opening $\theta_t$. Also, R is a constant related to a gas constant, more specifically, a value obtained by dividing the gas constant $R^*$ by the mass $M_a$ of air per mole ($R=R^*/M_a$).

In the same equation (1), $\Phi(P_m/P_a)$ is a function using $P_m/P_a$ as a variable, and is expressed by the following equation (2):

$$\Phi\left(\frac{P_m}{P_a}\right) = \begin{cases} \sqrt{\dfrac{\kappa}{2(\kappa+1)}} & \cdots \dfrac{P_m}{P_a} \leq \dfrac{1}{\kappa+1} \\ \sqrt{\left\{\left(\dfrac{\kappa-1}{2\kappa}\right)\cdot\left(1-\dfrac{P_m}{P_a}\right)+\dfrac{P_m}{P_a}\right\}\cdot\left(1-\dfrac{P_m}{P_a}\right)} & \cdots \dfrac{P_m}{P_a} > \dfrac{1}{\kappa+1} \end{cases} \quad (2)$$

where κ is ratio of specific heat, and is a fixed or constant value in this method.

Figure 5:
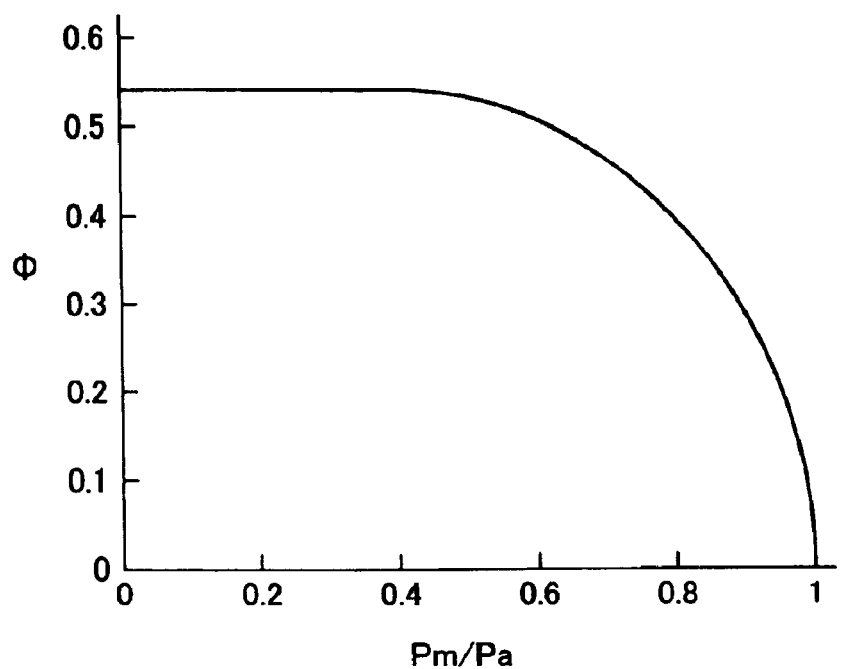
FIG. 5 is a graph showing the function $\Phi(P_m/P_a)$.

The above-indicated function $\Phi(P_m/P_a)$ and $P_m/P_a$ has a relationship as shown in FIG. 5. It is thus possible to store in advance a map for calculating the function $((P_m/P_a)$ using $P_m/P_a$ as a variable in the ROM 34, instead of the above equation (2), and calculate the value of the function $\Phi(P_m/P_a)$ from $P_m/P_a$ and this map.

Figure 6:
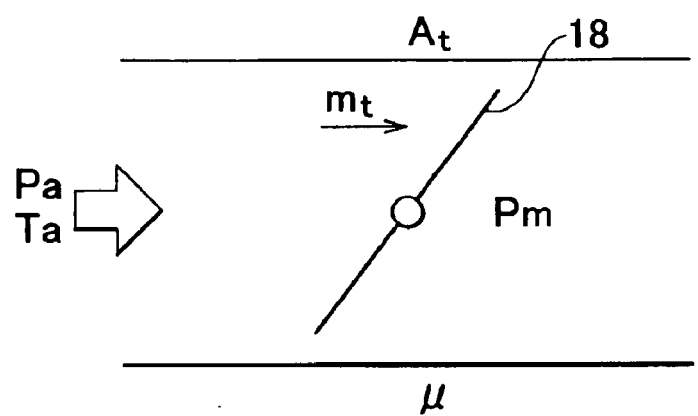
FIG. 6 is a view showing the basic concept of a throttle model.

The above-indicated equations (1) and (2) are derived on the basis of a model as shown in FIG. 6, with respect to the throttle valve 18, by using the atmospheric pressure $P_a$ as the pressure of air upstream of the throttle valve 18, the atmospheric temperature $T_a$ as the temperature of air upstream of the throttle valve 18, and the intake pipe pressure $P_m$ as the pressure of air that has passed the throttle valve 18. In addition the equations (1) and (2) are derived from the equations of relationships established based on the law of conservation of mass, the law of conservation of energy and the law of conservation of momentum between the air upstream of the throttle valve 18 and the air that has passed the throttle valve 18, and the equation of state of gas, equation (κ=Cp/Cv) that defines the ratio of specific heat, and the equation (Cp=Cv+R*) according to the Mayer's relationship, where Cp is specific heat at a constant pressure, Cv is specific heat at a constant volume, and R* is so-called gas constant.

Next, the intake pipe model M22 will be described. The intake pipe model M22 calculates the intake pipe pressure $P_m$ and the intake pipe temperature $T_m$ by substituting the throttle passing air flow rate $m_t$, cylinder incoming gas flow rate $m_c$ and the atmospheric temperature $T_a$ into the following equations (3) and (4), and solving these equations.

$$\frac{d}{dt}\left(\frac{P_m}{T_m}\right) = \frac{R}{V}\cdot(m_t - m_c) \quad (3)$$

$$\frac{dP_m}{dt} = \kappa\cdot\frac{R}{V}\cdot(m_t\cdot T_a - m_c\cdot T_m) \quad (4)$$

In the above equations (3) and (4), V is a total volume of the intake pipe 15, surge tank 14, intake branch pipe 13 and the intake port 7 (which will be called "intake pipe portion" that extends from the throttle valve 18 to the intake valve 6), and is usually a fixed value.

Figure 7:
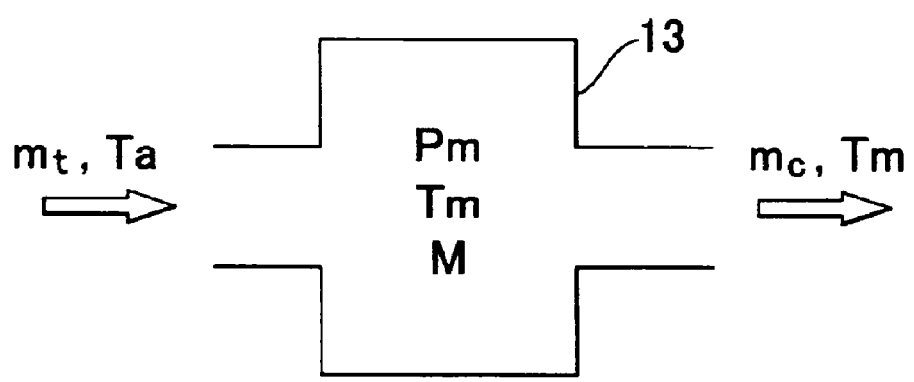
FIG. 7 is a view showing the basic concept of an intake pipe model that may be applied to the engine that is not equipped with the EGR system.

The above-indicated equations (3) and (4) are derived on the basis of a model as shown in FIG. 7, with respect to the intake pipe portion, from the equations of relationships established based on the law of conservation of mass and the law of conservation of energy between the air flowing into the intake pipe portion and the air flowing from the intake pipe portion into the cylinder.

More specifically, the amount of change of the total air amount M in the intake pipe portion with time is expressed by the following equation (5) based on the law of conservation of mass. This equation (5) indicates that the rate of change of the total air amount M is equal to a difference between the flow rate $m_t$ of the air flowing into the intake pipe portion (i.e., throttle passing air flow rate) and the flow rate $m_c$ of the air flowing from the intake pipe portion into the cylinder (i.e., cylinder incoming gas flow rate).

$$\frac{dM}{dt} = m_t - m_c \quad (5)$$

The above-indicated equation (3) is derived from the above equation (5) and the equation of state of gas ($P_m\cdot V = M\cdot R^*\cdot T_m$).

Also, where the atmospheric temperature $T_a$ represents the temperature of the air flowing into the intake pipe portion, and the intake pipe temperature $T_m$ represents the temperature of the air flowing from the intake pipe portion into the cylinder, the amount of change of the energy $M\cdot Cv\cdot T_m$ of the air in the intake pipe portion with time is expressed by the following equation (6) based on the law of conservation of energy. This equation (6) indicates that the rate of change of the energy $M\cdot Cv\cdot T_m$ is equal to a difference between the amount of energy of the air flowing into the intake pipe portion and the amount of energy of the air flowing from the intake pipe portion into the cylinder.

$$\frac{d(M\cdot Cv\cdot T_m)}{dt} = Cp\cdot m_t\cdot T_a - Cp\cdot m_c\cdot T_m \quad (6)$$

The above-indicated equation (4) is derived from the above equation (6) and the above-described equation of state of gas.

Next, the intake valve model M23 will be described. The intake valve model M23 calculates the cylinder incoming gas flow rate $m_c$ by substituting the intake pipe pressure $P_m$, intake pipe pressure $T_m$ and the atmospheric temperature $T_a$ into the following expression (7), and solving this equation.

$$m_c = \frac{T_a}{T_m}\cdot(a\cdot P_m - b) \quad (7)$$

In the above expression (7), "a" and "b" are values determined by using the engine speed NE as a variable. In the case where at least one of the valve timing corresponding to the valve closing time or valve opening time of the intake valve 6 and the working or operation angle corresponding to the opening duration of the intake valve 6 can be changed in the engine, "a" and "b" are determined by using the engine speed NE, the valve timing and/or phase angle of the intake valve 6 as variables. In other words, "a" is proportional coefficient, and "b" represents the amount of gas remaining in the cylinder 5 at the time of closing of the exhaust valve 8.

In the expression (7), since the intake pipe temperature $T_m$ may greatly change while the engine is in varying operating conditions (i.e., during transient engine operation), $T_a/T_m$ derived from the theoretical and empirical rules is used as a correction factor for compensating for changes in the intake pipe temperature $T_m$.

Figure 8:
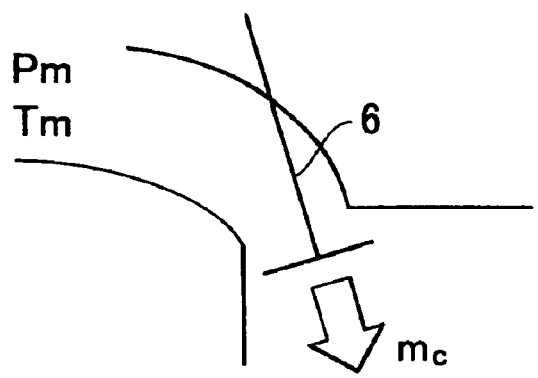
FIG. 8 is a view showing the basic concept of an intake valve model.

The above-indicated expression (7) is derived from the theoretical and empirical rules, on the basis of a model as shown in FIG. 8, with respect to the intake valve 6, on the assumption that the cylinder incoming gas flow rate $m_c$ is proportional to the intake pipe pressure $P_m$, as described below in detail.

The in-cylinder charged gas amount $M_c$ is established at the time of closing of the intake valve 6, and is proportional to the pressure in the cylinder 5 at the time of closing of the intake valve 6. Since the pressure in the cylinder 5 at the time of closing of the intake valve 6 is regarded as being equal to the pressure $P_m$ of the air upstream of the intake valve 6 (i.e., the intake pipe pressure), the in-cylinder charged gas amount $M_c$ may be approximated to be proportional to the intake pipe pressure $P_m$.

On the other hand, the in-cylinder charged gas amount $M_c$ is determined by integrating the flow rate (cylinder incoming flow rate) $m_c$ of the air flowing into the cylinder 5 with respect to time, over the opening duration of the intake pipe 6. Namely, the in-cylinder charged gas amount $M_c$ and the cylinder incoming gas flow rate $m_c$ has a relationship that the in-cylinder charged gas amount $M_c$ is a time integral value of the cylinder incoming gas flow rate $m_c$.

Thus, since the in-cylinder charged gas amount $M_c$ is proportional to the intake pipe pressure $P_m$, and is also a time integral value of the cylinder incoming gas flow rate $m_c$, the cylinder incoming gas flow rate $m_c$ may also be regarded as being proportional to the intake pipe pressure $P_m$.

In this method, therefore, the above-indicated equation (7) is derived from the theoretical and empirical rules, on the assumption that the cylinder incoming gas flow rate $m_c$ is proportional to the intake pipe pressure $P_m$.

It is to be noted that the cylinder incoming gas flow rate $m_c$ calculated according to the equation (7) is the average value of the amount of the air flowing out of the intake pipe portion per unit time. Thus, the in-cylinder charged gas amount $M_c$ for each cylinder 5 is calculated by multiplying the cylinder incoming gas flow rate $m_c$ by time obtained by dividing the time required for one cycle of the engine by the number of cylinders in the engine.

Figure 9:
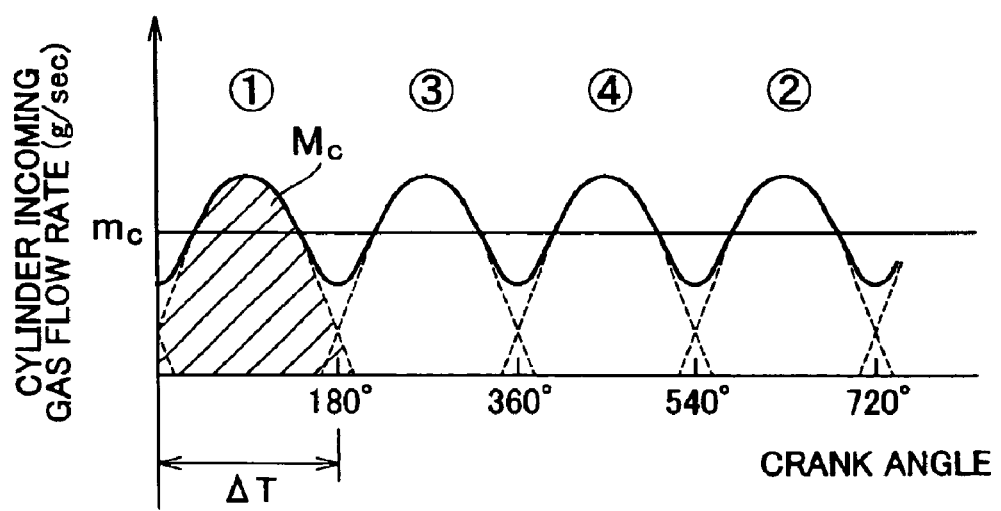
FIG. 9 is a view relating to the definitions of the in-cylinder charged gas amount and cylinder incoming gas flow rate.

The above-described calculation of the in-cylinder charged gas amount $M_c$ will be described with reference to FIG. 9, with respect to an internal combustion engine having four cylinders as an example. In FIG. 9, the horizontal axis indicates crank angle, and the vertical axis indicates the amount of air flowing from the intake pipe portion into the cylinder 5 per unit time. In the example of FIG. 9, the suction stroke takes place in the order of first cylinder #1, third cylinder #3, fourth cylinder #4, and second cylinder #2. In this case, the flow rate of air flowing from the intake pipe portion into each cylinder 5 changes as indicated by the broken lines in FIG. 9, and the flow rate of air flowing out of the intake pipe portion changes as indicated by the solid line in FIG. 9.

The average value of the flow rate of air flowing out of the intake pipe portion (which is indicated by the solid line in FIG. 9) is the cylinder incoming gas flow rate $m_c$, which is indicated by the one-dot chain line in FIG. 9. Accordingly, the in-cylinder charged gas amount $M_c$ for each cylinder 5 is calculated by multiplying the cylinder incoming gas flow rate $m_c$ (indicated by the one-dot chain line in FIG. 9) by time obtained by dividing the time required for one cycle of the engine (i.e., the time required for the crankshaft to rotate 720° in the example shown in FIG. 9) by the number of cylinders (four in the example of FIG. 9), namely, time required for the crankshaft to rotate 180° in the example of FIG. 9. The thus calculated in-cylinder charged gas amount $M_c$ for each cylinder 5 is identical with, for example, the hatched area in FIG. 9.

Next, a method of calculating the in-cylinder charged gas amount $M_c$ when the above-described in-cylinder gas amount model M20 is actually installed in the engine will be described.

While the in-cylinder charged gas amount $M_c$ is calculated according to the above equations (1)–(4) and (7) of the respective models of the in-cylinder gas amount model M20, these five equations are discretely expressed so as to permit processing by the ECU 31 when the model M20 is actually installed in the engine. Namely, where t represents time and Δt represents calculation interval (calculation period), these five equations (1)–(4) and (7) are discretely expressed by the following equations (8)–(12).

$$m_t(t) = \mu_t(\theta_t(t)) \cdot A_t(\theta_t(t)) \cdot \frac{P_a}{\sqrt{R \cdot T_a}} \cdot \Phi\left(\frac{P_m(t)}{P_a}\right) \tag{8}$$

$$\Phi\left(\frac{P_m(t)}{P_a}\right) = \tag{9}$$

$$\begin{cases} \sqrt{\frac{\kappa}{2(\kappa+1)}} & \ldots \frac{P_m(t)}{P_a} \leq \frac{1}{\kappa+1} \\ \sqrt{\left\{\left(\frac{k-1}{2\kappa}\right) \cdot \left(1 - \frac{P_m(t)}{P_a}\right) + \frac{P_m(t)}{P_a}\right\} \cdot \left(1 - \frac{P_m(t)}{P_a}\right)} & \ldots \frac{P_m(t)}{P_a} > \frac{1}{\kappa+1} \end{cases}$$

$$\frac{P_m}{T_m}(t + \Delta t) = \frac{P_m}{T_m}(t) + \Delta t \cdot \frac{R}{V} \cdot (m_t(t) - m_c(t)) \tag{10}$$

$$P_m(t + \Delta t) = P_m(t) + \Delta t \cdot \kappa \cdot \frac{R}{V} \cdot (m_t(t) \cdot T_a - m_c(t) \cdot T_m(t)) \tag{11}$$

$$m_c(t) = \frac{T_a}{T_m(t)} \cdot (a \cdot P_m(t) - b) \tag{12}$$

The in-cylinder gas amount model M20 thus discretely expressed and actually installed in the engine calculates the intake pipe pressure $P_m(t+\Delta t)$ and intake pipe temperature $T_m(t+\Delta t)$ at time $(t+\Delta t)$, by substituting the throttle passing air flow rate $m_t(t)$ at time t, which is calculated by the throttle model M21, the cylinder incoming gas flow rate $m_c(t)$ at time t, which is calculated by the intake valve model M23, and the intake pipe temperature $T_m(t)$ at time t into the expressions (10) and (11) of the intake pipe model M22, and solving these equations (10) and (11).

Then, the intake pipe pressure $P_m(t+\Delta t)$ calculated by the intake pipe model M22 and the throttle opening $\theta_t(t)$ at time t are substituted into the equations (8) and (9) of the throttle model M21. By solving these equations, the throttle passing air flow rate $m_t(t+\Delta t)$ at time $(t+\Delta t)$ is calculated.

Furthermore, the intake pipe pressure $P_m(t+\Delta t)$ and the intake pipe temperature $T_m(t+\Delta t)$ calculated by the intake pipe model M22 are substituted into the equation (12) of the intake valve model M23, and the cylinder incoming gas flow rate $m_c(t+\Delta t)$ at time $(t+\Delta t)$ is calculated by solving this equation.

By repeating the above calculations, the cylinder incoming gas flow rate $m_c$ at a certain point of time is calculated. Then, the in-cylinder charged gas amount $M_c$ for each cylinder at a certain point of time is calculated by multiplying the thus calculated cylinder incoming gas flow rate $m_c$ by time obtained by dividing the time required for one cycle by the number of cylinders, as described above.

Upon a start of the engine, namely, at time t=0, the calculations by the models M21–M23 are started on the assumptions that the intake pipe pressure $P_m$ is equal to the atmospheric pressure $P_a(P_m(0)=P_a)$ and that the intake pipe temperature $T_m$ is equal to the atmospheric temperature $T_a(T_m(0)=T_a)$.

As the atmospheric pressure $P_a$ and the atmospheric temperature $T_a$ used by the above-described in-cylinder gas amount model M20 may be always used the atmospheric pressure and atmospheric temperature detected at the time when the calculation of the model M20 is started, or may be used the atmospheric pressure $P_a(t)$ and atmospheric temperature $T_a(t)$ detected at time t.

Next, an in-cylinder gas amount model, which is applicable to the engine equipped with the EGR system as shown in FIG. 1, will be described.

Where the flow rate of air (fresh air) contained in the gas flowing into the cylinder is called "cylinder incoming fresh air flow rate $m_{c\text{-}air}$", the cylinder incoming fresh air flow rate $m_{c\text{-}air}$ is calculated according to the following equation (13).

$$m_{c\text{-}air} = m_c - m_{c\text{-}egr} \tag{13}$$

In the above equation (13), $m_c$ is cylinder incoming gas flow rate as the flow rate of gas flowing into the cylinder, and $m_{c\text{-}egr}$ is cylinder incoming EGR gas flow rate as the flow rate of exhaust gas contained in the gas flowing into the cylinder.

When the engine is in a steady-state operation (for example, when the throttle opening, EGR opening and the engine speed are kept substantially constant), the flow rate $m_{egr}$ of exhaust gas passing the EGR control valve 22 (which will be called "EGR valve passing gas flow rate") is equal to the cylinder incoming EGR gas flow rate $m_{c\text{-}egr}$ ($m_{c\text{-}egr} = m_{egr}$). In this case, therefore, the above equation (13) is rewritten into the following equation (14).

$$m_{c\text{-}air} = m_c - m_{egr} \tag{14}$$

If the cylinder incoming gas flow rate $m_c$ and the EGR valve passing gas flow rate $m_{egr}$ are determined, therefore, the cylinder incoming fresh air flow rate $m_{c\text{-}air}$ is determined. Accordingly, an in-cylinder charged fresh air amount $M_{c\text{-}air}$ as the amount of air (fresh air) contained in the cylinder 5 at the time of closing of the intake valve 6 is determined.

Figure 10:
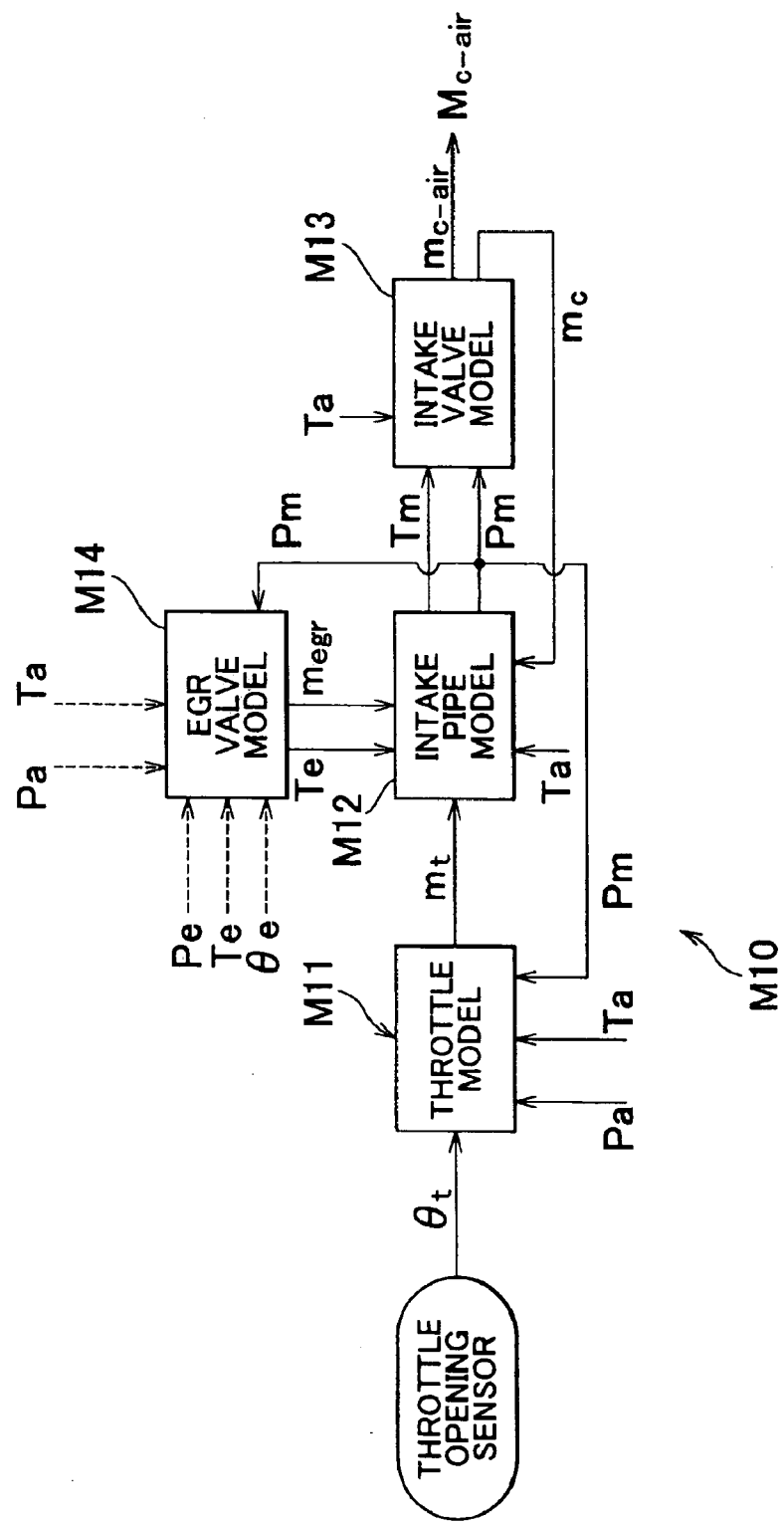
FIG. 10 is a view showing an in-cylinder gas amount model of the invention that may be applied to an internal combustion engine equipped with an EGR system.

In the first embodiment, a model M10 as shown in FIG. 10 is used as the in-cylinder gas amount model for calculating the cylinder incoming gas flow rate $m_c$. The in-cylinder gas amount model M10 as shown in FIG. 10 includes a throttle model M11, intake pipe model M12, intake valve model M13 and an EGR control valve model M14.

The throttle model M11 is the same model as the throttle model M21 shown in FIG. 2, and the intake valve model M13 is the same model as the intake valve model M23 shown in FIG. 2. Thus, these models M11, M13 will not be described in detail but briefly described herein. The throttle model M11 calculates the throttle passing air flow rate $m_t$ by substituting the throttle opening $\theta_t$, atmospheric pressure $P_a$, atmospheric temperature $T_a$ and the intake pipe pressure $P_m$ into the equation (1) and solving this equation. The intake valve model M13 calculates the cylinder incoming gas flow rate $m_c$ by substituting the atmospheric temperature $T_a$, intake pipe pressure $P_m$ and the intake pipe temperature $T_m$ into the equation (7) and solving this equation.

The intake pipe model M12 receives the throttle passing air flow rate $m_t$ calculated by the throttle model M11, cylinder incoming gas flow rate $m_c$ calculated by the intake valve model M13, atmospheric temperature $T_a$, and the amount $m_{egr}$ of exhaust gas passing the EGR control valve 22 per unit time (which will be called "EGR valve passing gas flow rate $m_{egr}$"), which is calculated by the EGR control valve model M14. The intake pipe model M12 then calculates the intake pipe pressure $P_m$ and the intake pipe temperature $T_m$ based on the input parameters.

The EGR control valve model M14 receives the EGR opening $\theta_e$, atmospheric pressure $P_a$, atmospheric temperature $T_a$, intake pipe pressure $P_m$ calculated by the intake pipe model M12 and the exhaust temperature $T_e$, and calculates the EGR valve passing gas flow rate $m_{egr}$ based on these input parameters.

As is understood from FIG. 10, the in-cylinder gas amount model M10 utilizes parameter value(s) calculated by each of the models (M11, M12, M13, M14), as parameter value(s) received by other model(s). Thus, the in-cylinder gas amount model M10 actually receives only four parameters, namely, the throttle opening $\theta_t$, EGR opening $\theta_e$, atmospheric pressure $P_a$ and the atmospheric temperature $T_a$. Namely, this method permits calculation of the in-cylinder charged gas amount $M_c$ solely based on the four parameters.

Next, the intake pipe model M12 and the EGR control valve model M14 will be described in detail.

The intake pipe model M12 calculates the intake pipe pressure $P_m$ and the intake pipe temperature $T_m$ by substituting the throttle passing air flow rate $m_t$, cylinder incoming gas flow rate $m_c$, atmospheric temperature $T_a$, EGR valve passing gas flow rate $m_{egr}$ and the exhaust temperature $T_e$ into the following equations (15) and (16), and solving these equations. In the equations (15) and (16), V is volume of the intake pipe portion extending from the throttle valve 18 to the intake valve 6, and is usually a fixed value.

$$\frac{d}{dt}\left(\frac{P_m}{T_m}\right) = \frac{R}{V} \cdot (m_t + m_{egr} - m_c) \tag{15}$$

$$\frac{dP_m}{dt} = \kappa \cdot \frac{R}{V} \cdot (m_t \cdot T_a + m_{egr} \cdot T_e - m_c \cdot T_m) \tag{16}$$

Figure 11:
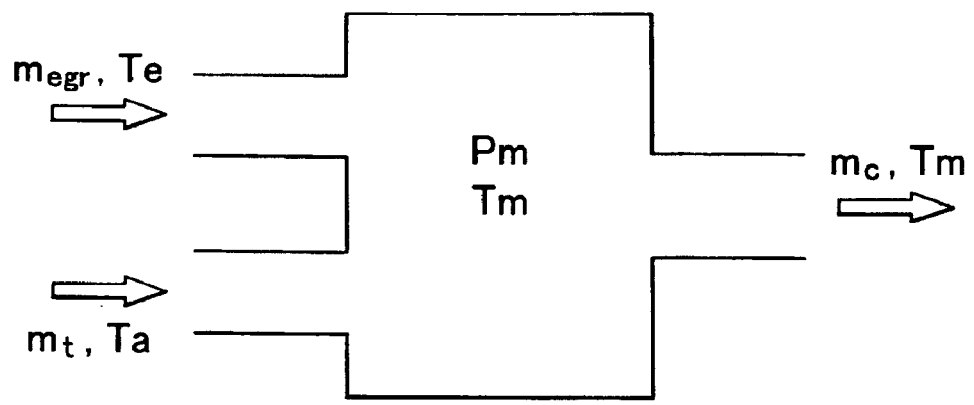
FIG. 11 is a view showing the basic concept of an intake pipe model that may be applied to the engine equipped with the EGR system.

As explained above with respect to the intake pipe model M22, the equations (15) and (16) are derived on the basis of a model as shown in FIG. 11, with respect to the intake pipe portion, from equations of relationships established based on the law of conservation of mass and the law of conservation of energy among air flowing into the intake pipe portion, exhaust gas flowing into the intake pipe portion, and gas flowing from the intake pipe portion into the cylinder.

The EGR control valve model M14 calculates the EGR valve passing gas flow rate $m_{egr}$ by substituting the EGR opening $\theta_e$, intake pipe pressure $P_m$, exhaust pressure $P_e$ and the exhaust temperature $T_e$ into the following expression (17).

$$m_{egr} = \mu_e(\theta_e) \cdot A_e(\theta_e) \cdot \frac{P_e}{\sqrt{R \cdot T_e}} \cdot \Phi\left(\frac{P_m}{P_e}\right) \tag{17}$$

In the above equation (17), $\mu_e$ is flow coefficient at the EGR control valve 22, which is a function of the EGR opening $\theta_e$, and $A_e$ is opening cross-sectional area of the EGR control valve 22, which is a function of the EGR opening $\theta_e$. Also, R is a constant related to a gas constant, namely, a value obtained by dividing the gas constant $R^*$ by the mass $M_e$ of exhaust gas per mole ($R = R^*/M_e$). $P_e$ is pressure of exhaust gas upstream of the EGR control valve 22, and $T_e$ is temperature of the exhaust gas upstream of the EGR control valve 22.

In the same equation (17), $\Phi(P_m/P_e)$ is a function using $P_m/P_e$ as a variable, and is expressed by the following equation (18).

$$\Phi\left(\frac{P_m}{P_e}\right) = \begin{cases} \sqrt{\dfrac{\kappa}{2(\kappa+1)}} & \cdots \dfrac{P_m}{P_e} \leq \dfrac{1}{\kappa+1} \\ \sqrt{\left\{\left(\dfrac{k-1}{2\kappa}\right) \cdot \left(1 - \dfrac{P_m}{P_e}\right) + \dfrac{P_m}{P_e}\right\} \cdot \left(1 - \dfrac{P_m}{P_e}\right)} & \cdots \dfrac{P_m}{P_e} > \dfrac{1}{\kappa+1} \end{cases} \tag{18}$$

The above equation (18) is obtained by replacing variable $P_m/P_a$ of the above-indicated equation (2) by variable $P_m/P_e$. In the equation (18), $\kappa$ is ratio of specific heat, and is a fixed value in this embodiment.

The above-indicated function $\Phi(P_m/P_e)$ and $P_m/P_e$ have a relationship similar to that as shown in FIG. 5. Thus, a map for calculating the function $\Phi(P_m/P_e)$ using $P_m/P_e$ as a variable may be stored in advance in the ROM 34, in place of the above equation (18), and the value of the function $((P_m/P_e)$ may be calculated from $P_m/P_e$ and this map.

Figure 12:
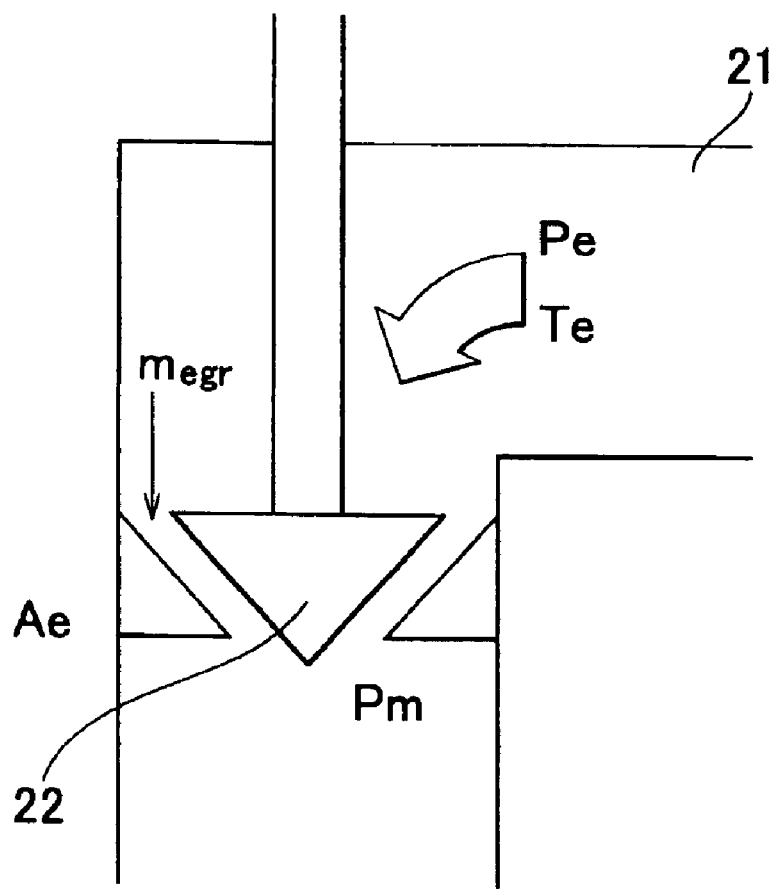
FIG. 12 is a view showing the basic concept regarding calculation of the EGR valve passing gas flow rate.

The above-indicated equations (17) and (18) are derived on the basis of a model as shown in FIG. 12, with respect to the EGR control valve 22, by using the exhaust pressure $P_e$ as the pressure of exhaust gas upstream of the EGR control valve 22, exhaust temperature $T_e$ as the temperature of exhaust gas upstream of the EGR control valve 22, and the intake pipe pressure $P_m$ as the pressure of exhaust gas that has passed the EGR control valve 22. These equations (17) and (18) are derived from equations of relationships established based on the law of conservation of mass, the law of conservation of energy and the law of conservation of momentum between the exhaust gas upstream of the EGR control valve 22 and the exhaust gas that has passed the EGR control valve 22, and the equation of state of gas, equation that defines the ratio of specific heat, and the equation according to the Mayer's relationship. Thus, the basic concept in deriving the above equations (17) and (18) is similar to that in deriving the equations (1) and (2) for calculating the throttle passing air flow rate.

In the present embodiment as described above, the EGR valve passing gas flow rate is calculated by substituting the exhaust pressure $P_e$, exhaust temperature $T_e$, intake pipe pressure $P_m$ and the EGR opening $\theta_e$ into the mathematical equations, and performing numerical computations. Accordingly, the number of maps used for the computations is reduced, and the effort in preparing the maps can be significantly reduced.

Next, a method of calculating an in-cylinder charged fresh air amount $M_{c-air}$ when the in-cylinder gas amount model M10 is actually installed in the engine will be described.

While the in-cylinder charged gas amount $M_{c-air}$ is calculated according to the above-indicated equations (1), (2), (7) and (15)–(18) of the respective models of the in-cylinder gas amount model M10, these seven equations are discretely expressed so as to permit processing by the ECU 31 when the model M10 is actually installed in the engine. Namely, where t represents time and $\Delta t$ represents calculation interval (calculation period), the equations (1), (2) and (7) are discretely expressed by the above-indicated equations (8), (9) and (12), respectively, and the equations (15)–(18) are discretely expressed by the following equations (19)–(22).

$$\frac{P_m}{T_m}(t+\Delta t) = \frac{P_m}{T_m}(t) + \Delta t \cdot \frac{R}{V} \cdot (m_i(t) + m_{egr}(t) - m_c(t)) \quad (19)$$

$$P_m(t+\Delta t) = P_m(t) + \Delta t \cdot \kappa \cdot \frac{R}{V}(m_i(t) \cdot T_a + m_{egr}(t) \cdot T_e(t) - m_c(t) \cdot T_m(t)) \quad (20)$$

$$m_{egr}(t) = \mu_e(\theta_e(t)) \cdot A_e(\theta_e(t)) \cdot \frac{P_e(t)}{\sqrt{R \cdot T_e}} \cdot \Phi\!\left(\frac{P_m(t)}{P_e(t)}\right) \quad (21)$$

$$\Phi\!\left(\frac{P_m(t)}{P_e(t)}\right) = \quad (22)$$

$$\begin{cases} \sqrt{\dfrac{\kappa}{2(\kappa+1)}} & \cdots \dfrac{P_m(t)}{P_e(t)} \le \dfrac{1}{\kappa+1} \\[2mm] \sqrt{\left(\dfrac{k-1}{2\kappa}\right)\cdot\left(1-\dfrac{P_m(t)}{P_e(t)}\right)+\dfrac{P_m(t)}{P_e(t)}\cdot\left(1-\dfrac{P_m(t)}{P_e(t)}\right)} & \cdots \dfrac{P_m(t)}{P_e(t)} > \dfrac{1}{\kappa+1} \end{cases}$$

Also, the equations for calculating the exhaust pressure $P_e$ and the exhaust temperature $T_e$ are discretely expressed by the following equations (23) and (24). These equations will be described in detail later.

$$P_e(t)=f_1(KL(t), NE(t)) \quad (23)$$

$$T_e(t)=f_2(m_{egr}(t-\Delta t), NE(t)) \quad (24)$$

The in-cylinder gas amount model M10 thus discretely expressed and actually installed in the engine calculates the intake pipe pressure $P_m(t+\Delta t)$ and intake pipe temperature $T_m(t+\Delta t)$ at time $(t+\Delta t)$, by substituting the throttle passing air flow rate $m_t(t)$ at time t, which is calculated by the throttle model M11, EGR valve passing gas flow rate $m_{egr}(t)$ at time t, which is calculated by the EGR control valve model M14, cylinder incoming gas flow rate $m_c(t)$ at time t, which is calculated by the intake valve model M13, and the exhaust temperature $T_e(t)$ at time t into the equations (19) and (20) of the intake pipe model M12, and solving these equations (19) and (20).

The throttle passing air flow rate $m_t(t+\Delta t)$ at time $(t+\Delta t)$ is calculated by substituting the intake pipe pressure $P_m(t+\Delta t)$ at time $(t+\Delta t)$, which is calculated by the intake pipe model M12, and the throttle opening $\theta_t(t+\Delta t)$ at time $(t+\Delta t)$ into the above equations (8) and (9) of the throttle model M11, and solving these equations.

The cylinder incoming gas flow rate $m_c(t+\Delta t)$ at time $(t+\Delta t)$ is calculated by substituting the intake pipe pressure $P_m(t+\Delta t)$ and intake pipe temperature $T_m(t+\Delta t)$ at time $(t+\Delta t)$, which are calculated by the intake pipe model M12, into the equation (12) of the intake valve model M13, and solving this equation.

The cylinder incoming fresh air flow rate $m_{c-air}(t+\Delta t)$ at time $(t+\Delta t)$ is calculated by substituting the cylinder incoming gas flow rate $m_c(t+\Delta t)$ at time $(t+\Delta t)$, which is calculated by the intake pipe model M12, and the EGR valve passing gas flow rate $m_{egr}(t)$ at time t, which was calculated by the EGR control valve model M14 in the last control cycle, into the equation (14), and solving this equation.

The EGR valve passing gas flow rate $m_{egr}(t+\Delta t)$ at time $(t+\Delta t)$ is calculated by substituting the intake pipe pressure $P_m(t+\Delta t)$ at time $(t+\Delta t)$, which is calculated by the intake pipe model M12, exhaust pressure $P_e(t+\Delta t)$ at time $(t+\Delta t)$ and the EGR opening $\theta_e(t+\Delta t)$ at time $(t+\Delta t)$ into the equations (21) and (22) of the EGR control valve model M14, and solving these equations.

The exhaust pressure $P_e(t+\Delta t)$ at time $(t+\Delta t)$ is calculated by substituting the engine load factor $KL(t+\Delta t)$ at time $(t+\Delta t)$ and the engine speed NE at time $(t+\Delta t)$ into the equation (23), and solving this equation. Also, the exhaust temperature $T_e(t+\Delta t)$ at time $(t+\Delta t)$ is calculated by substituting the EGR valve passing gas flow rate $m_{egr}(t)$ at time t and the engine speed $NE(t+\Delta t)$ at time $(t+\Delta t)$ into the equation (24), and solving this equation.

The $m_c(t+\Delta t)$, $m_{egr}(t+\Delta t)$ and $m_t(t+\Delta t)$ calculated as described above are substituted again into the equations (19) and (20) of the intake pipe model M12.

By repeating the above calculations, the cylinder incoming fresh air flow rate $m_{c-air}$ at a certain point of time is calculated. Then, the in-cylinder charged fresh air amount $M_{c-air}$ for each cylinder at a certain point of time is calculated by multiplying the thus calculated cylinder incoming fresh air flow rate $m_{c-air}$ by time obtained by dividing the time required for one cycle by the number of cylinders, as described above.

Upon a start of the engine, namely, at time t=0, the calculations by the models M11–M13 are started on the assumptions that the intake pipe pressure $P_m$ is equal to the atmospheric pressure $P_a(P_m(0)=P_a)$, and that the intake pipe temperature $T_m$ and the exhaust temperature $T_e$ are equal to the atmospheric temperature $T_a(T_m(0)=T_a, T_e(0)=T_a)$.

As the atmospheric pressure $P_a$ and the atmospheric temperature $T_a$ used by the above-described in-cylinder gas amount model M10 may be usually used the atmospheric pressure and the atmospheric temperature detected at the time when the calculation of the model M10 is started, or may be used the atmospheric pressure $P_a(t)$ and the atmospheric temperature $T_a(t)$ detected at time t.

In the present embodiment, the EGR valve passing gas flow rate $m_{egr}$ is calculated from the equation (17) using four parameters, i.e., the exhaust pressure $P_e$, exhaust temperature $T_e$, intake pipe pressure $P_m$ and the EGR opening $\theta_e$. However, the EGR valve passing gas flow rate $m_{egr}$ may be determined from an equation that uses these four parameters but is different from the equation (17), or may be determined from a map using these four parameters as arguments.

Since the EGR valve passing gas flow rate is calculated with high accuracy according to the present embodiment, the in-cylinder charged fresh air amount is also calculated with high accuracy based on the EGR valve passing gas flow rate, and therefore the fuel injection amount for making the air/fuel ratio equal to the target air/fuel ratio is calculated with high accuracy.

Furthermore, the opening angle of the EGR control valve 22 may be feedback-controlled by using the EGR valve passing gas flow rate calculated according to the present embodiment, so that the EGR valve passing gas flow rate becomes equal to a target value thereof.

Next, a method of deriving the above-indicated equation (23) for calculating the exhaust pressure will be described.

The engine load factor (%) is the ratio of the amount (g) of air actually contained in the cylinder to the amount (g) of gas that fills the maximum volume of the cylinder under standard conditions. The engine load factor (%) is determined from the following equation (25).

$$KL\ (\%) = \frac{M_{c\text{-}air}}{\frac{DSP}{NCYL} \cdot \rho_{astd}} \cdot 100 \qquad (25)$$

In the above equation (25), $M_{c\text{-}air}$ is in-cylinder charged fresh air amount (g) as the amount of fresh air charged in each cylinder at the time when the intake valve is closed, and DSP is displacement (liter) of the engine. In the same equation, NCYL is the number of cylinders, and $\rho_{astd}$ is density (about 1.2 g/liter) of air under standard conditions (i.e., at 1 atmospheric pressure, 25° C.).

Figure 13:
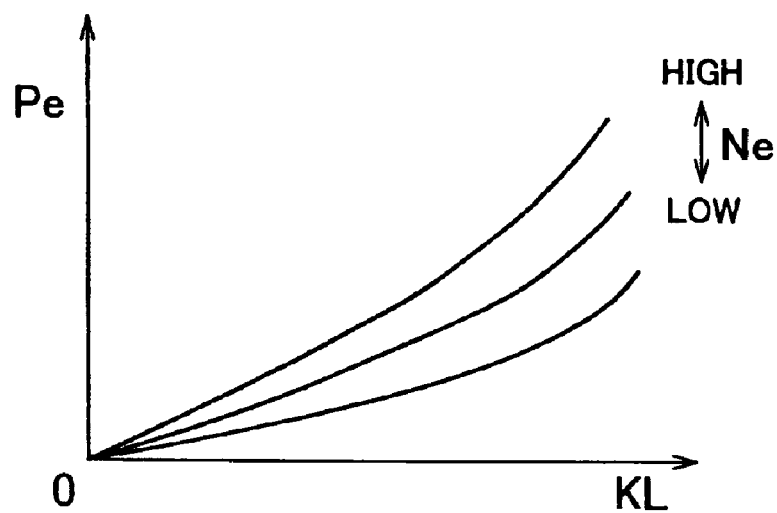
FIG. 13 is a graph showing the relationship between the engine load factor and the exhaust pressure.

Referring to FIG. 13 showing the relationship among the engine load factor KL, engine speed NE and the exhaust pressure $P_e$, the exhaust pressure $P_e$ increases as the engine load factor KL increases, and the exhaust pressure $P_e$ increases as the engine speed NE increases. Since the exhaust pressure $P_e$ mainly and greatly depends upon the engine load factor KL and the engine speed NE, the exhaust pressure $P_e$ determined based on the engine load factor KL and the engine speed NE has a relatively high degree of accuracy.

Accordingly, the exhaust pressure $P_e$ may be expressed by function $f_1(KL, NE)$ using the engine load factor KL and the engine speed NE as variables, as indicated in the equation (23). In the first embodiment, the function $f_1(KL, NE)$ is stored in advance in the ROM 34 in the form of a map having the engine load factor KL and the engine speed NE as variables, and the exhaust pressure $P_e$ is calculated from the engine load factor KL, engine speed NE and this map.

The above arrangement eliminates a need to provide the engine with a sensor for detecting the exhaust pressure, and thus permits accurate detection of the exhaust pressure without increasing the cost of the engine. With the exhaust pressure thus accurately determined, the EGR valve passing gas flow rate $m_{egr}$ can be calculated with high accuracy.

In this connection, a conventional method of determining the exhaust pressure by using a map, without using a sensor, in the engine equipped with the EGR system employs a map having, as arguments, a large number of parameters, such as the engine speed, fuel injection amount, fuel ignition timing, and the EGR rate (the ratio of the amount (g) of exhaust gas to the amount (g) of gas contained in the cylinder). In the present embodiment, on the other hand, the engine load factor is employed as a parameter, and the map having only the engine load factor and the engine speed as arguments is used, which leads to a reduction in the effort in preparing the map. Needless to say, the exhaust pressure may be detected by using a sensor if the resulting increase in the cost of the engine does not matter.

When the exhaust pressure is calculated from the above-described function $f_1$, the in-cylinder charged fresh air flow rate $m_{c\text{-}air}$ may be used as a variable, in place of the engine speed NE.

Next, a method of deriving the equation (24) for calculating the exhaust temperature $T_e$ will be described.

Figure 14:
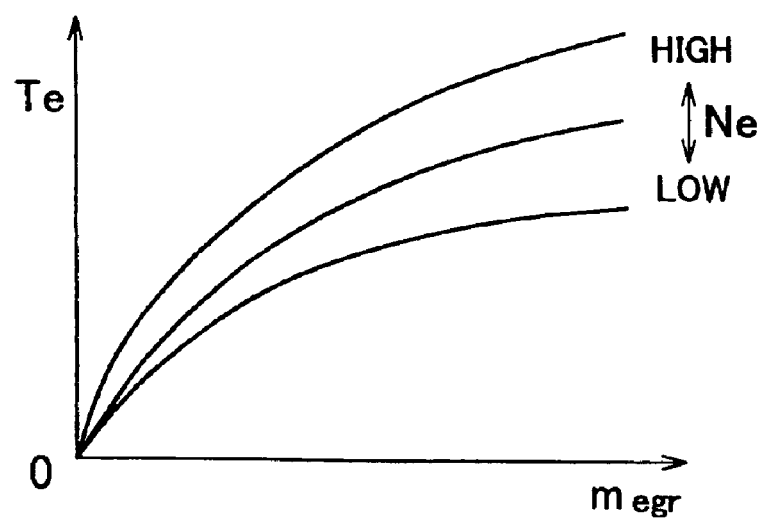
FIG. 14 is a graph showing the relationship between the EGR valve passing gas flow rate and the exhaust temperature.

The quantity of heat produced by exhaust gas that newly flows into the EGR passage 21 will be called "input heat quantity", and the quantity of heat dissipated from the EGR passage 21 to the atmosphere will be called "dissipated heat quantity". If the EGR valve passing gas flow rate $m_{egr}$ increases, namely, if the amount of exhaust gas flowing into the EGR passage 21 increases, the input heat quantity becomes larger than the dissipated heat quantity. Accordingly, if the EGR valve passing gas flow rate $m_{egr}$ increases, the exhaust temperature rises. Meanwhile, if the engine speed increases, the temperature of exhaust gas discharged from the cylinders rises. Thus, the EGR valve passing gas flow rate $m_{egr}$, engine speed NE and the exhaust temperature $T_e$ have relationships as shown in FIG. 14.

Since the exhaust temperature $T_e$ mainly and greatly depends upon the EGR valve passing gas flow rate $m_{egr}$ and the engine speed NE, the exhaust temperature determined based on the EGR valve passing gas flow rate $m_{egr}$ and the engine speed NE has a relatively high degree of accuracy.

Accordingly, the exhaust temperature $T_e$ can be expressed by function $f_2(m_{egr}, NE)$ having the EGR valve passing gas flow rate $m_{egr}$ and the engine speed NE as variables, as indicated above in the equation (24). In the first embodiment, the function $f_2(m_{egr}, NE)$ is stored in advance in the ROM 34 in the form of a map having the EGR valve passing gas flow rate $m_{egr}$ and the engine speed NE as variables, and the exhaust temperature $T_e$ is calculated from the EGR valve passing gas flow rate $m_{egr}$, engine speed NE and this map.

The above arrangement eliminates a need to provide the engine with a sensor for detecting the exhaust temperature, and thus permits accurate detection of the exhaust temperature without increasing the cost of the engine. With the exhaust temperature thus accurately determined, the EGR valve passing gas flow rate $m_{egr}$ can be calculated with high accuracy. Needless to say, the exhaust temperature may be detected by using a sensor if the resulting increase in the cost of the engine does not matter.

Since the temperature of the exhaust gas discharged from the cylinder varies depending upon the engine speed NE, the exhaust gas temperature may be determined from a one-dimensional map having the engine speed NE as an argument. However, the EGR control valve model M14 is able to calculate the EGR valve passing gas flow rate $m_{egr}$ with higher accuracy by using the temperature of exhaust gas upstream of the EGR control valve 22 as the exhaust temperature $T_e$, rather than using the temperature of exhaust gas discharged from the cylinder as the exhaust temperature $T_e$.

In the present embodiment, the temperature of the exhaust gas upstream of the EGR control valve 22 is used as the exhaust temperature $T_e$ for use in calculation of the EGR valve passing gas flow rate $m_{egr}$, and therefore the EGR valve passing gas flow rate $m_{egr}$ can be calculated with high accuracy.

When the exhaust temperature is calculated from the above-indicated function $f_2$, the in-cylinder charged fresh air flow rate $m_{c\text{-}air}$ may be used as a variable, instead of the engine speed NE.

In the above-described embodiment, various calculations or computations are performed on the assumption that the engine is in a steady-state operation, in which the flow rate of exhaust gas flowing into the intake pipe portion (which will be called "pipe incoming exhaust gas flow rate") is supposed to be equal to the EGR valve passing gas flow rate, and the flow rate of exhaust gas flowing into the cylinder (which will be called "cylinder incoming exhaust gas flow rate") is also supposed to be equal to the EGR valve passing gas flow rate.

However, if the EGR opening and the EGR valve passing gas flow rate change during transient operation of the engine, for example, the pipe incoming exhaust gas flow rate and the cylinder incoming exhaust gas flow rate temporarily become different from the EGR valve passing gas flow rate. Namely, the pipe incoming exhaust gas flow rate and the cylinder incoming exhaust gas flow rate follow changes in the EGR valve passing gas flow rate, but change with certain delay.

To maintain high accuracy of the parameter values calculated in the above-described embodiment during transient engine operation, therefore, it needs to be taken into consideration that the pipe incoming exhaust gas flow rate and the cylinder incoming exhaust gas flow rate change with delay in response to changes in the EGR valve passing gas flow rate.

Figure 15:
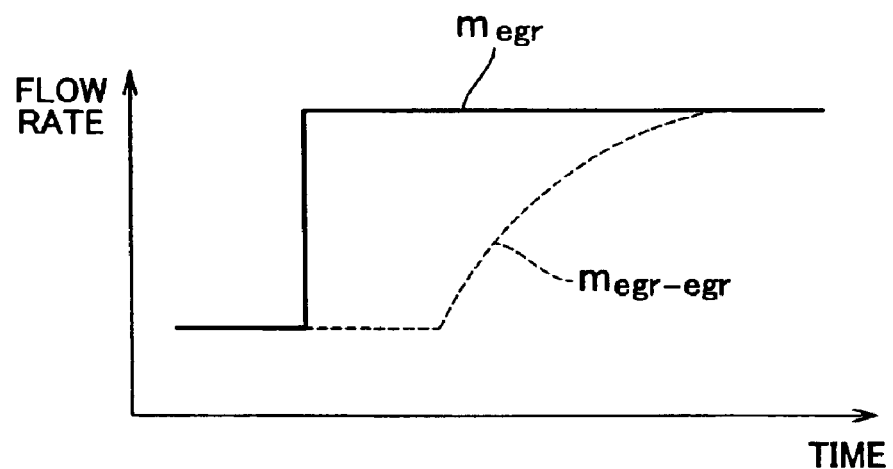
FIG. 15 is a graph showing changes in the pipe incoming exhaust gas flow rate in response to a change in the EGR valve passing gas flow rate.

The variation in the pipe incoming exhaust gas flow rate in response to a change in the EGR valve passing gas flow rate will be now discussed. As shown in FIG. 15, the pipe incoming exhaust gas flow rate $m_{egr\text{-}egr}$ does not change until a certain time Td elapses after the EGR valve passing gas flow rate $m_{egr}$ changes, and then starts changing with a first-order lag toward the EGR valve passing gas flow rate $m_{egr}$ upon a lapse of the time Td.

The above-indicated time Td is a period of time required for the exhaust gas passing the EGR control valve 22 to reach the intake pipe portion. The time period Td becomes shorter as the flow rate or speed of the exhaust gas passing the EGR control valve 22 is greater, or the intake pipe pressure is lower, or the engine speed is higher. Namely, the time Td (which will be called "waste time") is a function of the engine speed, as shown in FIG. 16A.

Meanwhile, the time constant τ of the first lag represents the likelihood of diffusion of the exhaust gas that has passed the EGR control valve 22. Thus, the time constant τ is reduced as the flow rate or speed of the exhaust gas passing the EGR control valve 22 is greater, or the intake pipe pressure is lower, or the engine speed is higher. Namely, the time constant τ is also a function of the engine speed, as shown in FIG. 16B.

Figure 16A:
FIG. 16A and FIG. 16B are graphs showing waste time Td1 and time constant τ1, respectively, associated with the pipe incoming exhaust gas flow rate.

In the present embodiment, the waste time Td1 is stored in advance in the ROM 34 in the form of a map as shown in FIG. 16A. When the EGR valve passing gas flow rate changes, the waste time Td1 is calculated based on the engine speed NE, and the pipe incoming exhaust gas flow rate is calculated on the assumption that the pipe incoming exhaust gas flow rate starts changing toward the EGR valve passing gas flow rate upon a lapse of the waste time Td1.

Figure 16B:

In the present embodiment, the time constant τ1 is stored in advance in the ROM 34 in the form of a map as shown in FIG. 16B. When the EGR valve passing gas flow rate changes, the time constant τ1 is calculated based on the engine speed NE, and the pipe incoming exhaust gas flow rate is calculated on the assumption that the pipe incoming exhaust gas flow rate changes toward the EGR valve passing gas flow rate with the time constant τ1 after the waste time Td1.

The above concepts of the waste time and the first lag regarding the pipe incoming exhaust gas flow rate are equally applied to those regarding the cylinder incoming gas flow rate.

Figure 17A:
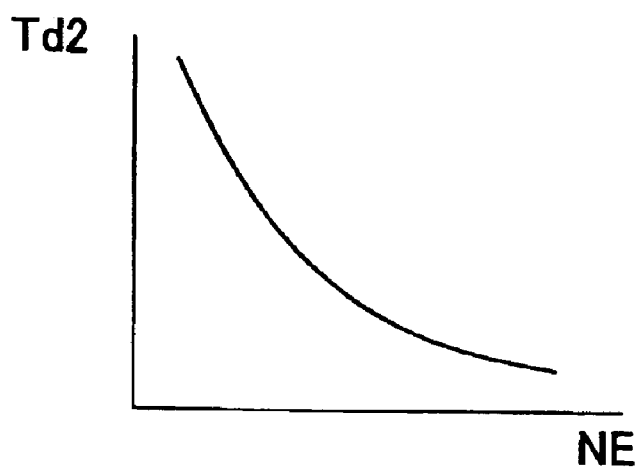
FIG. 17A and FIG. 17B are graphs showing waste time Td2 and time constant τ2, respectively, associated with the cylinder incoming exhaust gas flow rate.

In the present embodiment, the waste time Td2 associated with the cylinder incoming exhaust gas flow rate is stored in advance in the ROM 34 in the form of a map as shown in FIG. 17A. When the EGR valve passing gas flow rate changes, the waste time Td2 is calculated based on the engine speed NE, and the cylinder incoming exhaust gas flow rate is calculated on the assumption that the cylinder incoming exhaust gas flow rate starts changing toward the EGR valve passing gas flow rate upon a lapse of the waste time Td2.

Figure 17B:
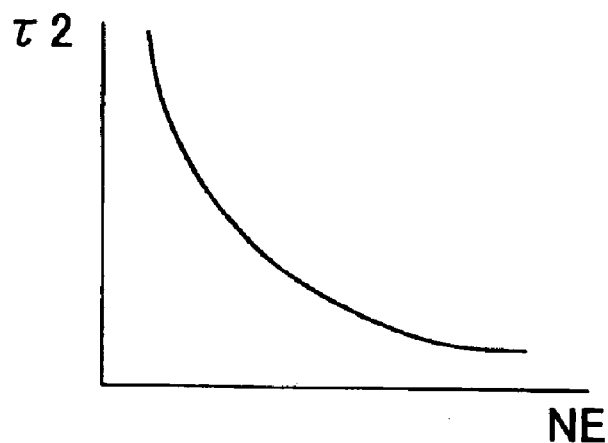

Also, the time constant τ2 is stored in advance in the ROM 34 in the form of a map as shown in FIG. 17B. When the EGR valve passing gas flow rate changes, the time constant τ2 is calculated based on the engine speed NE, and the cylinder incoming exhaust gas flow rate is calculated on the assumption that the cylinder incoming exhaust gas flow rate changes toward the EGR valve passing gas flow rate with the time constant τ2 after the waste time Td2.

Since the distance from the EGR control valve 22 to the cylinder is longer than the distance from the EGR control valve 22 to the intake pipe portion, the waste time Td2 associated with the cylinder incoming exhaust gas flow rate is likely to be longer than the waste time Td1 associated with the pipe incoming exhaust gas flow rate, and the time constant τ2 associated with the cylinder incoming exhaust gas flow rate is likely to be larger than the time constant τ1 associated with the pipe incoming exhaust gas flow rate.

While the EGR valve passing gas flow rate $m_{egr}$ is calculated according to mathematical equations, i.e., the above-indicated equations (17) and (18) in the first embodiment, the inventors developed a method of relatively easily calculating the EGR valve passing gas flow rate $m_{egr}$, without using these equations. Thus, the EGR valve passing gas flow rate may be calculated by using the method as described below, instead of using the equations (17) and (18).

It is known that the in-cylinder charged gas amount $M_c$ is represented by a linear function of the intake pipe pressure $P_m$ detected at the time of closing of the intake valve 6. Namely, according to the theoretical and empirical rules, the in-cylinder charged gas amount $M_c$ is proportional to the in-cylinder pressure detected at the time of closing of the intake valve 6, and the in-cylinder pressure is substantially equal to the pressure of the mixed gas present upstream of the intake valve 6, i.e., the intake pipe pressure $P_m$.

When no EGR gas is supplied to the intake system, only fresh air is drawn into the cylinder, and therefore the in-cylinder charged fresh air amount $M_{c\text{-}air}$ at this time, or the engine load factor KL, can be represented by a linear function of the intake pipe pressure $P_m$. Thus, the engine load factor KL can be easily and accurately determined.

In the situation where EGR gas is supplied to the intake system, which is totally different from the above situation, EGR gas as well as fresh air is drawn or charged into the cylinder. Therefore, it was conventionally considered impossible to represent the in-cylinder charged fresh air amount $M_{c-air}$, or the engine load factor KL, by a linear function of the intake pipe pressure $P_m$.

If the in-cylinder charged EGR gas amount $M_{c-egr}$ can be represented by a linear function of the intake pipe pressure $P_m$, the in-cylinder charged fresh air amount $M_{c-air}$, or the engine load factor KL, during supply of EGR gas, can be represented by a linear function of the intake pipe pressure $P_m$ because the in-cylinder charged gas amount $M_c$ can be represented by a linear function of the intake pipe pressure $P_m$, and the in-cylinder charged gas amount $M_c$ is the sum of the in-cylinder charged fresh air amount $M_{c-air}$ and the in-cylinder charged EGR gas amount $M_{c-egr}$.

However, it was also conventionally considered impossible to represent the in-cylinder charged EGR gas amount $M_{c-air}$ by a linear function of the intake pipe pressure $P_m$. This will be explained with reference to FIG. 12 and FIG. 18.

Figure 18:
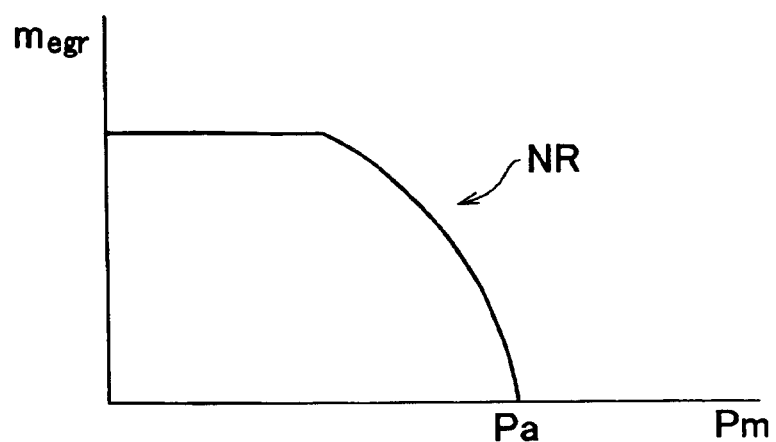
FIG. 18 is a graph useful for explaining the EGR valve passing gas flow rate $m_{egr}$.

As described above, the EGR valve passing gas flow rate $m_{egr}$(g/sec) is represented by the equation (17), and the function $\Phi(P_m/P_e)$ is expressed by the equation (18). Here, if the exhaust pressure $P_e$ is regarded as being equivalent to the atmospheric pressure $P_a$ for simplification of the calculations, the EGR valve passing gas flow rate $m_{egr}$ calculated according to the equation (17) is plotted as shown in FIG. 18. Specifically, the EGR valve passing gas flow rate $m_{egr}$ is kept substantially constant while the intake pipe pressure $P_m$ is relatively small, and decreases nonlinearly with respect to the intake pipe pressure $P_m$ (as indicated by NR in FIG. 18) as the intake pipe pressure $P_m$ increases toward the atmospheric pressure $P_a$. The non-linear portion NR results from $P_e/\sqrt{T_e}$ and the function $\Phi(P_m/P_e)$ in the equation (17).

As is understood from the above description, it was considered impossible to represent the EGR valve passing gas flow rate $m_{egr}$, in particular, the non-linear portion NR, by a linear function of the intake pipe pressure $P_m$. In this connection, if numerous expressions of linear functions are used, the EGR valve passing gas flow rate $m_{egr}$ may be expressed by the linear functions of the intake pipe pressure $P_m$. In this case, however, it cannot be said that the engine load factor KL is calculated in a simple manner.

However, the inventors of the present application found that the EGR valve passing gas flow rate $m_{egr}$ can be expressed by two linear functions of the intake pipe pressure $P_m$, and therefore the in-cylinder charged fresh air amount $M_{c-air}$, or the engine load factor KL, can be expressed by two linear functions of the intake pipe pressure $P_m$.

Figure 19:
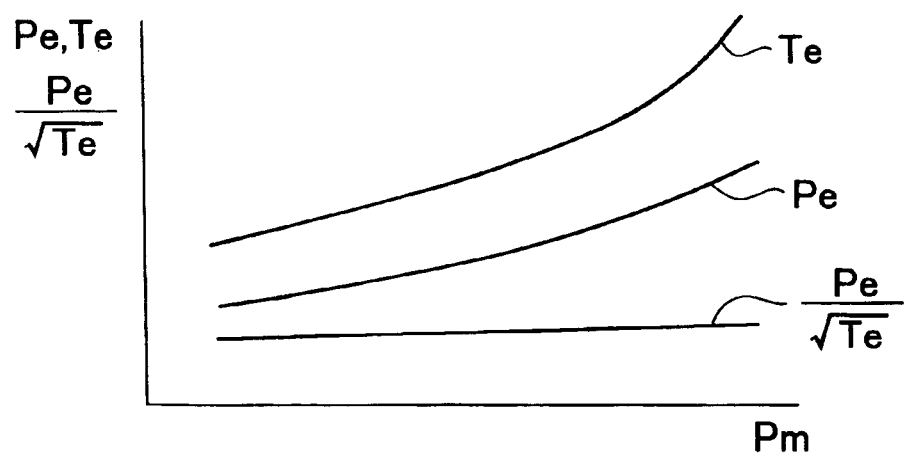
FIG. 19 is a graph showing the exhaust pressure $P_e$, exhaust temperature $T_e$ and $P_e/\sqrt{T_e}$ in relation to the intake pipe pressure $P_m$.

Referring first to FIG. 19, the exhaust temperature $T_e$ increases with an increase in the intake pipe pressure $P_m$ by a larger degree than the exhaust pressure $P_e$, with a result that $P_e/\sqrt{T_e}$ can be expressed by a linear function of the intake pipe pressure $P_m$.

Figure 20A:
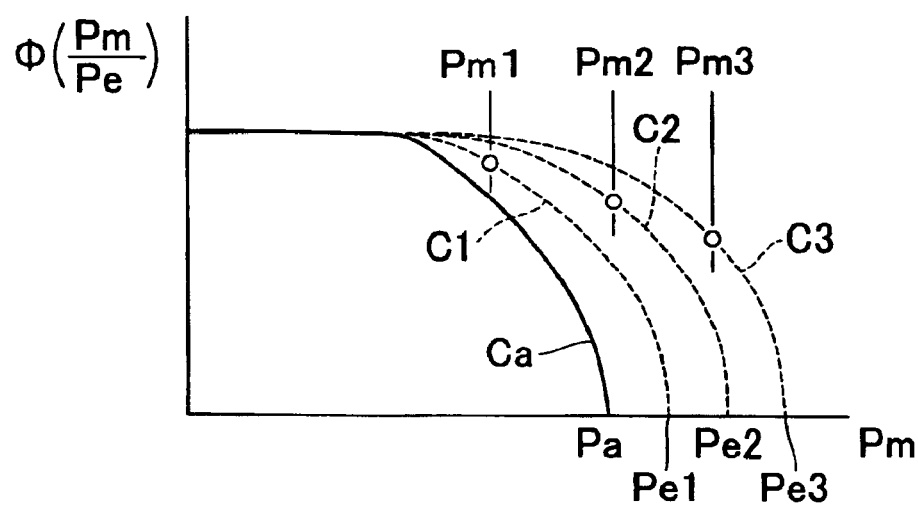
FIG. 20A and FIG. 20B are graphs showing the function $\Phi(P_m/P_e)$.

Also, function $\Phi(P_m/P_e)$ can be expressed by a linear function of the intake pipe pressure $P_m$. This will be explained with reference to FIG. 20A and FIG. 20B. Considering that the exhaust pressure $P_e$ is not kept equal to a given atmospheric pressure $P_a$ but varies depending upon the intake pipe pressure $P_m$, the value of the function $\Phi(P_m/P_e)$ obtained when the intake pipe pressure $P_m$ is equal to $P_m1$ does not lie on curve $C_a$ that reaches zero at the atmospheric pressure $P_a$, but lies on curve C1 that reaches zero at the exhaust pressure $P_e1$, as shown in FIG. 20A in which a plot (O) on curve C1 denotes the value of the function $\Phi(P_m/P_e)$ at the intake pipe pressure $P_m1$. Similarly, the value of the function $\Phi(P_m/P_e)$ obtained when the intake pipe pressure $P_m$ is equal to $P_m2(>P_m1)$ lies on curve C2 that reaches zero at the exhaust pressure $P_e2(>P_e1)$, and the value of the function $\Phi(P_m/P_e)$ obtained when the intake pipe pressure $P_m$ is equal to $P_m3(>P_m2)$ lies on curve C3 that reaches zero at the exhaust pressure $P_e3(>P_e2)$.

Figure 20B:
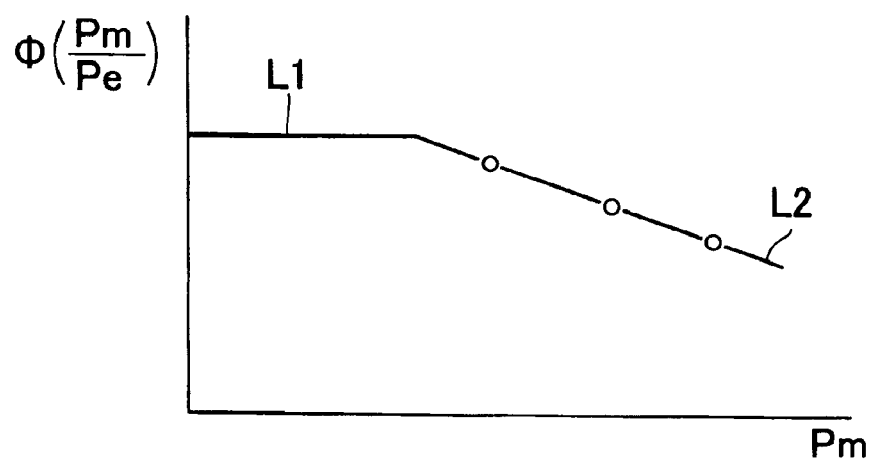

The plots (O) obtained in the above manner can be connected by straight line L2 as shown in FIG. 20B. Accordingly, the function $\Phi(P_m/P_e)$ can be expressed by a linear function of the intake pipe pressure $P_m$ as represented by straight line L1 when the intake pipe pressure $P_m$ is relatively small, and expressed by a linear function of the intake pipe pressure $P_m$ as represented by straight line L2 when the intake pipe pressure $P_m$ is relatively large. Thus, the function $\Phi(P_m/P_e)$ can be expressed by two linear functions of the intake pipe pressure $P_m$. It follows that the EGR valve passing gas flow rate $m_{egr}$ can be expressed by two linear functions of the intake pipe pressure $P_m$.

While the engine is in a steady-state operation, the EGR valve passing gas flow rate $m_{egr}$ (g/sec) and the cylinder incoming gas flow rate $m_{c-egr}$ (g/sec) are equal to each other. Also, the in-cylinder charged EGR gas amount $M_{c-egr}$ is obtained by multiplying the cylinder incoming EGR gas flow rate $m_{c-egr}$ by time required for one suction stroke of each cylinder, namely, time $\Delta T$(sec) as the ratio of the time required for one cycle of the engine to the number of cylinders ($M_{c-egr}=m_{c-egr}\cdot\Delta T$). It follows that the in-cylinder charged EGR gas amount $M_{c-egr}$ during steady-state engine operation can be expressed by linear functions of the intake pipe pressure $P_m$.

Accordingly, while the engine is in a steady-state operation and the EGR gas is supplied to the intake system, the in-cylinder charged fresh air amount $M_{c-air}$, or the engine load factor KL, can be expressed by two linear functions of the intake pipe pressure $P_m$.

Figure 21:
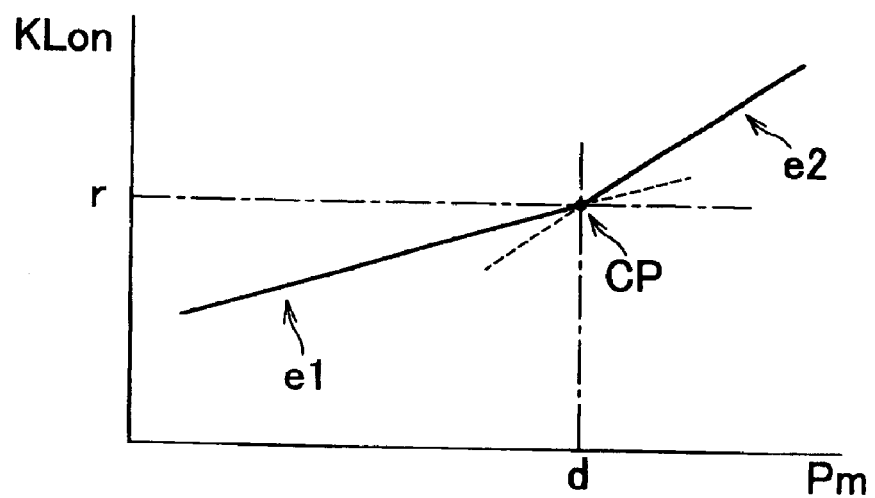
FIG. 21 is a graph showing one example of the relationship between the engine load factor KLon and the intake pipe pressure $P_m$.

In FIG. 21 in which KLon denotes the engine load factor KL when the EGR gas is supplied to the intake system, two linear functions of the intake pipe pressure Pm are shown which represent the engine load factor KLon during steady-state engine operation (for example, when the engine speed NE and the EGR opening $\theta_e$ are kept at given values, respectively). As shown in FIG. 21, the engine load factor KLon is expressed by two straight lines representing two linear functions of the intake pipe pressure $P_m$, which straight lines have different slopes and meet at a connection point CP. Namely, the engine load factor KLon is expressed by one of the linear functions having slope e1 when the intake pipe pressure $P_m$ is relatively small, and is expressed by the other linear function having slope e2 when the intake pipe pressure $P_m$ is relatively high.

Here, these two linear functions can be expressed by the following equations where e1, e2 denote the respective slopes of the two linear functions, and d, r denote intake pipe pressure and engine load factor at the connection point CP, respectively.

$$KLon = e1 \cdot (P_m - d) + r \quad \ldots \quad P_m \leq d$$

$$KLon = e2 \cdot (P_m - d) + r \quad \ldots \quad P_m > d$$

These two equations may be expressed by the following equation (26).

$$KLon = e \cdot (P_m - d) + r \quad (26)$$

$$e = e1 \ldots P_m \leq d$$

$$e = e2 \ldots P_m > d$$

In the present embodiment, the two linear functions of the intake pipe pressure $P_m$, which represent the engine load factor KLon during steady-state engine operation are stored in advance in the ROM 34 in the form of the equation (26) as indicated above. In this case, the two linear functions can be expressed by three parameters e, d and r. Namely, the number of parameters required for expressing the two linear functions can be reduced.

Each of the parameters e, d, r in the equation (26) is calculated according to the following equations:

$$e1 = e1^* \cdot ktha$$

$$e2 = e2^* \cdot ktha$$

$$d = d^* \cdot ktha \cdot kpa$$

$$r = r^* \cdot ktha \cdot kpa$$

where $e1^*$, $e2^*$, $d^*$ and $r^*$ are slopes, intake pipe pressure and engine load factor at the connection point when the ambient conditions of the engine are predetermined reference ambient conditions. While any conditions may be employed as the reference ambient conditions, standard conditions (1 atmospheric pressure, 25° C.) are used as the reference ambient conditions in the present embodiment.

In the above-indicated equations regarding the parameters e, d and r, ktha represents atmospheric temperature correction factor, and kpa represents atmospheric pressure correction factor. The atmospheric temperature correction factor ktha varies with the actual atmospheric temperature detected by the atmospheric temperature sensor 44, and is used for correcting each of the parameters $e1^*$, $e2^*$, $d^*$ and $r^*$ under the reference ambient conditions. This factor ktha is made equal to 1.0 when no correction is needed. The atmospheric pressure correction factor kpa varies with the actual atmospheric pressure detected by the atmospheric pressure sensor 45, and is used for correcting each of the parameters $d^*$, $r^*$ under the reference ambient conditions. This factor kpa is made equal to 1.0 when no correction is needed.

Considering that the atmospheric temperature correction factor ktha and the atmospheric pressure correction factor kpa are representative values that represent the actual ambient conditions of the engine, it can be said that each of the parameters $e1^*$, $e2^*$, $d^*$ and $r^*$ under reference ambient conditions is corrected based on the values representative of the actual ambient conditions of the engine. It can also be said that the engine load factor KLon under the reference ambient conditions is corrected based on the values representative of the actual ambient conditions of the engine.

In the meantime, considering that the opening cross-sectional area $A_e$ of the EGR control valve 22 in the equation (17) depends upon the EGR opening $\theta_e$, and the engine charging efficiency depends upon the engine speed NE, the parameters $e^*$ ($e1^*$, $e2^*$), $d^*$ and $r^*$ are set depending upon the EGR opening $\theta_e$ or the engine speed NE.

Figure 22A:
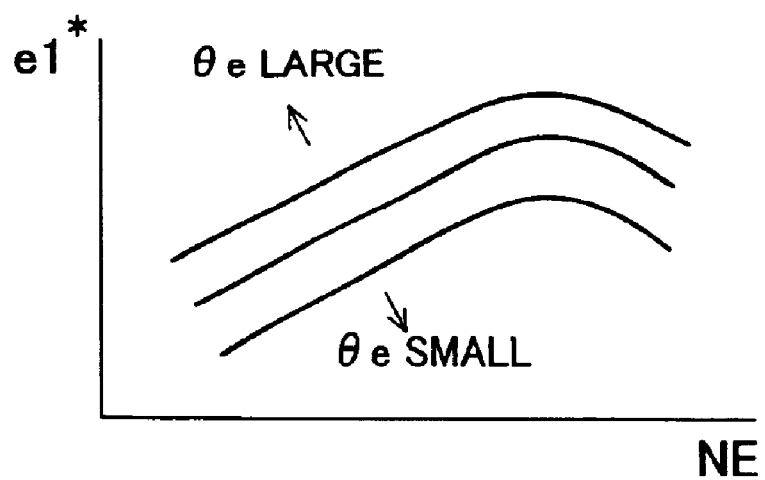
FIG. 22A through FIG. 22D are graphs and maps showing slopes e1, e2.
Figure 22B:
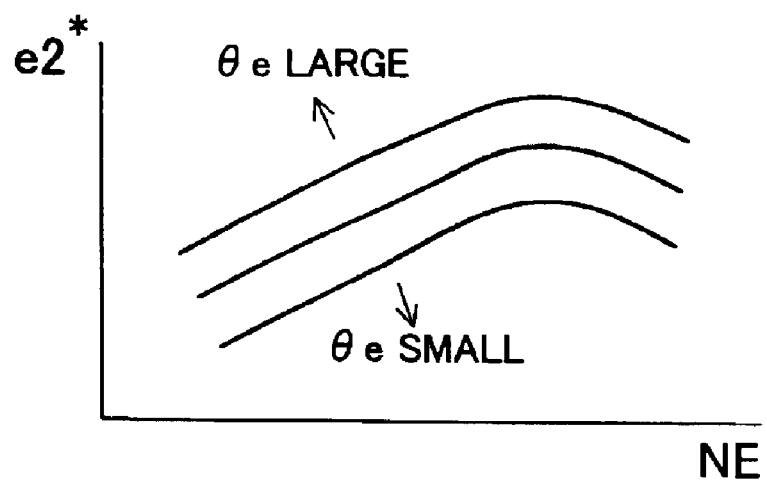
Figure 22C:
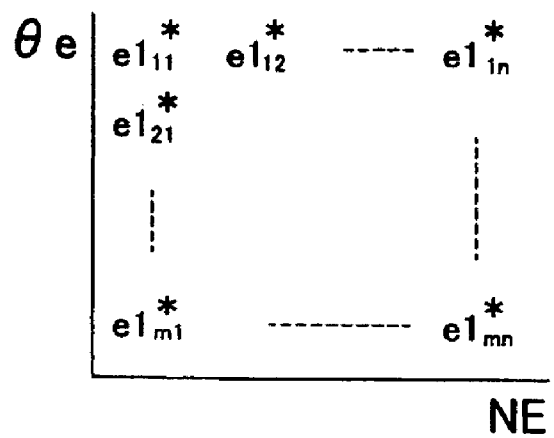
Figure 22D:
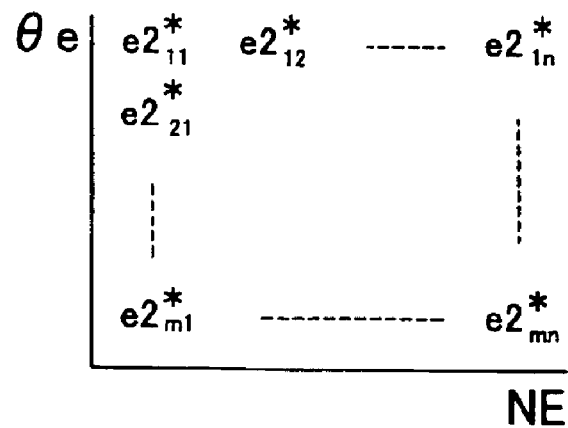

More specifically described with reference to FIG. 22A, the slope $e1^*$ increases as the engine speed NE increases in a relatively low engine speed region, and decreases as the engine speed NE increases in a relatively high engine speed region. Furthermore, the slope $e1^*$ increases as the EGR opening $\theta_e$ increases. As shown in FIG. 22B, the slope $e2^*$ increases as the engine speed NE increases in a relatively low engine speed region, and decreases as the engine speed NE increases in a relatively high engine speed region. Furthermore, the slope $e2^*$ increases as the EGR opening $\theta_e$ increases. These slopes $e1^*$ and $e2^*$ are determined in advance through experiments, and are stored in advance in the ROM 34 in the form of maps as shown in FIG. 22C and FIG. 22D, respectively, as functions of the engine speed NE and the EGR opening $\theta_e$.

Figure 23:
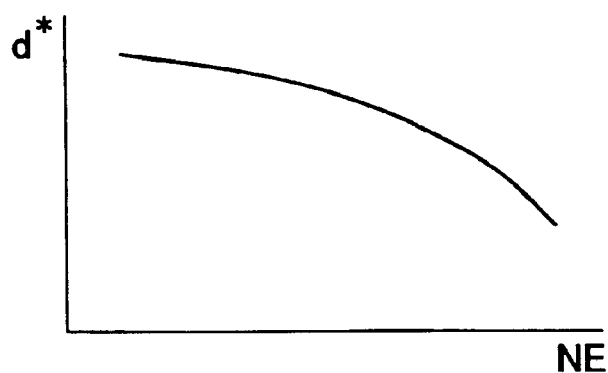
FIG. 23 is a graph showing the intake pipe pressure d at a connection point.

The intake pipe pressure $d^*$ at the connection point CP decreases as the engine speed NE increases, as shown in FIG. 23. The intake pipe pressure $d^*$ at the connection point CP is also determined in advance through experiments, and is stored in advance in the ROM 34 in the form of a map as shown in FIG. 23, as a function of the engine speed NE.

Figure 24A:
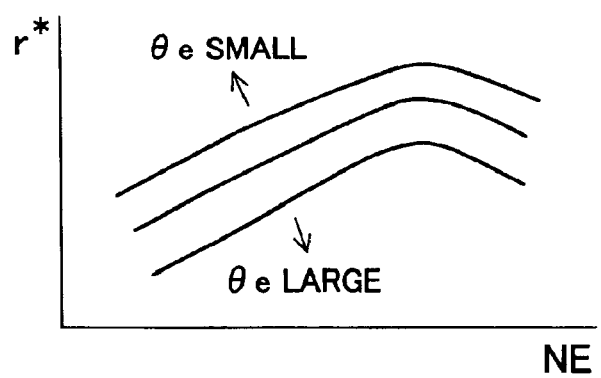
FIG. 24A and FIG. 24B are a graph and a map showing the engine load factor r at the connection point.
Figure 24B:
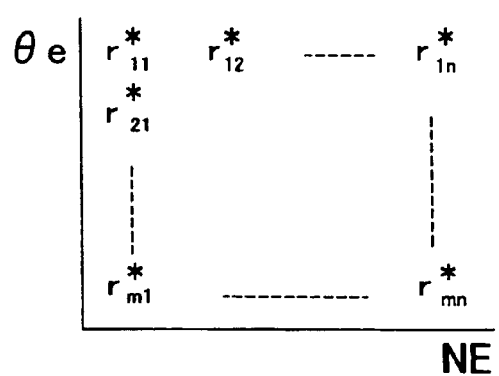

As shown in FIG. 24A, the engine load factor $r^*$ at the connection point CP increases as the engine speed NE increases in a relatively low engine speed region, and decreases as the engine speed NE increases in a relatively high engine speed region. Furthermore, the engine load factor $r^*$ decreases as the EGR opening $\theta_e$ increases. The engine load factor $r^*$ at the connection point CP is also determined in advance through experiments, and is stored in advance in the ROM 34 in the form of a map as shown in FIG. 24B, as a function of the engine speed NE and the EGR opening $\theta_e$.

Accordingly, it may be generally said that two linear functions of the intake pipe pressure $P_m$ representing the in-cylinder charged fresh air amount $M_{c\text{-}air}$, or the engine load factor KLon, during steady-state engine operation are respectively determined and stored in advance, with respect to each of a plurality of different EGR openings $\theta_e$. Also, two linear functions of the intake pipe pressure $P_m$ representing the in-cylinder charged fresh air amount $M_{c\text{-}air}$, or the engine load factor KLon, during steady-state engine operation are respectively determined and stored in advance, with respect to each of a plurality of different engine speeds NE.

Figure 25:
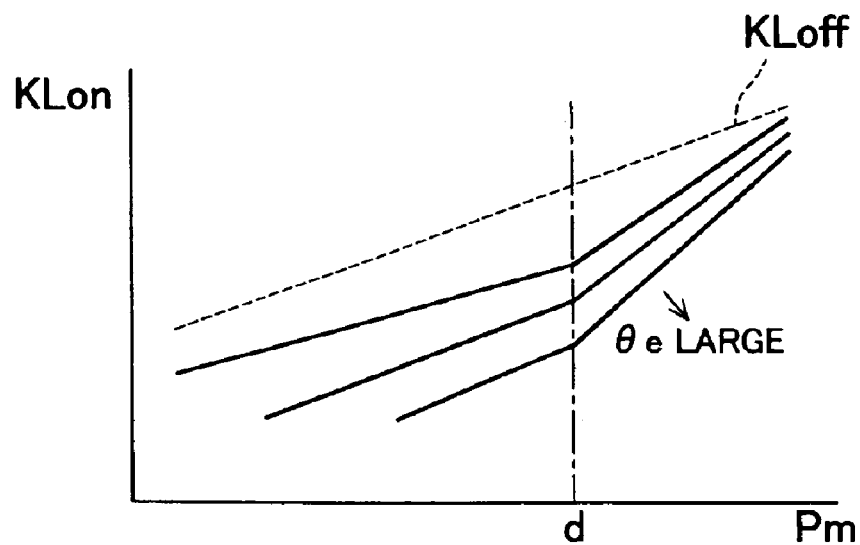
FIG. 25 is a graph showing one example of the relationship between the engine load factor KLon and the intake pipe pressure $P_m$.

FIG. 25 shows some examples of two linear functions of the intake pipe pressure $P_m$ representing the engine load factor KLon when the engine is in a steady-state operation at a given engine speed NE with different EGR openings $\theta_e$. In FIG. 25, the broken line indicates the engine load factor KLoff when no EGR gas is supplied to the intake system, namely, when the EGR opening $\theta_e$ is equal to zero.

Figure 26:
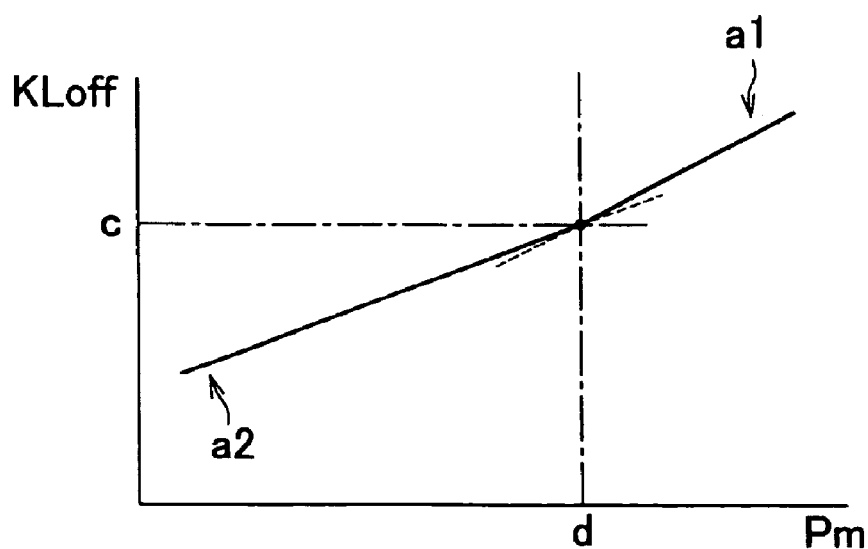
FIG. 26 is a graph showing one example of the relationship between the engine load factor KLoff and the intake pipe pressure $P_m$.

As described above, the engine load factor KLoff when no EGR gas is supplied to the intake system can be expressed by linear functions of the intake pipe pressure $P_m$. FIG. 26 shows one example of two linear functions of the intake pipe pressure $P_m$ representing the engine load factor KLoff during steady-state engine operation (for example, when the engine speed NE is kept constant). In this embodiment, as shown in FIG. 26, the engine load factor KLoff is expressed by two linear functions of the intake pipe pressure $P_m$, namely, two straight lines that have different slopes and meet at a connection point CP. Namely, the engine load factor KLoff is expressed by one of the linear functions having slope a1 when the intake pipe pressure $P_m$ is relatively small, and is expressed by the other linear function having slope a2 when the intake pipe pressure $P_m$ is relatively large.

Here, these two linear functions can be expressed by the following equations where a1, a2 denote the respective slopes of the two linear functions, and "d" and "c" denote intake pipe pressure and engine load factor at the connection point CP, respectively.

$$KLoff = a1 \cdot (P_m - d) + c \ldots P_m \leq d$$

$$KLoff = a2 \cdot (P_m - d) + c \ldots P_m > d$$

These two equations may be expressed by the following equation (27).

$$KLoff = a \cdot (P_m - d) + c \quad (27)$$
$$a = a1 \ldots P_m \leq d$$
$$a = a2 \ldots P_m > d$$

In the present embodiment, the two linear functions of the intake pipe pressure $P_m$, which represent the engine load factor KLoff during steady-state engine operation, are stored in advance in the ROM 34 in the form of the equation (27) as indicated above. In this case, the intake pipe pressure d at the connection point CP is identical with the intake pipe pressure d at the connection point CP associated with the engine load factor KLon as described above. Accordingly, the number of parameters can be further reduced. Needless to say, the intake pipe pressure at the connection point CP associated with the engine load factor KLoff may be difference from that associated with the engine load factor KLon.

The parameters a, c in the above equation (27) are respectively calculated according to the following equations:

$$a1 = a1^* \cdot ktha$$
$$a2 = a2^* \cdot ktha$$
$$c = c \cdot ktha \cdot kpa$$

where $a1^*$, $a2^*$ and $c^*$ are slopes and engine load factor at the connection point when the ambient conditions of the engine are the above-described reference ambient conditions, namely, the standard conditions.

Considering that the atmospheric temperature correction factor ktha and the atmospheric pressure correction factor kpa are representative values that represent the actual ambient conditions of the engine, it can be said that each of the parameters $a1^*$, $a2^*$ and $c^*$ under the reference ambient conditions is corrected based on the values representative of the actual ambient conditions of the engine. In other words, the engine load factor KLoff under the reference ambient conditions is corrected based on the values representative of the actual ambient conditions of the engine.

In the meantime, since the engine charging efficiency depends upon the engine speed NE, the parameters $a^*$ ($a1^*$, $a2^*$) and $c^*$ are set depending upon the engine speed NE in this embodiment.

Figure 27A:
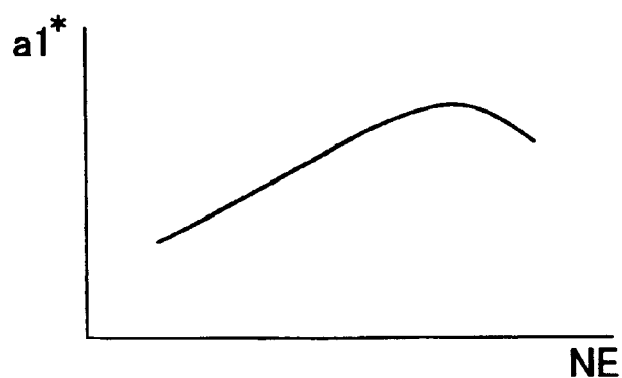
FIG. 27A and FIG. 27B are graphs showing slopes a1 and a2.
Figure 27B:
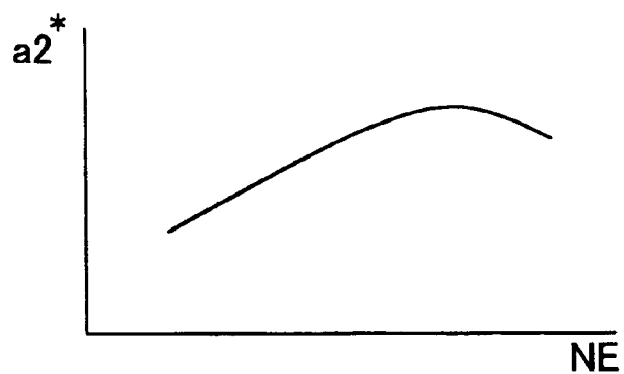

More specifically described with reference to FIG. 27A, the slope $a1^*$ increases as the engine speed NE increases in a relatively low engine speed region, and decreases as the engine speed NE increases in a relatively high engine speed region. As shown in FIG. 27B, the slope $a2^*$ increases as the engine speed NE increases in a relatively low engine speed region, and decreases as the engine speed NE increases in a relatively high engine speed region. These slopes $a1^*$ and $a2^*$ are determined in advance through experiments, and are stored in advance in the ROM 34 in the form of maps as shown in FIG. 27A and FIG. 27B, respectively, as functions of the engine speed NE.

Figure 28:
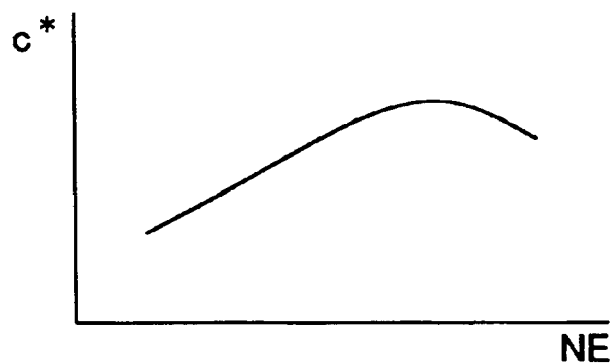
FIG. 28 is a graph showing the engine load factor c at the connection point.

As shown in FIG. 28, the engine load factor $c^*$ at the connection point CP increases as the engine speed NE increases in a relatively low engine speed region, and decreases as the engine speed NE increases in a relatively high engine speed region. The engine load factor $c^*$ at the connection point CP is also determined in advance through experiments, and is stored in advance in the ROM 34 in the form of a map shown in FIG. 28, as a function of the engine speed NE.

Accordingly, it may be generally said that two linear functions of the intake pipe pressure $P_m$ representing the in-cylinder charged fresh air amount $M_{c\text{-}air}$, or the engine load factor KLoff, during steady-state engine operation are determined and stored in advance, with respect to each of a plurality of different engine speeds NE.

As is understood from the above description, if the intake pipe pressure $P_m$ is detected by, for example, the pressure sensor 39, the engine load factor KLon or KLoff can be accurately and easily determined by using the above-indicated equation (26) or (27), based on the detected intake pipe pressure $P_m$. Consequently, the air/fuel ratio can be accurately and easily made equal to the target air/fuel ratio.

Since the engine load factor KLon, KLoff can be expressed by linear functions of the intake pipe pressure $P_m$ as described above, there is no need to prepare a map representing the relationship between the engine load factor KLon, KLoff and the intake pipe pressure $P_m$, thus eliminating any effort in preparing the map. Also, there is no need to solve complicated equations, such as differential equations, and therefore the computing load of the CPU 34 can be reduced.

As is understood from the above equation (25), the engine load factor KL represents the in-cylinder charged fresh air amount $M_{c\text{-}air}$. Since the cylinder is charged solely with fresh air when no EGR gas is supplied to the intake system, the engine load factor KLoff obtained when no EGR gas is supplied may be considered to represent the total amount of gas that fills the cylinder, or the in-cylinder charged gas amount $M_c$.

Considering that the in-cylinder charged gas amount $M_c$ does not change depending upon whether the EGR gas is supplied or not supplied, the engine load factor KLoff obtained when no EGR gas is supplied not only represents the in-cylinder charged gas amount $M_c$ when no EGR gas is supplied, but also represents the in-cylinder charged gas amount $M_c$ when EGR gas is supplied.

On the other hand, the in-cylinder charged fresh air amount $M_{c\text{-}air}$ during steady-state engine operation with no EGR gas supplied is represented by the engine load factor KLon, as described above. Accordingly, a result $\Delta KL$ (= KLoff−KLon) obtained by subtracting the engine load factor KLon when the EGR gas is supplied from the engine load factor KLoff when no EGR gas is supplied is supposed to represent the in-cylinder charged EGR gas amount $M_{c\text{-}egr}$ during steady-state engine operation.

Figure 29:
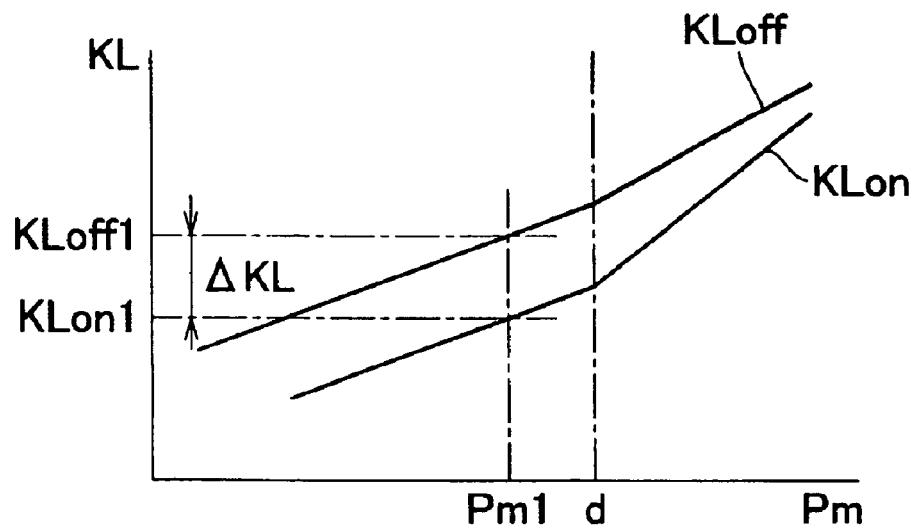
FIG. 29 is a graph useful for explaining the difference ΔKL.

More specifically, where KLoff is equal to KLoff1 and KLon is equal to KLon1 when $P_m$ is equal to $P_m1$, as shown in FIG. 29 by way of example, the in-cylinder charged EGR gas amount $M_{c\text{-}air}$ during steady-state engine operation is expressed by using $\Delta KL$(=KLoff1−KLon1).

Accordingly, the in-cylinder charged EGR amount $M_{c\text{-}egr}$ during steady-state engine operation can be calculated according to the following equation (28):

$$M_{c\text{-}egr} = kegr1 \cdot \Delta KL \quad (28)$$

where kegr1 is conversion factor at which the engine load factor KL is converted into the in-cylinder charged EGR gas amount $M_{c\text{-}egr}$, and KLoff and KLon represent engine load factors calculated according to the above-indicated equations (26), (27), respectively.

If the intake pipe pressure $P_m$ is calculated according to the above-indicated mathematical equation, or is detected by the pressure sensor, therefore, the in-cylinder charged EGR gas amount $M_{c\text{-}egr}$ during steady-state engine operation can be accurately and easily determined based on the intake pipe pressure $P_m$, by using the above-indicated equation (28).

In the meantime, the EGR valve passing gas flow rate $m_{egr}$ and the cylinder incoming EGR gas flow rate $m_{c\text{-}egr}$ are equal to each other during steady-state engine operation, as described above, and the in-cylinder charged EGR gas amount $M_{c\text{-}egr}$ is represented by the product of the cylinder incoming EGR gas flow rate $m_{c\text{-}egr}$ and $\Delta T(\text{sec})$ ($M_{c\text{-}egr} = m_{egr}\cdot\Delta T$). Accordingly, the EGR valve passing flow rate $m_{egr}$ during steady-state engine operation can also be expressed by using the above-described difference $\Delta KL$.

In the present embodiment, the EGR valve passing gas flow rate $m_{egr}$ during steady-state operation is calculated according to the following equation (29):

$$m_{egr} = kegr2 \cdot \Delta KL \tag{29}$$

where kegr2 is conversion factor at which the engine load factor KL is converted into the EGR valve passing gas flow rate $m_{egr}$, and KLoff and KLon represent engine load factors calculated according to the above-indicated equations (26), (27), respectively.

As explained above, the EGR valve passing gas flow rate $m_{egr}$ during steady-state engine operation is calculated by using the above equation (29). However, the EGR valve passing gas flow rate $m_{egr}$ during transient operation may also be calculated by using this equation (29).

The EGR valve passing gas flow rate $m_{egr}$ greatly depends upon a pressure difference between the upstream and downstream sides of the EGR control valve 22, namely, a difference between the exhaust pressure $P_e$ and the intake pipe pressure $P_m$. Assuming that the exhaust pressure $P_e$ and exhaust temperature $T_e$ detected upstream of the EGR control valve 22 during transient operation are not so different from the exhaust pressure $P_e$ and exhaust temperature $T_e$ detected during steady-state operation, the EGR valve passing gas flow rate $m_{egr}$ is determined once the intake pipe pressure $P_m$ is determined, no matter whether the engine is in a steady-state operation or in a transient operation.

Thus, the EGR valve passing gas flow rate $m_{egr}$ during steady-state operation and transient operation can be accurately and easily determined based on the intake pipe pressure $P_m$ by using the above-indicated equation (29). In this case, the in-cylinder charged EGR gas amount $M_{c\text{-}egr}$ during steady-state operation may be calculated from the EGR valve passing gas flow rate $m_{egr}$ during steady-state operation, or may be calculated from the difference $\Delta KL$ by using the above-indicated equation (28).

Figure 30:
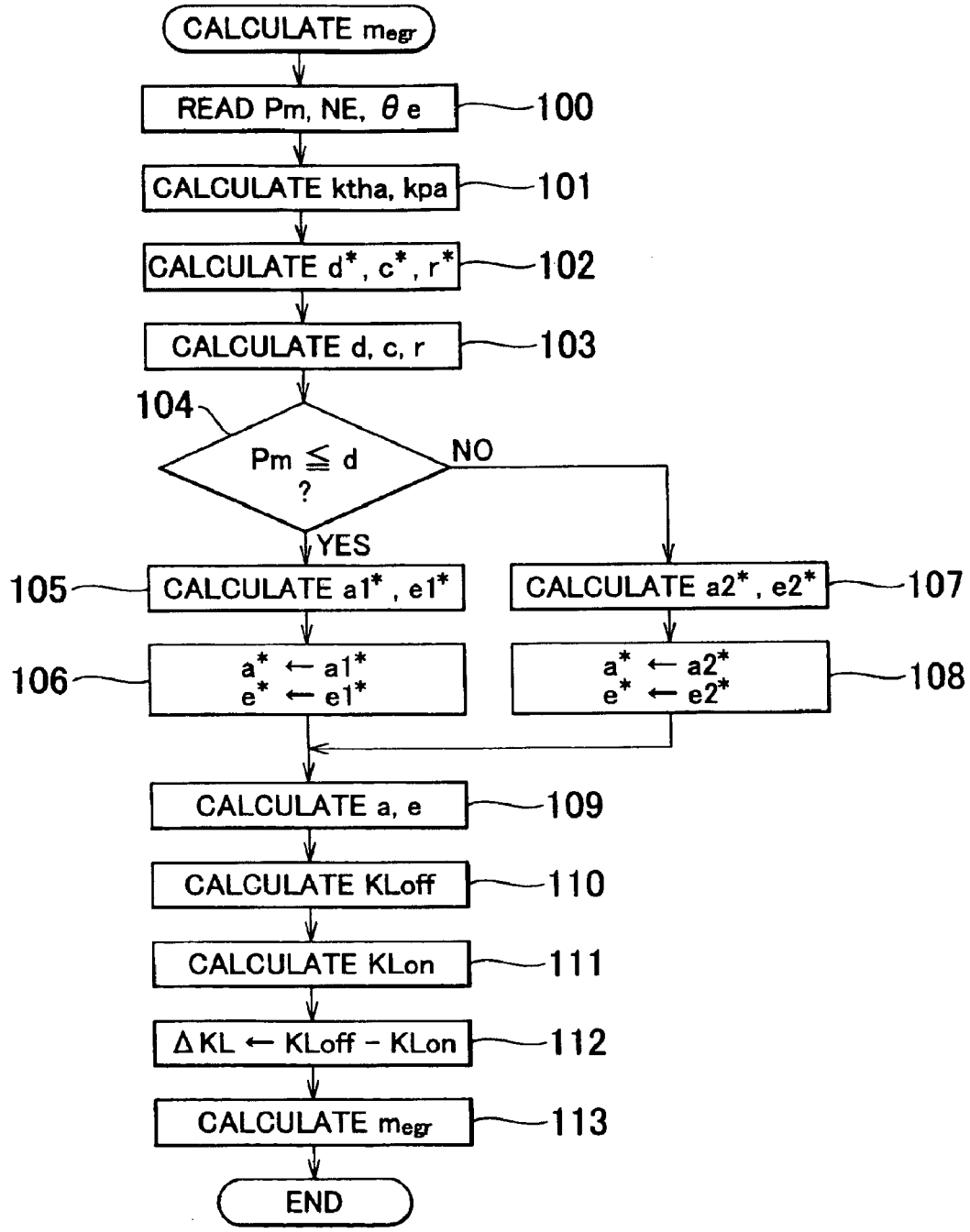
FIG. 30 is a flowchart showing a routine for calculating the EGR valve passing gas flow rate $m_{egr}$.

FIG. 30 illustrates a routine for calculating the EGR valve passing gas flow rate $m_{egr}$ according to the present embodiment as described above. This routine as an interrupt routine is executed at predetermined time intervals.

Referring to FIG. 30, the intake pipe pressure $P_m$, engine speed NE and the EGR opening $\theta_e$ are initially read in step S100. In step S101, the atmospheric temperature correction factor ktha and the atmospheric pressure correction factor kpa are calculated. In step S102, the intake pipe pressure d* and the engine load factors c*, r* at the connection point CP under the reference ambient conditions are calculated from the maps of FIG. 23, FIG. 24B and FIG. 28. Step S103 is then executed to calculate parameters d, c, r by correcting d*, c*, r* with ktha and kpa. In step S104, it is determined whether the detected intake pipe pressure $P_m$ is equal to or lower than d at the connection point. If $P_m$ is equal to or lower than d, the control process proceeds to step S105 to calculate a1* and e1* from the maps of FIG. 22C and FIG. 27A. In step S106, slopes a*, e* are set to a1*, e1*, respectively. The control process then proceeds to step S109. If $P_m$ is higher than d, on the other hand, the control process proceeds to step S107 to calculate a2*, e2* from the maps of FIG. 22D and FIG. 27B. In the following step S108, slopes a*, e* are set to a2*, e2*, respectively. The control process then proceeds to step S109.

In step S109, parameters a, e are calculated by correcting a*, e* with ktha, kpa. In step S110, the engine load factor KLoff is calculated according to the equation (27) (KLoff = $a\cdot(P_m-d)+c$). In step S111, the engine load factor KLon is calculated according to the equation (26) (KLon = $e\cdot(P_m-d)+r$). In step S112, the difference $\Delta KL$ is calculated ($\Delta KL =$ KLoff−KLon). In step S113, the EGR valve passing gas flow rate $m_{egr}$ is calculated according to the equation (28) ($m_{egr} = $ kegr2$\cdot\Delta KL$).

In the illustrated embodiment, each of the engine load factors KLoff, KLon is expressed by two linear functions. However, the engine load factor KLoff, KLon may be expressed by a certain number (n) of m-order functions (n, m=1, 2 ... ).

In the illustrated embodiment, the in-cylinder charged fresh air amount during steady-state engine operation with no EGR gas supplied, or the engine load factor KLoff, is represented by a first function (or a first set of functions) as a function of the intake pipe pressure $P_m$, and the first function is stored in advance. Also, the in-cylinder charged fresh air amount during steady-state engine operation with EGR gas supplied, or the engine load factor KLon, is represented by a second function (or a second set of functions) as a function of the intake pipe pressure $P_m$, and the second function is stored in advance. In this condition, the in-cylinder charged fresh air amounts, or the engine load factors KLoff, KLon, are calculated based on the determined intake pipe pressure $P_m$, by using the first and second functions, respectively, and the difference $\Delta KL$ between the in-cylinder charged fresh air amounts, or the engine load factors KLoff, KLon, is calculated. Finally, the EGR valve passing gas flow rate $m_{egr}$ is calculated based on the difference $\Delta KL$.

More generally speaking, the difference $\Delta KL$ between the in-cylinder charged fresh air amount during steady-state operation with no EGR gas supplied, or the engine load factor KLoff, and the in-cylinder charged fresh air amount during steady-state operation with EGR gas supplied, or the engine load factor KLon, is represented by a function of the intake pipe pressure $P_m$, which is determined and stored in advance. Upon determination of the intake pipe pressure $P_m$, the difference $\Delta KL$ is calculated from the determined intake pipe pressure $P_m$ by using the above function, and the EGR valve passing gas flow rate $m_{egr}$ during steady-state operation and transient operation and the in-cylinder charged EGR gas amount $M_c$ egr during steady-state operation are calculated based on the difference $\Delta KL$.

Next, another embodiment of the invention will be described.

By using the above equations (27), (26) representing KLoff and KLon, respectively, the above-described difference $\Delta KL$ may be expressed by the following equation (30).

$$\Delta KL = KLoff - KLon \tag{30}$$
$$= (a-e)\cdot(P_m-d)+(c-r)$$

Here, if (a−e) and (c−r) are replaced by h and i, respectively, namely, if (a−e)=h and (c−r)=i, the above equation (30) is rewritten into the following equation (31).

$$\Delta KL = h\cdot(P_m-d)+i \tag{31}$$
$$h=h1 \ldots P_m \leq d$$
$$h=h2 \ldots P_m > d$$

Figure 31:
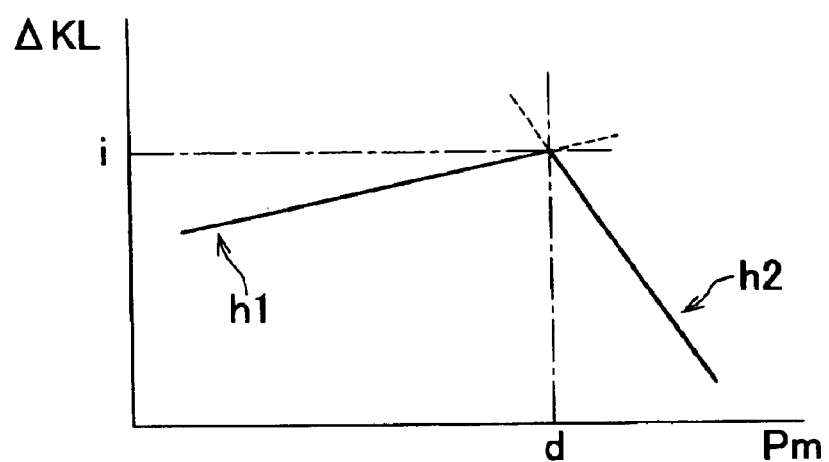
FIG. 31 is a graph showing one example of the relationship between the difference ΔKL and the intake pipe pressure $P_m$.

Accordingly, the difference $\Delta KL$ is represented by two linear functions of the intake pipe pressure $P_m$, namely, two straight lines that have different slopes and meet at a connection point CP, as shown in FIG. 31. Namely, the difference $\Delta KL$ is represented by one of the linear functions having slope h1 when the intake pipe pressure $P_m$ is relatively small, and is represented by the other linear function having slope h2 when the intake pipe pressure $P_m$ is relatively large.

In the present embodiment, the two linear functions of the intake pipe pressure $P_m$, which represent the difference $\Delta KL$, are stored in advance in the ROM 34 in the form of the equation (31). In this case, the number of parameters can be further reduced.

Figure 32A:
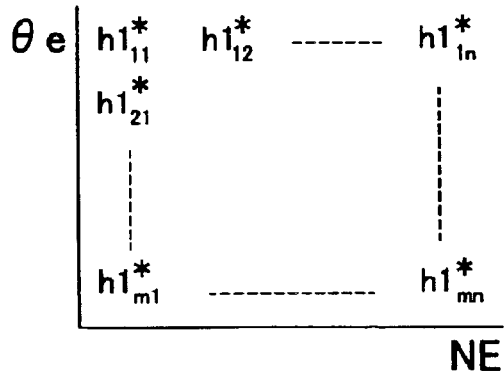
FIG. 32A through FIG. 32C are maps showing slopes h1, h2 and difference i at the connection point.
Figure 32B:
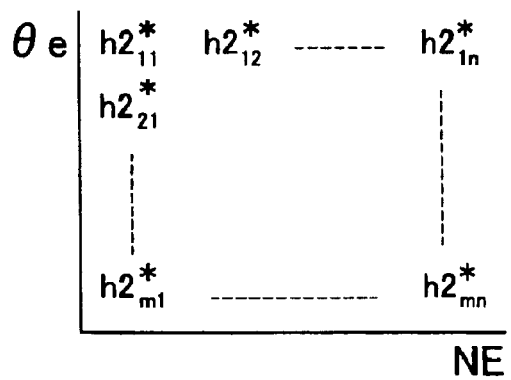
Figure 32C:
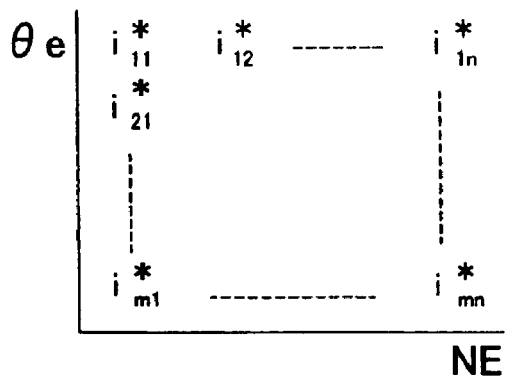

Parameters h, d, i used in the above equation (31) are calculated according to the following equations:

$$h1 = h1^* \cdot ktha$$

$$h2 = h2^* \cdot ktha$$

$$i = i^* \cdot ktha \cdot kpa$$

where $h1^*$, $h2^*$ and $i^*$ are slopes and difference at the connection point CP when the ambient conditions of the engine are the reference ambient conditions. The $h1^*$, $h2^*$ and $i^*$ are determined in advance through experiments, and are stored in advance in the ROM 34 in the form of maps as shown in FIG. 32A, FIG. 32B and FIG. 32C, respectively, as functions of the engine speed NE and the EGR opening $\theta_e$. The parameter d is similar to that of the above-described embodiment, and thus will not be explained herein.

It may be generally said from the above description that two linear functions of the intake pipe pressure $P_m$ representing the difference $\Delta KL$ are determined and stored in advance with respect to each of a plurality of different EGR openings $\theta_e$. Also, two linear functions of the intake pipe pressure $P_m$ representing the difference $\Delta KL$ are determined and stored in advance with respect to each of a plurality of different engine speeds NE.

Figure 33:
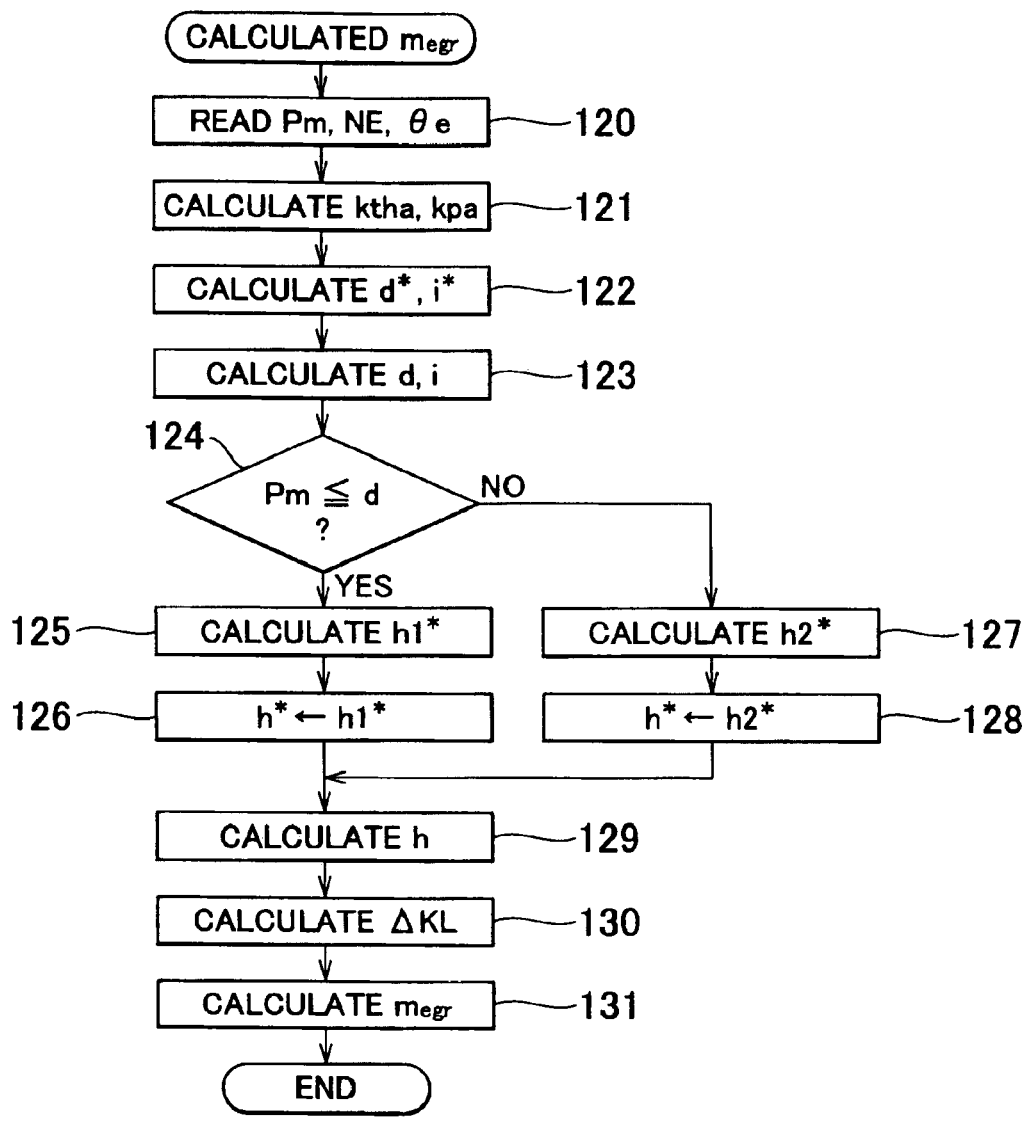
FIG. 33 is a flowchart showing a routine for calculating the EGR valve passing gas flow rate $m_{egr}$ according to another embodiment of the invention.

FIG. 33 illustrates a routine for calculating the EGR valve passing gas flow rate $m_{egr}$ according to the above-described embodiment of the invention. This routine as an interrupt routine is executed at predetermined time intervals.

Referring to FIG. 33, the intake pipe pressure $P_m$, engine speed NE and the EGR opening $\theta_e$ are initially read in step S120. In step S121, the atmospheric temperature correction factor ktha and the atmospheric pressure correction factor kpa are calculated. In step S122, the intake pipe pressure $d^*$ and difference $i^*$ at the connection point CP under the reference ambient conditions are calculated from the maps of FIG. 23 and FIG. 32C. Step S123 is then executed to calculate parameters d, i by correcting $d^*$, $i^*$ with ktha, kpa. In step S124, it is determined whether the detected intake pipe pressure $P_m$ is equal to or lower than the intake pipe pressure d at the connection point CP. If $P_m$ is equal to or lower than d, the control process proceeds to step S125 to calculate $h1^*$ from the map of FIG. 32A. In the following step S126, slope $h^*$ is set to $h1^*$. The control process then proceeds to step S129. If $P_m$ is higher than d, on the other hand, the control process proceeds to step S127 to calculate $h2^*$ from the map of FIG. 32B. In the following step S128, slope $h^*$ is set to $h2^*$. The control process then proceeds to step S129.

In step S129, the parameter h is calculated by correcting $h^*$ with ktha, kpa. In step S130, the difference $\Delta KL$ is calculated according to the equation (31) ($\Delta KL = h \cdot (P_m - d) + i$). In step S131, the EGR valve passing gas flow rate $m_{egr}$ is calculated according to the equation (29) ($m_{egr} = kegr2 \cdot \Delta KL$).

Here, the EGR opening $\theta_e$ will be briefly described. As described above, the EGR opening is represented by the number of steps STP of the step motor of the EGR control valve 22. Namely, the EGR control valve 22 is closed when the number of steps STP becomes equal to zero, and the EGR opening increases as the number of steps STP increases.

Figure 34:
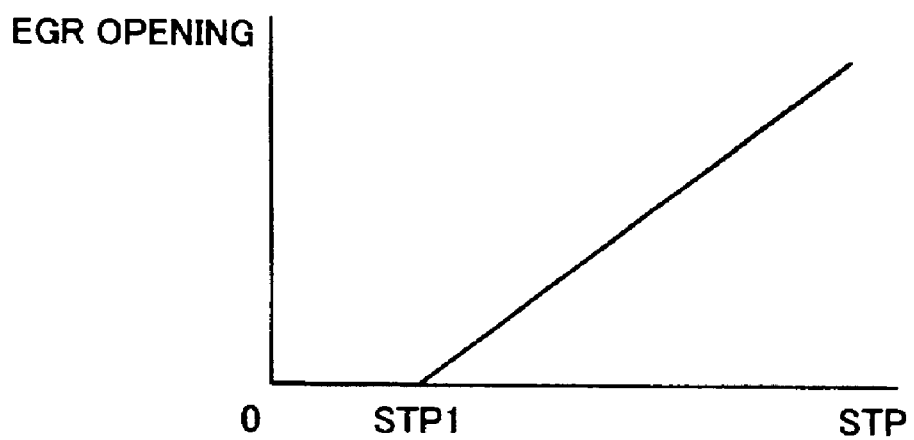
FIG. 34 is a graph showing the relationship between the EGR opening and the number of steps STP.

In fact, the EGR control valve 22 is not immediately opened even if the number of steps STP becomes larger than zero, as shown in FIG. 34. Namely, the EGR control valve 22 is opened when the number of steps STP exceeds step STP1. Thus, the EGR opening $\theta_e$ needs to be expressed by using a result (STP−STP1) obtained by subtracting STP1 from STP.

Also, since the EGR control valve 22 usually involves manufacturing errors, the actual EGR opening $\theta_e$ may deviate from a normal opening determined based on the number of steps STP. In the engine as shown in FIG. 1, a correction factor kg for making the actual EGR opening equal to the normal EGR opening is determined, and the correction factor kg is added to the number of steps STP so that the actual EGR opening coincides with the normal EGR opening.

Accordingly, the EGR opening θe is expressed by the following equation:

$$\theta_e = STP - STP0 + kg$$

where STP0 is the number of steps with which the EGR control valve 22 starts being opened in a drawing tolerance middle product. In this embodiment, the EGR opening $\theta_e$ thus calculated is used as an argument of the relevant maps.

In the meantime, the EGR valve passing gas flow rate $m_{egr}$ calculated as described above or the in-cylinder charged EGR gas amount $M_{c-egr}$ during steady-state engine operation may be further corrected in view of the exhaust temperature $T_e$.

In the case where the EGR valve passing gas flow rate $m_{egr}$ is corrected, for example, the flow rate $m_{egr}$ is expressed, for example, by the following equation:

$$m_{egr} = m_{egr} \cdot kwu \cdot krtd \cdot kinc$$

where kwu is a correction factor used during warm-up of the engine, and krtd is a correction factor used during retarding correction of the ignition timing, while kinc is a correction factor used during increasing correction of the fuel injection amount.

The warm-up correction factor kwu is employed for correcting the EGR valve passing gas flow rate $m_{egr}$ during a warm-up operation of the engine. During the warm-up operation, the exhaust temperature $T_e$ is lower than that detected after completion of the warm-up operation, and the EGR valve passing gas flow rate $m_{egr}$ (g/sec) is increased by an amount corresponding to the difference in the exhaust temperature $T_e$. The EGR valve passing gas flow rate $m_{egr}$ calculated by using the above-indicated equation (26), (27) or (31) is established after completion of the warm-up operation, and therefore this flow rate $m_{egr}$ needs to be corrected during warm-up of the engine.

Figure 35A:
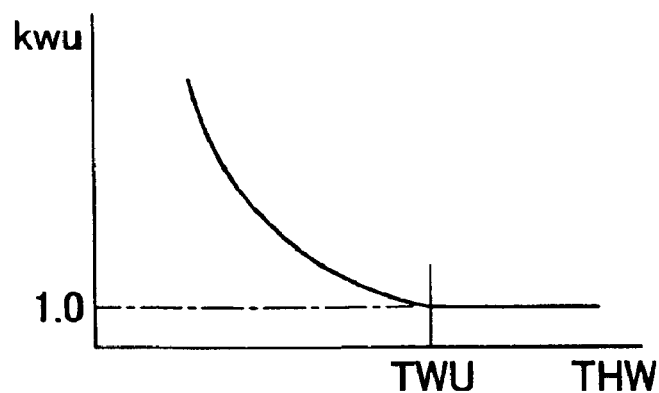
FIG. 35A through FIG. 35C are graphs showing various correction factors.

As shown in FIG. 35A, the warm-up correction factor kwu decreases as the engine coolant temperature THW representing the degree of warm-up increases, and is kept at 1.0 when the temperature THW becomes equal to or higher than temperature TWU at which the warm-up is completed. The warm-up correction factor kwu is stored in advance in the ROM 34 in the form of a map as shown in FIG. 35A.

The correction factor krtd is employed for correcting the EGR valve passing gas flow rate $m_{egr}$ when the ignition timing is corrected to be retarded. During the retarding correction of the ignition timing, the exhaust temperature $T_e$ is higher than that detected when no retarding correction is effected, and the EGR valve passing gas flow rate $m_{egr}$ is reduced by an amount corresponding to the difference in the exhaust temperature $T_e$.

Figure 35B:
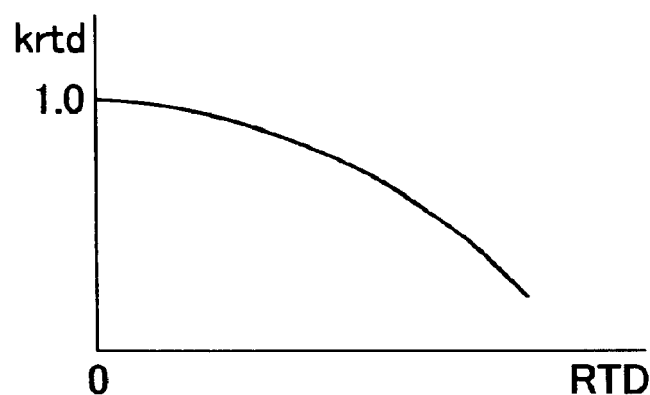

As shown in FIG. 35B, the correction factor krtd is equal to 1.0 when the retard amount RTD is equal to zero, and decreases as the retard amount RTD increases. The correction factor krtd is stored in advance in the ROM 34 in the form of a map as shown in FIG. 35B.

The correction factor kinc is employed for correcting the EGR valve passing gas flow rate $m_{egr}$ when the fuel injection amount is corrected to be increased. During the increasing correction of the fuel injection amount, the exhaust temperature $T_e$ is lower than that detected when no increasing correction is effected, and the EGR valve passing gas flow rate $m_{egr}$ is increased by an amount corresponding to the difference in the exhaust temperature $T_e$.

Figure 35C:
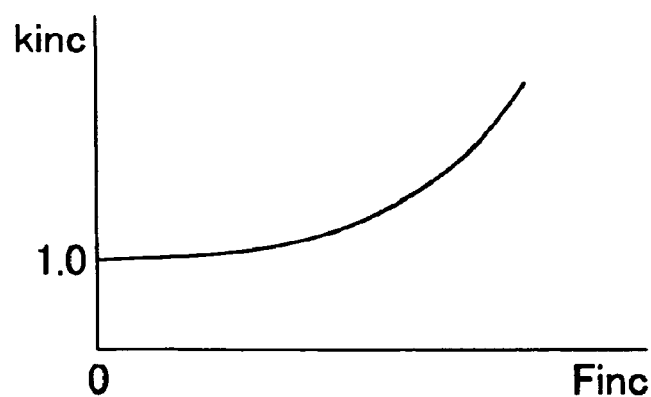

As shown in FIG. 35C, the correction factor kinc is equal to 1.0 when an amount of increasing correction Finc is equal to zero, and increases as the increasing correction amount Finc increases. The correction factor kinc is stored in advance in the ROM 34 in the form of a map as shown in FIG. 35C.

In the above-described manner, the EGR valve passing gas flow rate $m_{egr}$ can be determined with further improved accuracy.

The EGR valve passing gas flow rate $m_{egr}$ may be corrected by another method. For example, the exhaust temperature $T_e$ for the time of no retarding correction of the ignition timing or no fuel increasing correction is determined in advance as a function of the engine operating conditions (e.g., the engine speed NE and the required load L) while the actual exhaust temperature $T_e$ is detected or estimated, and the EGR valve passing gas flow rate $m_{egr}$ is corrected based on a difference between the temperature $T_e$ for the time of no retarding correction or no fuel increasing correction, and the actual exhaust temperature $T_e$. The in-cylinder charged EGR gas amount $M_{c\text{-}egr}$ during steady-state engine operation may also be corrected in a similar manner to the EGR valve passing gas flow rate $m_{egr}$.

Figure 36:
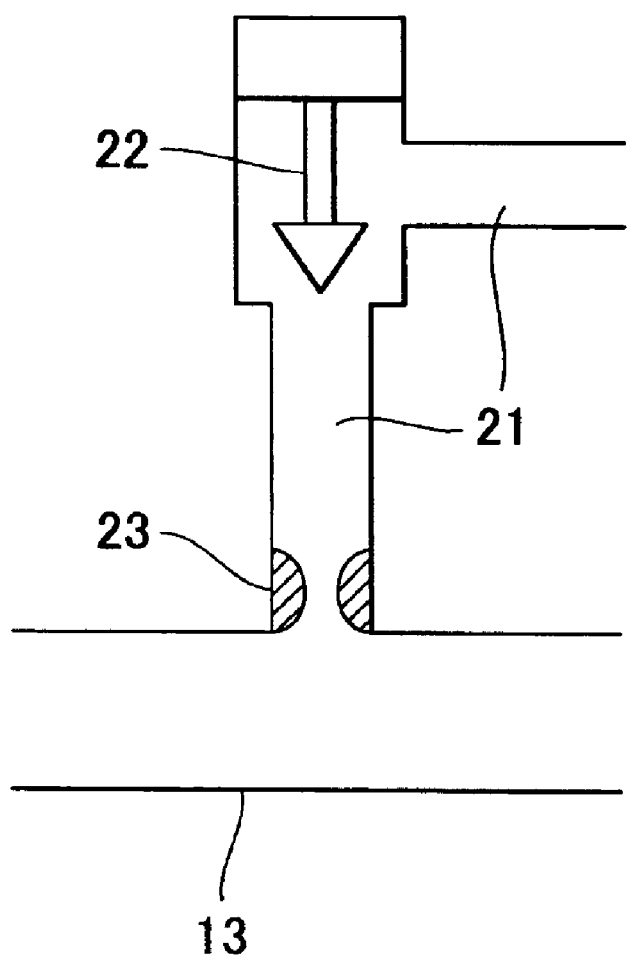
FIG. 36 is a view showing a part of an internal combustion engine to which a further embodiment of the invention is applied.

In the engine as shown in FIG. 1, the EGR passage 21 downstream of the EGR control valve 22 branches off to be connected to the intake branch pipe 13 for each cylinder. In this arrangement, a flow restrictor 23 may be provided in each EGR passage 21 downstream of the EGR control valve 22, as shown in FIG. 36, so as to suppress or reduce variations in the amount of EGR gas supplied to the respective cylinders.

In this case, when the engine is in a steady-state operation, the restrictor passing gas flow rate mchk (g/sec) as the flow rate of EGR gas passing the flow restrictor 23 is equal to the EGR valve passing gas flow rate $m_{egr}$. Accordingly, the restrictor passing gas flow rate mchk during steady-state operation can be calculated based on the difference $\Delta$KL, as is understood from the above description. It is to be noted that the restrictor passing gas flow rate mchk represents the flow rate of EGR gas flowing into the intake pipe portion.

During transient engine operation, on the other hand, the restrictor passing gas flow rate mchk is not necessarily equal to the EGR valve passing gas flow rate $m_{egr}$. However, if the volume of a portion of the EGR passage 21 that extends from the EGR control valve 22 to the flow restrictor 23 is relatively small, the restrictor passing gas flow rate mchk is substantially equal to the EGR valve passing gas flow rate $m_{egr}$. Accordingly, when the volume of the EGR passage 21 extending from the EGR control valve 22 to the flow restrictor 23 is relatively small, the restrictor passing gas flow rate mchk can be calculated based on the difference $\Delta$KL no matter whether the engine is in a steady-state operation or in a transient operation.

In the illustrated embodiments, the engine load factor KLon, KLoff or the difference $\Delta$KL is calculated based on the intake pipe pressure $P_m$ estimated by using a calculation model, or the intake pipe pressure $P_m$ detected by the pressure sensor 39. However, the intake pipe pressure $P_m$ may be estimated based on the throttle opening or an output signal of the air flow meter disposed in the intake duct 14 upstream of the throttle valve 17, and the engine load factor KL may be calculated from the thus estimated intake pipe pressure $P_m$.

When the intake pipe pressure $P_m$ is estimated based on the throttle opening, the intake pipe pressure $P_m$ is determined in advance as a function of the throttle opening $\theta_t$, engine speed NE and the EGR opening $\theta_e$, and this function is stored in the form of a map.

When the intake pipe pressure $P_m$ is estimated based on the output signal of the air flow meter, the estimated intake pipe pressure $P_m$ may exceed the maximum pressure $P_{mmax}$ that can be reached or taken by intake pipe pressure $P_m$, because of the detection accuracy of the air flow meter. In a region where $P_m$ is larger than $P_{mmax}$, however, the engine load factor KLon expressed by the above-indicated equation (26) may exceed the engine load factor KLoff expressed by the above-indicated equation (27), as shown in FIG. 37B. In this case, the difference $\Delta$KL becomes a negative value. Namely, the difference $\Delta$KL cannot be accurately calculated if the estimated intake pipe pressure $P_m$ exceeds the maximum pressure $P_{mmax}$.

Figure 37A:
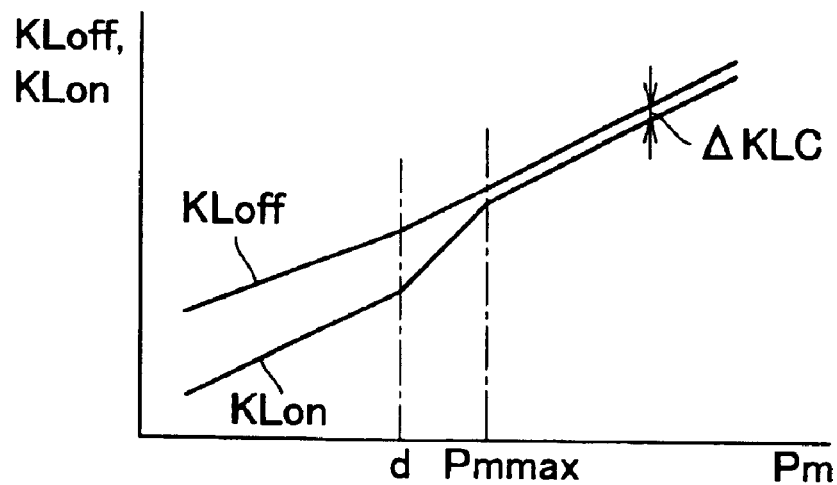
FIG. 37A and FIG. 37B are graphs showing the engine load factor KL when the intake pipe pressure $P_m$ exceeds the maximum pressure $P_{mmax}$.
Figure 37B:
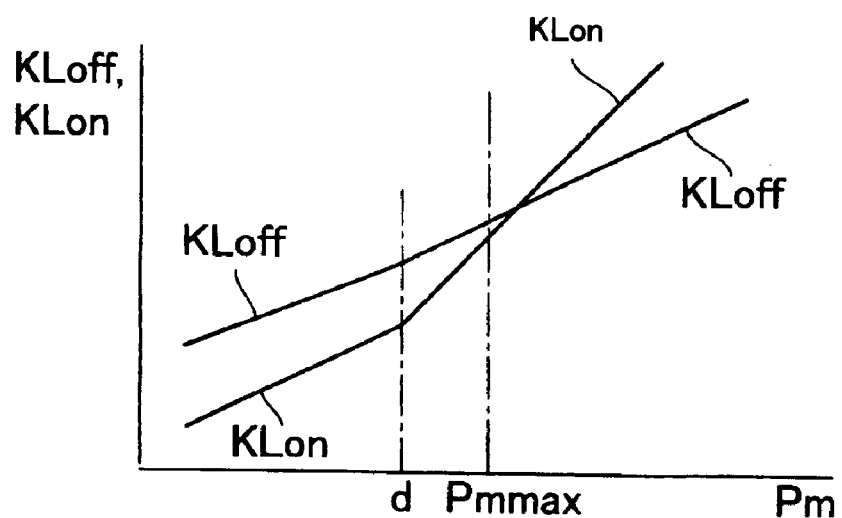

If the difference $\Delta$KL is kept at a constant value $\Delta$KLC in the region where $P_m > P_{mmax}$, as shown in FIG. 37A, the above problem may be eliminated. Namely, even when the estimated intake pipe pressure $P_m$ exceeds the maximum pressure $P_{mmax}$, the difference $\Delta$KL can be still accurately calculated.

When the EGR control valve 22 is in a closed position, the EGR passage 21 downstream of the EGR control valve 22 is filled with air (fresh air). Immediately after the EGR control valve 22 is opened, therefore, fresh air, rather than exhaust gas, flows from the EGR passage 21 into the intake pipe portion. After introduction of the fresh air, a mixture of fresh air and exhaust gas flows from the EGR passage 21 into the intake pipe portion for a while.

Since fresh air and exhaust gas have different temperatures, the flow of fresh air from the EGR passage 21 into the intake pipe portion has a particular influence on the relationship established based on the law of conservation of energy. In the illustrated embodiments, however, the flow of fresh air from the EGR passage 21 into the intake pipe portion is not taken into consideration.

In the illustrated embodiments, therefore, the following equation (32) may be employed, in view of the above fact, as an equation of a relationship established based on the law of conservation of energy between air and exhaust gas flowing into the intake pipe portion, and air and exhaust gas flowing from the intake pipe portion into the cylinder.

$$\frac{dP_m}{dt} = \kappa \cdot \frac{R}{V} \cdot (m_t \cdot T_a + m_{egr-air} \cdot T_a + m_{egr-egr} \cdot T_e - m_{c-air} \cdot T_m - m_{c-egr} \cdot T_e) \tag{32}$$

In the above equation (32), where the EGR valve passing gas flow rate $m_{egr}$ is equal to the flow rate of gas flowing from the EGR passage 21 into the intake pipe portion, $m_{egr-egr}$ is flow rate of exhaust gas as a part of the gas flowing from the EGR passage 21 into the intake pipe portion, and $m_{egr-air}$ is flow rate of air (fresh air) as a part of the gas flowing from the EGR passage 21 into the intake pipe portion. The flow rate $m_{egr-egr}$ will be called "pipe incoming exhaust gas flow rate", and the flow rate $m_{egr-air}$ will be called "pipe incoming fresh air flow rate".

Also, in the above equation (32), $m_{c-egr}$ is flow rate of exhaust gas flowing into the cylinder, and $m_{c-air}$ is flow rate of air (fresh air) flowing into the cylinder. The flow rate $m_{c-egr}$ will be called "cylinder incoming exhaust gas flow rate", and the flow rate $m_{c-air}$ will be called "cylinder incoming fresh air flow rate".

Here, a method of calculating the pipe incoming exhaust gas flow rate $m_{egr-egr}$ and the pipe incoming fresh air flow rate $m_{egr-air}$ will be described.

When the EGR control valve 22 is opened, the flow rate of gas flowing from the EGR passage 21 into the intake pipe portion is equal to the EGR valve passing gas flow rate. Then, the pipe incoming exhaust gas flow rate $m_{egr-egr}$ starts increasing after a certain time (waste time) elapses, and then gradually increases with a first-order lag. Thus, the pipe incoming fresh air flow rate $m_{egr-air}$ is calculated according to the following equation (33).

$$m_{egr-air} = m_{egr} - m_{egr-egr} \quad (33)$$

Here, the EGR valve passing gas flow rate $m_{egr}$ is determined in the manner as explained above. Accordingly, once the pipe incoming exhaust gas flow rate $m_{egr-egr}$ is determined, the pipe incoming fresh air flow rate $m_{egr-air}$ will be determined.

The pipe incoming exhaust gas flow rate $m_{egr-egr}$ is calculated in the following manner: the waste time Td1 and the time constant τ1 are calculated from the functions as shown in FIG. 16A and FIG. 16B stored in the ROM 34 in the form of maps, and the exhaust gas flow rate $m_{egr-egr}$ is determined such that it starts changing toward the EGR valve passing gas flow rate upon a lapse of the waste time Td1, and then changes toward the EGR valve passing gas flow rate with the time constant τ1.

On the other hand, the cylinder incoming exhaust gas flow rate $m_{c-egr}$ and the cylinder incoming fresh air flow rate $m_{c-air}$ are determined in a similar manner. Namely, the cylinder incoming exhaust gas flow rate $m_{c-egr}$ starts increasing upon a lapse of a certain time (waste time), and then gradually increases with a first-order lag. Thus, the cylinder incoming fresh air flow rate $m_{c-air}$ is calculated according to the following equation (34).

$$m_{c-air} = m_c - m_{c-egr} \quad (34)$$

As is understood from the above equation (34), once the cylinder incoming exhaust gas flow rate $m_{c-egr}$ is determined, the cylinder incoming fresh air flow rate $m_{c-air}$ will be determined.

The cylinder incoming exhaust gas flow rate $m_{c-egr}$ is calculated in the following manner: the waste time Td2 and the time constant τ2 are calculated from the functions as shown in FIG. 17A and FIG. 17B stored in the ROM 34 in the form of maps, and the cylinder incoming exhaust gas flow rate $m_{c-egr}$ is determined such that it starts changing toward the EGR valve passing gas flow rate upon a lapse of the waste time Td2, and then changes toward the EGR valve passing gas flow rate with the time constant τ2.

In this embodiment, the accuracy of the calculated values is improved because the fresh air flowing from the EGR passage 21 into the intake pipe portion is taken into consideration.

In the meantime, when the distance from the location at which the EGR passage 21 is connected to the intake pipe portion to the intake valve is considerably shorter than the distance from the EGR control valve 22 to the above location, the following equation (35) is satisfied.

$$m_{egr-egr} \cong m_{c-egr} \quad (35)$$

Namely, the flow rate $m_{c-egr}$ of exhaust gas flowing into the cylinder is substantially equal to the flow rate $m_{egr-egr}$ of exhaust gas (as a part of gas) flowing from the EGR passage 21 into the intake pipe portion.

In this case, the above equation (32) can be rewritten into the following equation (36).

$$\frac{dP_m}{dt} = \kappa \cdot \frac{R}{V} \cdot (m_t \cdot T_a + m_{egr-air} \cdot T_a - m_{c-air} \cdot T_m) \quad (36)$$

In the illustrated embodiments, the above equation (36) may be employed as an equation of relationship established based on the law of conservation of energy between air and exhaust gas flowing into the intake pipe portion, and air and exhaust gas flowing from the intake pipe portion into the cylinder.

Here, the flow rate $m_{egr-air}$ of fresh air flowing from the EGR passage 21 into the intake pipe portion (pipe incoming fresh air flow rate) is determined according to the above equation (33) once the pipe incoming exhaust gas flow rate $m_{egr-egr}$ is determined.

Also, the flow rate $m_{c-air}$ of fresh air flowing into the cylinder (cylinder incoming fresh air flow rate) is determined according to the above equation (34) once the cylinder incoming exhaust gas flow rate $m_{c-egr}$ is determined.

Needless to say, where the pipe incoming exhaust gas flow rate $m_{egr-egr}$ and the cylinder incoming exhaust gas flow rate $m_{c-egr}$ are calculated when the EGR valve passing gas flow rate $m_{egr}$ changes, the waste time and the first-order lag are taken into consideration, as described above.

In addition, the exhaust temperature $T_e$ is not included in the parameters used in the above-indicated equation (36), and therefore the exhaust temperature $T_e$ need not be determined when the above equation (36) is employed.

The above-indicated equation (36) may be rewritten into the following equation (37).

$$\begin{aligned}\frac{dP_m}{dt} &= \kappa \cdot \frac{R}{V} \cdot (m_t \cdot T_a + m_{egr-air} \cdot T_a + m_{egr-egr} \cdot \\ &\quad T_a - m_{c-air} \cdot T_m - m_{egr-egr} \cdot T_a) \\ &= \kappa \cdot \frac{R}{V} \cdot (m_t \cdot T_a + m_{egr} \cdot T_a - m_{c-air} \cdot \\ &\quad T_m - m_{egr-egr} \cdot T_a)\end{aligned} \quad (37)$$

From the relationship of the above-indicated equation (33), the above equation (37) may be further rewritten into the following equation (38).

$$\frac{dP_m}{dt} = \kappa \cdot \frac{R}{V} \cdot (m_t \cdot T_a + m_{egr} \cdot T_a - m_{c-air} \cdot T_m - m_{c-egr} \cdot T_a) \quad (38)$$

The above equation (38) may be further rewritten into the following equation (39).

$$\frac{dP_m}{dt} = \kappa \cdot \frac{R}{V} \cdot (m_t \cdot T_a + m_{egr} \cdot T_a - m_{c-air} \cdot T_m - m_{c-egr} \cdot T_m + m_{c-egr} \cdot T_m - m_{c-egr} \cdot T_a) \quad (39)$$

$$= \kappa \cdot \frac{R}{V} \cdot \left\{ m_t \cdot T_a + m_{egr} \cdot T_a - m_c \cdot T_m - m_{c-egr} \cdot T_m \cdot \left(1 - \frac{T_a}{T_m}\right) \right\}$$

When the engine is in a steady-state operation, the intake pipe pressure $T_m$ is substantially equal to the atmospheric temperature $T_a$ ($T_m \approx T_a$), and the last term of the right side of the equation (39) as indicated below becomes equal to zero.

$$m_{c-egr} \cdot T_m \cdot \left(1 - \frac{T_a}{T_m}\right)$$

When the engine is in a transient operation, on the other hand, the intake pipe temperature $T_m$ is different from the atmospheric temperature $T_a$, and the difference between these temperatures becomes larger as the intake pipe pressure $P_m$ changes by a larger degree. However, if the EGR valve passing gas flow rate $m_{egr}$ is large, the intake pipe pressure $P_m$ is kept high so as to promote combustion in the cylinder. On the contrary, if the EGR valve passing gas flow rate $m_{egr}$ is small, only a small influence arises from the difference between the intake pipe temperature $T_m$ and the atmospheric temperature $T_a$ even if this difference is large.

Accordingly, even when the engine is in a transient operation, the last term of the right side of the equation (39) as indicated below can be approximated to zero.

$$m_{c-egr} \cdot T_m \cdot \left(1 - \frac{T_a}{T_m}\right)$$

With all of the above descriptions integrated, the equation (39) can be approximated to the following equation (40).

$$\frac{dP_m}{dt} = \kappa \cdot \frac{R}{V} \cdot (m_t \cdot T_a + m_{egr} \cdot T_a - m_c \cdot T_m) \quad (40)$$

In the illustrated embodiments, the above equation (40) may be employed as an equation of relationship established based on the law of conservation of energy between air and exhaust gas flowing into the intake pipe portion and air and exhaust gas flowing from the intake pipe portion into the cylinder. The use of the above equation (40) eliminates a need to take account of the pipe incoming exhaust gas flow rate $m_{egr-egr}$, cylinder incoming exhaust gas flow rate $m_{c-egr}$, pipe incoming fresh air flow rate $m_{egr-air}$, and the cylinder incoming fresh air flow rate $m_{c-air}$.

If the flow rate of the exhaust gas flowing into the intake pipe portion (pipe incoming exhaust gas flow rate) is equal to the EGR valve passing gas flow rate, and the flow rate of the exhaust gas flowing into the cylinder (cylinder incoming exhaust gas flow rate) is equal to the pipe incoming exhaust gas flow rate, the above-indicated equation (15) is rewritten into the following equation (41), and the above-indicated equation (16) is rewritten into the following equation (42):

$$\frac{d}{dt}\left(\frac{P_m}{T_m}\right) = \frac{R}{V} \cdot (m_t - m_{c-air}) \quad (41)$$

$$\frac{dP_m}{dt} = \kappa \cdot \frac{R}{V} \cdot (m_t \cdot T_a + m_{egr} \cdot T_k - m_{c-air} \cdot T_m - m_{c-egr} \cdot T_k) \quad (42)$$

where $T_k$ is temperature of exhaust gas or air or a mixture thereof flowing from the EGR passage 21 into the intake pipe portion.

Furthermore, the equation (42) is rewritten into the following equation (43).

$$\frac{dP_m}{dt} = \kappa \cdot \frac{R}{V} \cdot \{m_t \cdot T_a - (m_c - m_{egr}) \cdot T_m\} \quad (43)$$

$$= \kappa \cdot \frac{R}{V} \cdot (m_t \cdot T_a - m_{c-air} \cdot T_m)$$

If the above-described conditions that the pipe incoming exhaust gas flow rate is equal to the EGR valve passing gas flow rate and that the cylinder incoming exhaust gas flow rate is equal to the pipe incoming exhaust gas flow rate are satisfied or permitted, the above equations (41) and (43) may be employed as equations of relationships established based on the law of conservation of mass and the law of conservation of energy between air and exhaust gas flowing into the intake pipe portion and air and exhaust gas flowing from the intake pipe portion into the cylinder. The use of the equations (41) and (43) eliminates a need to determine the EGR valve passing gas flow rate $m_{egr}$.

In the equations (41) and (43), the cylinder incoming fresh air flow rate $m_{c-air}$ is calculated from the engine load factor KL calculated according to the above-indicated equation (26) or (27). More specifically, the engine load factor KL is calculated according to the equation (26) or (27), and the in-cylinder charged fresh air amount $M_{c-air}$ is calculated by substituting the engine load factor KL into the equation (25) and solving this equation. Finally, the cylinder incoming fresh air flow rate $m_{c-air}$ is calculated by dividing the in-cylinder charged fresh air amount $M_{c-air}$ by time obtained by dividing the time required for one cycle of the engine by the number of cylinders.

In the illustrated embodiments, the throttle passing air flow rate $m_t$ is calculated according to the above-indicated equation (1). While the function $\Phi(P_m/P_a)$ is used in this equation (1), the accuracy in calculating the function $\Phi$ may deteriorate if the shape of the throttle valve 18 is complicated or if pulsation of air passing the throttle valve 18 takes place. Accordingly, the accuracy in calculating the throttle passing air flow rate $m_t$ that is calculated by using the function $\Phi$ may also deteriorate.

In view of the above possibility, a method of calculating the throttle passing air flow rate $m_t$ by using the following equation (44) may be employed as a method of calculating the throttle passing air flow rate while eliminating calculation errors in the function $\Phi(P_m/P_a)$:

$$m_t = \{e \cdot (P_{m-egr} - d) + r\} \cdot \frac{\Phi\left(\frac{P_m}{P_a}\right)}{\Phi\left(\frac{P_{m-egr}}{P_a}\right)} \quad (44)$$

where $P_{m-egr}$ is intake pipe pressure that is finally reached or achieved, and is determined based on the engine speed NE, throttle opening $\theta_t$ and the EGR opening $\theta_e$ ($P_{m-egr}$=f1(NE, $\theta_t$, $\theta_e$)).

In the above equation (44), e, d and r are adapted parameters. These adapted parameters will be described later in detail.

In the same equation (44), $\Phi(P_m/P_a)$ is the function of the equation (2), and $\Phi(P_{m\text{-}egr}/P_a)$ is a function obtained by substituting variable $P_m/P_a$ in the function $\Phi(P_m/P_a)$ by $P_{m\text{-}egr}/P_a$.

Next, the process of deriving the above-indicated equation (44) will be explained.

Where $m_{t\text{-}TA}$ represents throttle passing air flow rate during steady-state engine operation, the throttle passing air flow rate $m_{t\text{-}TA}$ is expressed by the following equation (45).

$$m_{t\text{-}TA} = \mu_t(\theta_t) \cdot A_t(\theta_t) \cdot \frac{P_a}{\sqrt{R \cdot T_a}} \cdot \Phi\left(\frac{P_{m\text{-}egr}}{P_a}\right) \quad (45)$$

Then, the following equation (46) is derived by dividing each side of the equation (1) by the corresponding side of the equation (45) and simplifying the result of the division.

$$m_t = m_{t\text{-}TA} \cdot \frac{\Phi\left(\frac{P_m}{P_a}\right)}{\Phi\left(\frac{P_{m\text{-}egr}}{P_a}\right)} \quad (46)$$

As described above, the cylinder incoming air flow rate $m_{c\text{-}air}$ is proportional to the in-cylinder charged air amount $M_{c\text{-}air}$, and the in-cylinder charged air amount $M_{c\text{-}air}$ is proportional to the engine load factor KL, which is calculated from the above-indicated equation (26). Therefore, the cylinder incoming air flow rate $m_{c\text{-}air}$ during steady-state engine operation with EGR gas supplied is expressed by the following expression (47):

$$m_{c\text{-}air} = f \cdot (P_m - d) + g \quad (47)$$

$f = f1 \ldots P_m \leq d$ $f = f2 \ldots P_m > d$ where f is adapted parameter ($f = f_2(NE, \theta_e)$) determined based on the engine speed NE and the EGR opening $\theta_e$, and d is adapted parameter ($d = f_3(NE)$) determined based on the engine speed NE, while g is adapted parameter ($g = f_4(NE, \theta_e)$) determined based on the engine speed NE and the EGR opening $\theta_e$. In other words, f, d and g are coefficients determined by using parameters representing the engine operating conditions as variables.

Here, the cylinder incoming air flow rate $m_{c\text{-}air}$ is equal to the throttle passing air flow rate $m_{t\text{-}TA}$ during steady-state engine operation, and the intake pipe pressure $P_m$ is equal to the intake pipe pressure $P_{m\text{-}egr}$ that would be finally achieved or reached during transient engine operation. Accordingly, the following equation (48) is derived from the above equation (47).

$$m_{t\text{-}TA} = f \cdot (P_{m\text{-}egr} - d) + g \quad (48)$$

$f = f1 \ldots P_{m\text{-}egr} \leq d$ $f = f2 \ldots P_{m\text{-}egr} > d$

By substituting this equation (48) into the above equation (46), the above equation (44) is derived.

The intake pipe pressure $P_{m\text{-}egr}$ is determined in advance through experiments, or the like, and is stored in the ROM 34 in the form of a map, as a function ($P_{m\text{-}egr} = f_1(NE, \theta_t, \theta_e)$) of the engine speed NE, throttle opening $\theta_t$ and the EGR opening $\theta_e$.

The adapted parameter f is determined in advance through experiments, or the like, and is stored in the ROM 34 in the form of a map, as a function ($f = f_2(NE, \theta_e)$) of the engine speed NE and the EGR opening $\theta_e$.

The adapted parameter d is determined in advance through experiments, or the like, and is stored in the ROM 34 in the form of a map, as a function ($d = f_3(NE)$) of the engine speed NE.

The adapted parameter g is determined in advance through experiments, or the like, and is stored in the ROM 34 in the form of a map, as a function ($g = f_4(NE, \theta_e)$) of the engine speed NE and the EGR opening $\theta_e$.

Thus, in the present embodiment, the intake pipe pressure $P_{m\text{-}egr}$ that would be finally reached during transient engine operation and the adapted parameters f, d, g are calculated from the above-described maps, based on the engine speed NE, throttle opening $\theta_t$, EGR opening $\theta_e$, and the like, while the intake pipe pressure $P_m$ is calculated based on the detection value of the intake pipe pressure sensor 40. Then, the throttle passing air flow rate $m_t$ is calculated by substituting the obtained intake pipe pressures and parameters into the above equation (44) and solving this equation.

The intake pipe pressure $P_m$ may be estimated or calculated by another method, for example, based on the throttle opening $\theta_t$. If the engine is equipped with an air flow meter, the intake pipe pressure $P_m$ may be estimated or calculated based on the detection value of the air flow meter.

During steady-state engine operation, since the intake pipe pressure $P_m$ and the intake pipe pressure $P_{m\text{-}egr}$ are equal to each other ($P_m = P_{m\text{-}egr}$), the term $\Phi(P_m/P_a)/\Phi(P_{m\text{-}egr}/P_a)$ in the equation (44) is equal to 1, and the function $\Phi$ is eliminated. Thus, even if the accuracy in calculating the value of the function $\Phi$ is low, the throttle passing air flow rate $m_t$ can be calculated with high accuracy by using the equation (44) at least during steady-state operation.

In the meantime, the EGR gas is supplied into the cylinders mainly while the engine is operating at a low load. During such low-load engine operation, the exhaust pressure $P_e$ is assumed to be substantially equal to the atmospheric pressure $P_a$. Accordingly, when the EGR gas is supplied into the cylinders, the pressure upstream of the EGR control valve 22 is equal to the pressure upstream of the throttle valve 18. Also, the pressure downstream of the EGR control valve 22 and the pressure downstream of the throttle valve 18, which are equivalent to the intake pipe pressure $P_m$, are originally equal to each other.

Namely, when the EGR gas is supplied into the cylinders, the pressures upstream and downstream of the EGR control valve 22 are equal to the pressures upstream and downstream of the throttle valve 18, respectively. In this case, the EGR opening can be relatively easily converted into an equivalent throttle opening. In the following, a method of converting the EGR opening will be described.

Figure 38:
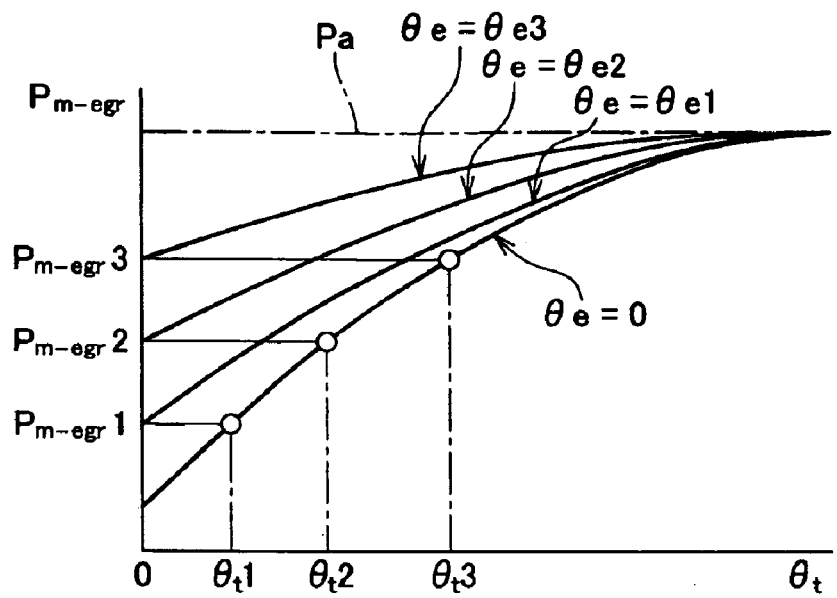
FIG. 38 is a graph showing the relationship between the throttle opening $\theta_t$ and the intake pipe pressure $P_{m-egr}$.

If the pressures upstream and downstream of the EGR control valve 22 are made equal to the pressures upstream and downstream of the throttle valve 18, and the engine speed NE is kept constant, the relationship as shown in FIG. 38 is established between the throttle opening $\theta_t$ and the intake pipe pressure $P_{m\text{-}egr}$ at some different EGR openings $\theta_e$ ($\theta_e = 0, \theta_e 1, \theta_e 2, \theta_e 3$).

As is understood from FIG. 38, at the same EGR opening, the intake pipe pressure $P_{m\text{-}egr}$ increases toward the atmospheric pressure $P_a$ as the throttle opening increases. Also, at the same throttle opening, the intake pipe pressure $P_{m\text{-}egr}$ increases toward the atmospheric pressure as the EGR opening increases.

Since the intake pipe pressure $P_{m\text{-}egr}$ tends to be lowered as the engine speed NE increases, the curve indicating the relationship between the throttle opening and the intake pipe pressure at each EGR opening moves as a whole downwards as the engine speed NE increases in the example as shown in FIG. 38.

As is understood from FIG. 38, the intake pipe pressure is equal to $P_{m\text{-}egr1}$ when the throttle opening is equal to zero and the EGR opening is equal to $\theta_e 1$. It is also understood from FIG. 38 that the throttle opening is equal to $\theta_t 1$ when the intake pipe pressure is equal to this value $P_{m\text{-}egr1}$ and the EGR opening is equal to zero ($\theta_e = 0$).

Namely, when the intake pipe pressure is equal to the same value $P_{m\text{-}egre1}$ the EGR opening is equal to $\theta_e 1$ if the throttle opening is equal to zero, and the throttle opening is equal to $\theta_t 1$ if the EGR opening is equal to zero.

Accordingly, in the example of FIG. 38, the EGR opening $\theta_e 1$ is converted into the throttle opening $\theta_t 1$. Similarly, in the example of FIG. 38, the EGR opening $\theta_e 2$ is converted into the throttle opening $\theta_t 2$, and the EGR opening $\theta_e 3$ is converted into the throttle opening $\theta_t 3$.

Figure 39:
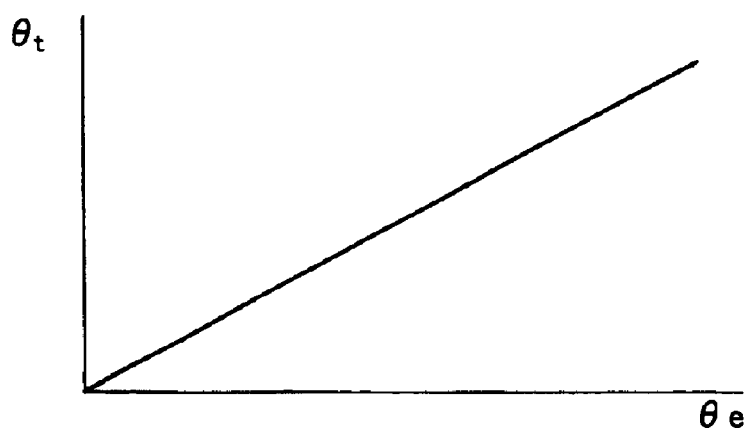
FIG. 39 is a graph showing the relationship between the EGR opening $\theta_e$ and the equivalent throttle opening $\theta_t$.

FIG. 39 shows the relationship between the EGR opening and the throttle opening (equivalent throttle opening) that is equivalent to the EGR opening. As shown in FIG. 39, the equivalent throttle opening is substantially a linear function of the EGR opening. Namely, the throttle opening equivalent to the EGR opening can be relatively easily obtained by using the relationship as shown in FIG. 39.

The equivalent throttle opening may be determined in advance through experiments, or the like, and may be stored in the form of a map in the ROM 34. When the above-described condition that the pressures upstream and downstream of the EGR control valve 22 are equal to the pressures upstream and downstream of the throttle valve 18 is satisfied or permitted, the equivalent throttle opening may be calculated from this map, by using the EGR opening as an argument, and the equivalent throttle opening may be added to the actual throttle opening so that a total throttle opening is utilized. With this arrangement, the EGR opening need not be used as a parameter in the illustrated embodiments, resulting in a reduction in the effort in preparing maps or the burden of calculation using maps or mathematical equations.

In the above case, the EGR opening itself is not used as a parameter, and, for example, the number of arguments of a certain map may be reduced by one. Generally, if the number of arguments of a map is reduced by one, the accuracy of the value calculated from this map is reduced. According to the above-described method, however, the total throttle opening involves or includes the EGR opening, and therefore the value calculated from the map or mathematical equation is highly accurate.

As the engine speed NE increases, the curve representing the relationship between the throttle opening and the intake pipe pressure at each EGR opening merely moves downwards over the entire range of the throttle opening, as described above. Thus, the relationship between the EGR opening and the throttle opening at the same intake pipe pressure does not change so much.

Accordingly, the function as shown in FIG. 39 is substantially constant (i.e., does not substantially change) even if the engine speed NE varies. In the above-described method, therefore, the EGR opening can be converted into the equivalent throttle opening, only by utilizing one map as shown in FIG. 39.

To improve the accuracy in conversion of the EGR opening into the equivalent throttle opening, a correction factor for correcting the calculated equivalent throttle opening may be determined based on the engine speed NE as a variable, and the thus determined correction factor may be, for example, multiplied by the equivalent throttle opening so as to compensate for an influence of the engine speed on the equivalent throttle opening.

While the relationship as shown in FIG. 39 is plotted with reference to the throttle opening that is equal to zero, the relationship between the EGR opening and the equivalent throttle opening may be plotted with reference to the throttle opening established during idling of the engine.

When the above-described method is employed, the intake pipe pressure $P_{m\text{-}egr}$ is determined through experiments, or the like, and is stored in the ROM 34 in the form of a map, as a function ($P_{m\text{-}egr} = f_5(NE, \theta_t)$) of the engine speed NE and the throttle opening $\theta_t$. This map is similar to a map for calculating the intake pipe pressure $P_{m\text{-}TA}$ during steady-state engine operation from the engine speed NE and the throttle opening $\theta_t$, with respect to the engine that is not equipped with the EGR system. Therefore, the map for calculating the intake pipe pressure $P_{m\text{-}TA}$ may be used as a map for calculating the intake pipe pressure $P_{m\text{-}egr}$.

Figure 40:
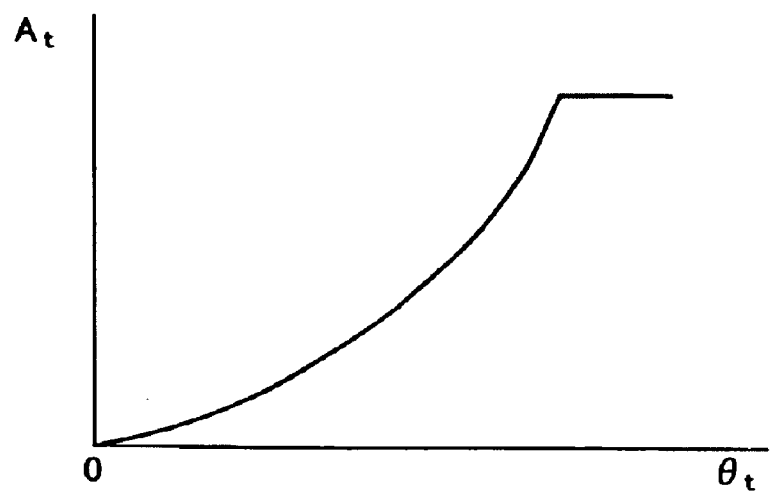
FIG. 40 is a graph showing the relationship between the throttle opening $\theta_t$ and the opening cross-sectional area $A_t$ of the throttle valve.

In the meantime, the throttle opening $\theta_t$ and the opening cross-sectional area $A_t$ of the throttle valve 18 has a non-linear relationship as shown in FIG. 40.

In the above-described method of converting the EGR opening into the equivalent throttle opening, the equivalent throttle opening is calculated from the EGR opening by using the relationship as shown in FIG. 39, without regard to the actual throttle opening, namely, the original value of throttle opening prior to addition of the equivalent throttle opening. Then, the calculated equivalent throttle opening is added to the actual throttle opening.

It, however, will be understood from FIG. 40 that even if the throttle opening $\theta_t$ changes by the same degree, the amount of change in the opening cross-sectional area $A_t$ differs depending upon the original throttle opening $\theta_t$. Namely, the rate of change of the opening cross-sectional area $A_t$ of the throttle valve 18 per unit throttle opening is relatively small in a region where the throttle opening is small, and is relatively large in a region where the throttle opening is large.

Namely, even if the same equivalent throttle opening is added to the actual throttle opening, the degree of an influence of the equivalent throttle opening differs depending upon the actual throttle opening, i.e., the original throttle opening.

Figure 41:
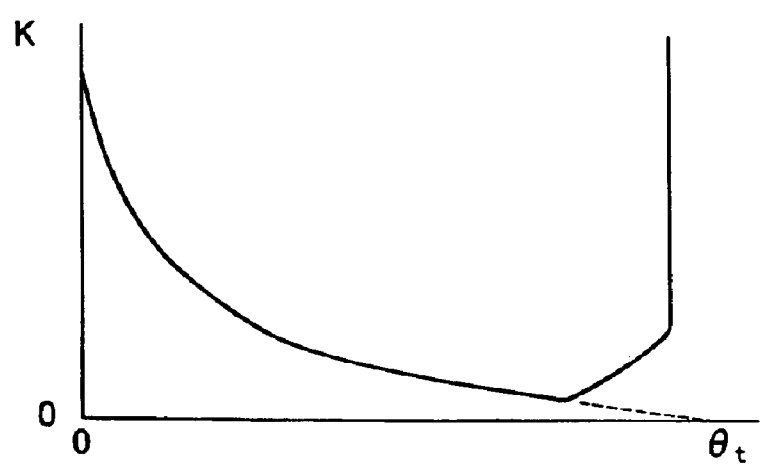
FIG. 41 is a graph showing the relationship between the actual throttle opening $\theta_t$ and the correction factor K.

Meanwhile, if slope Sb at the throttle opening (which is equal to zero or the throttle opening during idling of the engine in the above example) with reference to which the map of FIG. 39 was plotted is determined on the curve shown in FIG. 40, and value Sb/S obtained by dividing the above slope Sb by slope S determined on the curve of FIG. 40 with respect to each throttle opening is plotted as a function of the throttle opening, a curve as indicated by the solid line in FIG. 41 can be obtained.

The value Sb/S obtained by dividing slope Sb by S is a correction factor for correcting the equivalent throttle opening in terms of the actual throttle opening. When the actual throttle opening is equal to $\theta_t 1$, for example, the equivalent throttle opening is multiplied by a correction factor K1 corresponding to the throttle opening $\theta_t 1$, and the total throttle opening is calculated by adding the corrected equivalent throttle opening resulting from the multiplication by the correction factor K1 to the actual throttle opening. The total throttle opening is thus determined in view of the non-linear relationship between the throttle opening $\theta_t$ and the opening cross-sectional area $A_t$ of the throttle valve 18.

Since the equivalent throttle opening is calculated in view of the non-linear relationship between the throttle opening $\theta_t$ and the opening cross-sectional area $A_t$ of the throttle valve 18, the value calculated by using the total throttle opening resulting from addition of the corrected equivalent throttle opening has an improved degree of accuracy.

As shown in FIG. 40, in a region where the throttle opening $\theta_t$ is extremely large, the throttle opening cross-sectional area $A_t$ does not increase from a certain point even if the throttle opening $\theta_t$ increases, and the slope S becomes equal to zero. In this region, the correction factor Sb/S becomes infinite, as shown in FIG. 41.

It is naturally understood that the intake pipe pressure $P_{m\text{-}egr}$ hardly changes even if the throttle opening $\theta_t$ changes or the EGR opening $\theta_e$ changes in the region where the throttle opening $\theta_t$ is extremely large. Thus, the equivalent throttle opening may be considered as being extremely small or substantially equal to zero.

In the region where the throttle opening $\theta_t$ is extremely large, therefore, the correction factor K may be adapted to gradually decrease toward zero, as indicated by the broke line in FIG. 41. This arrangement makes it possible to avoid problems in terms of control, and permit control conforming to the actual phenomena or situation with a high degree of continuity.

What is claimed is:

1. A pressure/temperature calculation apparatus of an internal combustion engine in which an exhaust passage is connected to an intake passage downstream of a throttle valve via an exhaust gas recirculation passage, and an exhaust gas flow control valve adapted to control a flow rate of exhaust gas flowing in the exhaust gas recirculation passage is disposed in the exhaust gas recirculation passage, comprising:

a controller that calculates at least one of a pressure and a temperature in the intake passage downstream of the throttle valve, according to numerical calculations using an expression of a relationship established based on the law of conservation of mass among an amount of air passing the throttle valve and flowing into the intake passage downstream of the throttle valve, an amount of exhaust gas passing the exhaust gas flow control valve and flowing into the intake passage downstream of the throttle valve, and an amount of gas flowing from the intake passage downstream of the throttle valve into a cylinder of the engine, and an expression of a relationship established based on the law of conservation of energy among an amount of energy of the air passing the throttle valve and flowing into the intake passage downstream of the throttle valve, an amount of energy of the exhaust gas passing the exhaust gas flow control valve and flowing into the intake passage downstream of the throttle valve, and an amount of energy of the gas flowing from the intake passage downstream of the throttle valve into the cylinder of the engine.

2. The pressure/temperature calculation apparatus according to claim 1, wherein the expression of the relationship established based on the law of conservation of mass is:

$$\frac{d}{dt}\left(\frac{P_m}{T_m}\right) = \frac{R}{V} \cdot (m_t + m_{egr} - m_c)$$

and the expression of the relationship established based on the law of conservation of energy is:

$$\frac{dP_m}{dt} = \kappa \cdot \frac{R}{V} \cdot (m_t \cdot T_a + m_{egr} \cdot T_e - m_c \cdot T_m)$$

where $P_m$ is the pressure in the intake passage downstream of the throttle valve, $T_m$ is the temperature in the intake passage downstream of the throttle valve, $m_t$ is a flow rate of air passing the throttle valve, $m_{egr}$ is a flow rate of exhaust gas passing the exhaust gas flow control valve, $m_c$ is a flow rate of gas flowing into the cylinder, $T_a$ is a temperature of an atmosphere around the engine, $T_e$ is a temperature of exhaust gas flowing from the exhaust gas recirculation passage into the intake passage downstream of the throttle valve, R is a constant related to a gas constant, V is a volume of the intake passage extending from the throttle valve to the cylinder, and $\kappa$ is a ratio of specific heat.

3. The pressure/temperature calculation apparatus according to claim 2, wherein the controller calculates the flow rate $(m_t)$ of the air passing the throttle valve according to an equation as follows:

$$m_t = \{e \cdot (P_{m\text{-}egr} - d) + r\} \cdot \frac{\Phi\frac{P_m}{P_a}}{\Phi\frac{P_{m\text{-}egr}}{P_a}}$$

where $P_{m\text{-}egr}$ is a pressure in the intake passage downstream of the throttle valve, which is to be reached when the engine shifts from a transient operation to a steady-state operation, $P_a$ is a pressure around the engine, e, d and r are coefficients using parameters representing engine operating conditions as variables, $\Phi(P_m/P_a)$ is a function using $P_m/P_a$ as a variable, and $\Phi(P_{m\text{-}egr}/P_a)$ is a function using $P_{m\text{-}egr}/P_a$ as a variable.

4. The pressure/temperature calculation apparatus according to claim 2, wherein the controller calculates the flow rate $(m_t)$ of the air passing the throttle valve according to an equation as follows:

$$m_t = \mu_t(\theta_t) \cdot A_t(\theta_t) \cdot \frac{P_a}{\sqrt{R \cdot T_a}} \cdot \Phi\left(\frac{P_m}{P_a}\right)$$

where $\mu_t$ is a flow coefficient at the throttle valve, $A_t$ is an opening cross-sectional area of the throttle valve, $\theta_t$ is an opening angle of the throttle valve, $P_a$ is a pressure of an atmosphere around the engine, and $\Phi(P_m/P_a)$ is a function using $P_m/P_a$ as a variable.

5. The pressure/temperature calculation apparatus according to claim 2, wherein the controller calculates the flow rate $(m_c)$ of the gas flowing into the cylinder according to an equation as follows:

$$m_c = \frac{T_a}{T_m} \cdot (a \cdot P_m - b)$$

where a and b are determined by using an engine speed as a variable.

6. The pressure/temperature calculation apparatus according to claim 2, wherein the controller calculates the flow rate $(m_{egr})$ of the exhaust gas passing the exhaust gas flow control valve from a function representing a difference between a flow rate of air flowing into the cylinder during steady-state engine operation while a flow rate of exhaust gas flowing into the cylinder is equal to zero, and a flow rate of air flowing into the cylinder during steady-state engine operation while a flow rate of exhaust gas flowing into the cylinder is not equal to zero, said function using the pressure in the intake passage downstream of the throttle valve as a variable.

7. The pressure/temperature calculation apparatus according to claim 2, wherein the controller calculates the flow rate ($m_{egr}$) of the exhaust gas passing the exhaust gas flow control valve according to an equation as follows:

$$m_{egr} = \mu_e(\theta_e) \cdot A_e(\theta_e) \cdot \frac{P_e}{\sqrt{R \cdot T_e}} \cdot \Phi\left(\frac{P_m}{P_e}\right)$$

where $\mu_e$ is a flow coefficient at the exhaust gas flow control valve, $A_e$ is an opening cross-sectional area of the exhaust gas flow control valve, $\theta_e$ is an opening angle of the exhaust gas flow control valve, $P_e$ is a pressure of exhaust gas upstream of the exhaust gas flow control valve, and $\Phi(P_m/P_e)$ is a function using $P_m/P_e$ as a variable.

8. The pressure/temperature calculation apparatus according to claim 7, wherein the controller calculates the temperature ($T_e$) of the exhaust gas flowing from the exhaust gas recirculation passage into the intake passage downstream of the throttle valve from a map using a parameter representing an engine operating condition as a variable.

9. The pressure/temperature calculation apparatus according to claim 2, wherein the controller calculates the temperature ($T_e$) of the exhaust gas flowing from the exhaust gas recirculation passage into the intake passage downstream of the throttle valve from a map using a parameter representing an engine operating condition as a variable.

10. The pressure/temperature calculation apparatus according to claim 1, wherein the expression of the relationship established based on the law of conservation of mass is:

$$\frac{d}{dt}\left(\frac{P_m}{T_m}\right) = \frac{R}{V} \cdot (m_t + m_{egr} - m_c)$$

and the expression of the relationship established based on the law of conservation of energy is:

$$\frac{dP_m}{dt} = \kappa \cdot \frac{R}{V} \cdot (m_t \cdot T_a + m_{egr-air} \cdot T_a + m_{egr-egr} \cdot T_e - m_{c-air} \cdot T_m - m_{c-egr} \cdot T_e)$$

where $P_m$ is the pressure in the intake passage downstream of the throttle valve, $T_m$ is the temperature in the intake passage downstream of the throttle valve, $m_t$ is a flow rate of air passing the throttle valve, $m_{egr}$ is a flow rate of exhaust gas passing the exhaust gas flow control valve, $m_c$ is a flow rate of gas flowing into the cylinder, $m_{egr-air}$ is a flow rate of air contained in gas flowing from the exhaust gas recirculation passage into the intake passage downstream of the throttle valve, $m_{egr-egr}$ is a flow rate of exhaust gas contained in the gas flowing from the exhaust gas recirculation passage into the intake passage downstream of the throttle valve, $m_{c-air}$ is a flow rate of air contained in the gas flowing into the cylinder, $m_{c-egr}$ is a flow rate of exhaust gas contained in the gas flowing into the cylinder, $T_a$ is a temperature of an atmosphere around the engine, $T_e$ is a temperature of exhaust gas flowing from the exhaust gas recirculation passage into the intake passage downstream of the throttle valve, R is a constant related to a gas constant, V is a volume of the intake passage extending from the throttle valve to the cylinder, and $\kappa$ is a ratio of specific heat.

11. The pressure/temperature calculation apparatus according to claim 10, wherein the controller calculates the flow rate ($m_t$) of the air passing the throttle valve according to an equation as follows:

$$m_t = \{e \cdot (P_{m-egr} - d) + r\} \cdot \frac{\Phi\frac{P_m}{P_a}}{\Phi\frac{P_{m-egr}}{P_a}}$$

where $P_{m-egr}$ is a pressure in the intake passage downstream of the throttle valve, which is to be reached when the engine shifts from a transient operation to a steady-state operation, $P_a$ is a pressure around the engine, e, d and r are coefficients using parameters representing engine operating conditions as variables, $\Phi(P_m/P_a)$ is a function using $P_m/P_a$ as a variable, and $\Phi(P_{m-egr}/P_a)$ is a function using $P_{m-egr}/P_a$ as a variable.

12. The pressure/temperature calculation apparatus according to claim 10, wherein the controller calculates the flow rate ($m_t$) of the air passing the throttle valve according to an equation as follows:

$$m_t = \mu_t(\theta_t) \cdot A_t(\theta_t) \cdot \frac{P_a}{\sqrt{R \cdot T_a}} \cdot \Phi\left(\frac{P_m}{P_a}\right)$$

where $\mu_t$ is a flow coefficient at the throttle valve, $A_t$ is an opening cross-sectional area of the throttle valve, $\theta_t$ is an opening angle of the throttle valve, $P_a$ is a pressure of an atmosphere around the engine, and $\Phi(P_m/P_a)$ is a function using $P_m/P_a$ as a variable.

13. The pressure/temperature calculation apparatus according to claim 10, wherein the controller calculates the flow rate ($m_c$) of the gas flowing into the cylinder according to an equation as follows:

$$m_c = \frac{T_a}{T_m} \cdot (a \cdot P_m - b)$$

where a and b are determined by using an engine speed as a variable.

14. The pressure/temperature calculation apparatus according to claim 10, wherein the controller calculates the flow rate ($m_{egr}$) of the exhaust gas passing the exhaust gas flow control valve from a function representing a difference between a flow rate of air flowing into the cylinder during steady-state engine operation while a flow rate of exhaust gas flowing into the cylinder is equal to zero, and a flow rate of air flowing into the cylinder during steady-state engine operation while a flow rate of exhaust gas flowing into the cylinder is not equal to zero, said function using the pressure in the intake passage downstream of the throttle valve as a variable.

15. The pressure/temperature calculation apparatus according to claim 10, wherein the controller calculates the flow rate ($m_{egr}$) of the exhaust gas passing the exhaust gas flow control valve according to an equation as follows:

$$m_{egr} = \mu_e(\theta_e) \cdot A_e(\theta_e) \cdot \frac{P_e}{\sqrt{R \cdot T_e}} \cdot \Phi\left(\frac{P_m}{P_e}\right)$$

where $\mu_e$ is a flow coefficient at the exhaust gas flow control valve, $A_e$ is an opening cross-sectional area of the exhaust gas flow control valve, $\theta_e$ is an opening angle of the exhaust gas flow control valve, $P_e$ is a pressure of exhaust gas upstream of the exhaust gas flow control valve, and $\Phi(P_m/P_e)$ is a function using $P_m/P_e$ as a variable.

16. The pressure/temperature calculation apparatus according to claim 15, wherein the controller calculates the temperature ($T_e$) of the exhaust gas flowing from the exhaust gas recirculation passage into the intake passage downstream of the throttle valve from a map using a parameter representing an engine operating condition as a variable.

17. The pressure/temperature calculation apparatus according to claim 10, wherein the controller calculates the temperature ($T_e$) of the exhaust gas flowing from the exhaust gas recirculation passage into the intake passage downstream of the throttle valve from a map using a parameter representing an engine operating condition as a variable.

18. The pressure/temperature calculation apparatus according to claim 1, wherein the expression of the relationship established based on the law of conservation of mass is:

$$\frac{d}{dt}\left(\frac{P_m}{T_m}\right) = \frac{R}{V} \cdot (m_t + m_{egr} - m_c)$$

and the expression of the relationship established based on the law of conservation of energy is:

$$\frac{dP_m}{dt} = \kappa \cdot \frac{R}{V} \cdot (m_t \cdot T_a + m_{egr-air} \cdot T_a - m_{c-air} \cdot T_m)$$

where $P_m$ is the pressure in the intake passage downstream of the throttle valve, $T_m$ is the temperature in the intake passage downstream of the throttle valve, $m_t$ is a flow rate of air passing the throttle valve, $m_{egr}$ is a flow rate of exhaust gas passing the exhaust gas flow control valve, $m_c$ is a flow rate of gas flowing into the cylinder, $m_{egr-air}$ is a flow rate of air contained in gas flowing from the exhaust gas recirculation passage into the intake passage downstream of the throttle valve, $m_{c-air}$ is a flow rate of air contained in the gas flowing into the cylinder, $T_a$ is a temperature of an atmosphere around the engine, R is a constant related to a gas constant, V is a volume of the intake passage extending from the throttle valve to the cylinder, and κ is a ratio of specific heat.

19. The pressure/temperature calculation apparatus according to claim 18, wherein the controller calculates the flow rate ($m_t$) of the air passing the throttle valve according to an equation as follows:

$$m_t = \{e \cdot (P_{m-egr} - d) + r\} \cdot \frac{\Phi\frac{P_m}{P_a}}{\Phi\frac{P_{m-egr}}{P_a}}$$

where $P_{m-egr}$ is a pressure in the intake passage downstream of the throttle valve, which is to be reached when the engine shifts from a transient operation to a steady-state operation, $P_a$ is a pressure around the engine, e, d and r are coefficients using parameters representing engine operating conditions as variables, $\Phi(P_m/P_a)$ is a function using $P_m/P_a$ as a variable, and $\Phi(P_{m-egr}/P_a)$ is a function using $P_{m-erg}/P_a$ as a variable.

20. The pressure/temperature calculation apparatus according to claim 18, wherein the controller calculates the flow rate ($m_t$) of the air passing the throttle valve according to an equation as follows:

$$m_t = \mu_t(\theta_t) \cdot A_t(\theta_t) \cdot \frac{P_a}{\sqrt{R \cdot T_a}} \cdot \Phi\left(\frac{P_m}{P_a}\right)$$

where $\mu_t$ is a flow coefficient at the throttle valve, $A_t$ is an opening cross-sectional area of the throttle valve, $\theta_t$ is an opening angle of the throttle valve, $P_a$ is a pressure of an atmosphere around the engine, and $\Phi(P_m/P_a)$ is a function using $P_m/P_a$ as a variable.

21. The pressure/temperature calculation apparatus according to claim 18, wherein the controller calculates the flow rate ($m_c$) of the gas flowing into the cylinder according to an equation as follows:

$$m_c = \frac{T_a}{T_m} \cdot (a \cdot P_m - b)$$

where a and b are determined by using an engine speed as a variable.

22. The pressure/temperature calculation apparatus according to claim 18, wherein the controller calculates the flow rate ($m_{egr}$) of the exhaust gas passing the exhaust gas flow control valve from a function representing a difference between a flow rate of air flowing into the cylinder during steady-state engine operation while a flow rate of exhaust gas flowing into the cylinder is equal to zero, and a flow rate of air flowing into the cylinder during steady-state engine operation while a flow rate of exhaust gas flowing into the cylinder is not equal to zero, said function using the pressure in the intake passage downstream of the throttle valve as a variable.

23. The pressure/temperature calculation apparatus according to claim 18, wherein the controller calculates the flow rate ($m_{egr}$) of the exhaust gas passing the exhaust gas flow control valve according to an equation as follows:

$$m_{egr} = \mu_e(\theta_e) \cdot A_e(\theta_e) \cdot \frac{P_e}{\sqrt{R \cdot T_e}} \cdot \Phi\left(\frac{P_m}{P_e}\right)$$

where $\mu_e$ is a flow coefficient at the exhaust gas flow control valve, $A_e$ is an opening cross-sectional area of the exhaust gas flow control valve, $\theta_e$ is an opening angle of the exhaust gas flow control valve, $P_e$ is a pressure of exhaust gas upstream of the exhaust gas flow control valve, and $\Phi(P_m/P_e)$ is a function using $P_m/P_e$ as a variable.

24. The pressure/temperature calculation apparatus according to claim 23, wherein the controller calculates the temperature ($T_e$) of the exhaust gas flowing from the exhaust gas recirculation passage into the intake passage downstream of the throttle valve from a map using a parameter representing an engine operating condition as a variable.

25. The pressure/temperature calculation apparatus according to claim 1, wherein the expression of the relationship established based on the law of conservation of mass is:

$$\frac{d}{dt}\left(\frac{P_m}{T_m}\right) = \frac{R}{V} \cdot (m_t + m_{egr} - m_c)$$

and the expression of the relationship established based on the law of conservation of energy is:

$$\frac{dP_m}{dt} = \kappa \cdot \frac{R}{V} \cdot (m_t \cdot T_a + m_{egr} \cdot T_a - m_c \cdot T_m)$$

where $P_m$ is the pressure in the intake passage downstream of the throttle valve, $T_m$ is the temperature in the intake passage downstream of the throttle valve, $m_t$ is a flow rate of air passing the throttle valve, $m_{egr}$ is a flow rate of exhaust gas passing the exhaust gas flow control valve, $m_c$ is a flow rate of gas flowing into the cylinder, $T_a$ is a temperature of an atmosphere around the engine, R is a constant related to a gas constant, V is a volume of the intake passage extending from the throttle valve to the cylinder, and κ is a ratio of specific heat.

26. The pressure/temperature calculation apparatus according to claim 25, wherein the controller calculates the flow rate ($m_t$) of the air passing the throttle valve according to an equation as follows:

$$m_t = \{e \cdot (P_{m-egr} - d) + r\} \cdot \frac{\Phi\frac{P_m}{P_a}}{\Phi\frac{P_{m-egr}}{P_a}}$$

where $P_{m-egr}$ is a pressure in the intake passage downstream of the throttle valve, which is to be reached when the engine shifts from a transient operation to a steady-state operation, $P_a$ is a pressure around the engine, e, d and r are coefficients using parameters representing engine operating conditions as variables, $\Phi(P_m/P_a)$ is a function using $P_m/P_a$ as a variable, and $\Phi(P_{m-egr}/P_a)$ is a function using $P_{m-egr}/P_a$ as a variable.

27. The pressure/temperature calculation apparatus according to claim 25, wherein the controller calculates the flow rate ($m_t$) of the air passing the throttle valve according to an equation as follows:

$$m_t = \mu_t(\theta_t) \cdot A_t(\theta_t) \cdot \frac{P_a}{\sqrt{R \cdot T_a}} \cdot \Phi\left(\frac{P_m}{P_a}\right)$$

where $\mu_t$ is a flow coefficient at the throttle valve, $A_t$ is an opening cross-sectional area of the throttle valve, $\theta_t$ is an opening angle of the throttle valve, $P_a$ is a pressure of an atmosphere around the engine, and $\Phi(P_m/P_a)$ is a function using $P_m/P_a$ as a variable.

28. The pressure/temperature calculation apparatus according to claim 25, wherein the controller calculates the flow rate ($m_c$) of the gas flowing into the cylinder according to an equation as follows:

$$m_c = \frac{T_a}{T_m} \cdot (a \cdot P_m - b)$$

where a and b are determined by using an engine speed as a variable.

29. The pressure/temperature calculation apparatus according to claim 25, wherein the controller calculates the flow rate ($m_{egr}$) of the exhaust gas passing the exhaust gas flow control valve from a function representing a difference between a flow rate of air flowing into the cylinder during steady-state engine operation while a flow rate of exhaust gas flowing into the cylinder is equal to zero, and a flow rate of air flowing into the cylinder during steady-state engine operation while a flow rate of exhaust gas flowing into the cylinder is not equal to zero, said function using the pressure in the intake passage downstream of the throttle valve as a variable.

30. The pressure/temperature calculation apparatus according to claim 25, wherein the controller calculates the flow rate ($m_{egr}$) of the exhaust gas passing the exhaust gas flow control valve according to an equation as follows:

$$m_{egr} = \mu_e(\theta_e) \cdot A_e(\theta_e) \cdot \frac{P_e}{\sqrt{R \cdot T_e}} \cdot \Phi\left(\frac{P_m}{P_e}\right)$$

where $\mu_e$ is a flow coefficient at the exhaust gas flow control valve, $A_e$ is an opening cross-sectional area of the exhaust gas flow control valve, $\theta_e$ is an opening angle of the exhaust gas flow control valve, $P_e$ is a pressure of exhaust gas upstream of the exhaust gas flow control valve, and $\Phi(P_m/P_e)$ is a function using $P_m/P_e$ as a variable.

31. The pressure/temperature calculation apparatus according to claim 30, wherein the controller calculates the temperature ($T_e$) of the exhaust gas flowing from the exhaust gas recirculation passage into the intake passage downstream of the throttle valve from a map using a parameter representing an engine operating condition as a variable.

32. The pressure/temperature calculation apparatus according to claim 1, wherein the expression of the relationship established based on the law of conservation of mass is:

$$\frac{d}{dt}\left(\frac{P_m}{T_m}\right) = \frac{T}{V} \cdot (m_t - m_{c-air})$$

and the expression of the relationship established based on the law of conservation of energy is:

$$\frac{dP_m}{dt} = \kappa \cdot \frac{R}{V} \cdot (m_t \cdot T_a - m_{c-air} \cdot T_m)$$

where $P_m$ is the pressure in the intake passage downstream of the throttle valve, $T_m$ is the temperature in the intake passage downstream of the throttle valve, $m_t$ is a flow rate of air passing the throttle valve, $m_{c-air}$ is a flow rate of air contained in gas flowing into the cylinder, $T_a$ is a temperature of an atmosphere around the engine, R is a constant related to a gas constant, V is a volume of the intake passage extending from the throttle valve to the cylinder, and κ is a ratio of specific heat.

33. The pressure/temperature calculation apparatus according to claim 32, wherein the controller calculates the flow rate ($m_t$) of the air passing the throttle valve according to an equation as follows:

$$m_t = \{e \cdot (P_{m-egr} - d) + r\} \cdot \frac{\Phi\frac{P_m}{P_a}}{\Phi\frac{P_{m-egr}}{P_a}}$$

where $P_{m-egr}$ is a pressure in the intake passage downstream of the throttle valve, which is to be reached when the engine shifts from a transient operation to a steady-state operation, $P_a$ is a pressure around the engine, e, d and r are coefficients using parameters representing engine operating conditions as variables, $\Phi(P_m/P_a)$ is a function using $P_m/P_a$ as a variable, and $\Phi(P_{m-egr}/P_a)$ is a function using $P_{m-egr}/P_a$ as a variable.

34. The pressure/temperature calculation apparatus according to claim 32, wherein the controller calculates the flow rate ($m_t$) of the air passing the throttle valve according to an equation as follows:

$$m_t = \mu_t(\theta_t) \cdot A_t(\theta_t) \cdot \frac{P_a}{\sqrt{R \cdot T_a}} \cdot \Phi\left(\frac{P_m}{P_a}\right)$$

where $\mu_t$ is a flow coefficient at the throttle valve, $A_t$ is an opening cross-sectional area of the throttle valve, $\theta_t$ is an opening angle of the throttle valve, $P_a$ is a pressure of an atmosphere around the engine, and $\Phi(P_m/P_a)$ is a function using $P_m/P_a$ as a variable.

35. The pressure/temperature calculation apparatus according to claim 32, wherein the controller calculates the flow rate ($m_c$) of the gas flowing into the cylinder according to an equation as follows:

$$m_c = \frac{T_a}{T_m} \cdot (a \cdot P_m - b)$$

where a and b are determined by using an engine speed as a variable.

36. An apparatus for calculating a flow rate of air passing a throttle valve and flowing into a cylinder of an internal combustion engine, by using the pressure ($P_m$) and temperature ($T_m$) in an intake passage downstream of the throttle valve which are calculated by the pressure/temperature calculation apparatus according to claim 1, and an equation as follows:

$$m_{c-air} = \frac{T_a}{T_m} \cdot (a \cdot P_m - b) - m_{c-egr}$$

where $m_{c-air}$ is a flow rate of air passing the throttle valve and flowing into the cylinder, $m_{c-egr}$ is a flow rate of exhaust gas contained in gas flowing into the cylinder, and a and b are values determined by using an engine speed as a variable.

* * * * *